United States Patent
Mitsuishi et al.

(10) Patent No.: US 10,102,161 B2
(45) Date of Patent: Oct. 16, 2018

(54) MICROCOMPUTER

(71) Applicant: Renesas Electronics Corporation, Kawasaki-shi (JP)

(72) Inventors: Naoki Mitsuishi, Kawasaki (JP); Seiji Ikari, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 571 days.

(21) Appl. No.: 14/803,765

(22) Filed: Jul. 20, 2015

(65) Prior Publication Data

US 2016/0048392 A1 Feb. 18, 2016

(30) Foreign Application Priority Data

Aug. 18, 2014 (JP) ................. 2014-165636

(51) Int. Cl.
*G06F 13/00* (2006.01)
*G06F 13/24* (2006.01)
*G06F 13/38* (2006.01)
*G06F 9/30* (2018.01)

(52) U.S. Cl.
CPC ............ *G06F 13/24* (2013.01); *G06F 13/385* (2013.01); *G06F 9/30098* (2013.01); *Y02D 10/14* (2018.01)

(58) Field of Classification Search
CPC .................. G06F 13/385; G06F 9/30098
See application file for complete search history.

(56) References Cited

U.S. PATENT DOCUMENTS

| 5,809,259 A | 9/1998 | Mitsuishi | |
| 2005/0216608 A1* | 9/2005 | Wang | G06F 13/28 710/22 |

FOREIGN PATENT DOCUMENTS

| JP | H 01-125644 A | 5/1989 |
| JP | H 07-129537 A | 5/1995 |
| JP | 2000-194647 A | 7/2000 |
| JP | 2001-160025 A | 6/2001 |
| JP | 2004-021401 A | 1/2004 |

OTHER PUBLICATIONS

"LSI handbook" (The Institute of Electronics, Information and Communication Engineers: IEICE, Ohm-sha Ltd. Japan, pp. 540-541,Nov. 1984).

* cited by examiner

*Primary Examiner* — Zachary K Huson
(74) *Attorney, Agent, or Firm* — McGinn I.P. Law Group, PPLc

(57) ABSTRACT

A microcomputer includes: a central processing unit (CPU); a data transfer apparatus (DTC); and a storage apparatus (RAM). The data transfer apparatus includes a plurality of register files each including a mode register storing the transfer mode information, an address register to which the address information is transferred, and a status register (SR) representing information that specifies the transfer information set. The data transfer apparatus checks the information of the status register, to determine whether to use the transfer information set held in the register files or to read the transfer information set from the storage apparatus and to rewrite a prescribed one of the register files. The data transfer apparatus performs data transfer based on the transfer information set stored in one of the register files.

20 Claims, 49 Drawing Sheets

Fig. 27

| TRANSFER INFORMATION 1 MR (DIRECT DATA TRANSFER) DR AR | 0 | 1 | | | 0 | 0 | TCNT INITIAL VALUE |
|---|---|---|---|---|---|---|---|
| | | | | | | | TCNT ADDRESS SPECIFICATION |
| TRANSFER INFORMATION 2 IR (BIT MANIPULATION) AR | 1 | 1 | 1 | 0 | 1 | 0 | 0 | CST BIT BIT NUMBER |
| | | | | | | | TSTR ADDRESS SPECIFICATION |

| | | | | | | | | |
|---|---|---|---|---|---|---|---|---|
| 0 | 0 | 0 | 0 | 0 | 1 | 0 | 1 | 0 |
| | | | | | | TCNT INITIAL VALUE | | |
| | | | | | | TCNT ADDRESS SPECIFICATION | | 0 |
| | | | | | | TSTR ADDRESS SPECIFICATION | | |

TRANSFER INFORMATION MR (BIT MANIPULATION)

AR: | 1 | 1 | 1 | 0 | ... | 1 | 1 | 0 | ... | 0 | OUTPUT PORT BIT NUMBER |
OUTPUT PORT SPECIFICATION

| 0 | 1 | 0 |
OUTPUT PORT SPECIFICATION

| | | | | | | | | |
|---|---|---|---|---|---|---|---|---|
| TRANSFER INFORMATION 1 | MR | 1 | 1 | 0 | 0 | 0 | 0 | 0 | OUTPUT PORT BIT NUMBER |
| | AR | 1 | 0 | 0 | | | | | OUTPUT PORT SPECIFICATION |
| TRANSFER INFORMATION 2 | MR | 1 | 1 | 0 | 0 | 1 | 1 | 0 | OUTPUT PORT BIT NUMBER |
| | AR | 1 | 0 | 0 | | | | | FIRST INPUT PORT SPECIFICATION |
| TRANSFER INFORMATION 3 | MR | 1 | 1 | 0 | 0 | 1 | 1 | 0 | OUTPUT PORT BIT NUMBER |
| | AR | 1 | 0 | 0 | | | | | SECOND INPUT PORT SPECIFICATION |
| TRANSFER INFORMATION 4 | MR | 1 | 1 | 0 | 0 | 1 | 1 | 0 | OUTPUT PORT BIT NUMBER |
| | AR | 1 | 0 | 0 | | | | | THIRD INPUT PORT SPECIFICATION |
| TRANSFER INFORMATION 5 | MR | 1 | 1 | 1 | 0 | 1 | 1 | 0 | OUTPUT PORT BIT NUMBER |
| | AR | 1 | 1 | 0 | | | | | OUTPUT PORT SPECIFICATION |

| | | |
|---|---|---|
| | 0 | 1 | 1 | OUTPUT PORT SPECIFICATION |
| | 0 | 1 | 1 | FIRST INPUT PORT SPECIFICATION |
| | 0 | 1 | 1 | SECOND INPUT PORT SPECIFICATION |
| | 0 | 1 | 1 | THIRD INPUT PORT SPECIFICATION |
| | 0 | 1 | 0 | OUTPUT PORT SPECIFICATION |

Fig. 35

| TRANSFER INFORMATION 1 (BIT MANIPULATION) | MR | 1 | 1 | 0 | 0 | 0 | 0 | 0 | STATUS FLAG BIT NUMBER |
| --- | --- | --- | --- | --- | --- | --- | --- | --- | --- |
| | AR | CKSR SPECIFICATION ||||||||
| TRANSFER INFORMATION 2 (BRANCH MODE) | MR | 0 | 1 | 1 | 1 | 1 | FFFFF4 |||
| | MR | 0 | 1 | 0 | 0 | 0 | |||
| TRANSFER INFORMATION 3 (DIRECT DATA TRANSFER) | DR | CKSR WRITE DATA (SELECT LOCO) ||||||||
| | AR | CKSR SPECIFICATION ||||||||

| | | 0 | 1 | 0 | 0 | 1 | 0 |
| --- | --- | --- | --- | --- | --- | --- | --- |
| | | CKSR SPECIFICATION ||||||
| | | FFFFF4 ||||||
| | | 0 | 0 | 0 | 0 | 0 | 0 |
| | | CKSR WRITE DATA (SELECT LOCO) ||||||
| | | CKSR SPECIFICATION ||||||

MICROCOMPUTER

CROSS-REFERENCE TO RELATED APPLICATIONS

This application is based upon and claims the benefit of priority from Japanese patent application No. 2014-165636, filed on Aug. 18, 2014, the disclosure of which is incorporated herein in its entirety by reference.

BACKGROUND

The present invention relates to a microcomputer. Specifically, the present invention relates to a data transfer technique that can be applied to a microcomputer having, for example, a central processing function and a data transfer function.

TECHNICAL BACKGROUND

As disclosed in "LSI handbook" (The Institute of Electronics, Information and Communication Engineers: IEICE, Ohm-sha Ltd. Japan, pp. 540-541, November, 1984), a single-chip microcomputer consists of a single semiconductor substrate, on which functional blocks such as a central processing unit (CPU) being the core element, ROM (read-only memory) for holding a program, RAM (random-access memory) for holding data, and an input/output circuit for receiving and providing data and signals are formed. The single-chip microcomputer is used for controlling any device.

For controlling a device by using the single-chip microcomputer, it is required to perform data transfer in response to an event such as an interrupt. Since the CPU can realize any processing by a combination of instructions, the CPU is also capable of performing interrupt handling and data transfer processing. However, when the CPU is to perform interrupt handling, the CPU must execute exception handling, stack save/restore operations, and a restore instruction for switching the current process flow. Further, relative to the substantial data transfer processing, the time taken for associated operations such as reading instructions tends to increase.

In addition, the number of the functions realized in a microcomputer is increasing in recent years. Accordingly, the number of times of data transfer to be performed in response to an event such as an interrupt is also increasing. There has also been increasingly required to execute a process at higher speed in response to every corresponding event.

Accordingly, a microcomputer is required to exhibit improved efficiency, acceleration, and convenience in data transfer processing with a suppressed load on the CPU.

In this regard, it is known that, when a single-chip microcomputer includes a CPU and a data transfer apparatus, and data transfer is executed by the data transfer apparatus being dedicated hardware, faster data transfer can be realized compared with in case of the CPU that performs data transfer. The CPU can efficiently perform processing, because the frequency of interrupt handling is reduced.

Japanese Unexamined Patent Application Publication No. H01-125644 (Patent Literature 1) discloses an exemplary data transfer apparatus, which enables data transfer in response to requests from a multitude of peripheral processing apparatuses (input/output circuits) with a small number of hardware elements.

Patent Literature 1 discloses a microcomputer including a storage apparatus (RAM) that stores data transfer information such as a transfer source address representing the location on memory where the data to be transferred is stored. Further provided is a vector table that stores an address representing where in the storage apparatus (RAM) every information required for the data transfer is stored. Still further provided are unit that refers, upon an occurrence of a request for activating data transfer, to the content of the vector table in response to the activation request, and unit that acquires the every information required for data transfer from the content of the vector table.

Japanese Unexamined Patent Application Publication No. H07-129537 (Patent Literature 2) discloses that, such data transfer information is stored in the storage apparatus, and data transfer of at least one piece of the data transfer information can be specified by a single operation of the data transfer apparatus (chain transfer). According to Patent Literature 2, the data transfer apparatus can perform transfer for any number of times by any activation factor. Thus, the data transfer apparatus can be used for various purposes. Further, flexibility in the system configuration and usability improve.

Further, according to Patent Literature 2, a repeat transfer mode and data block transfer are enabled for widening the application of the data transfer apparatus. Such a data transfer apparatus is capable of controlling addresses such as transfer destination and transfer source and selecting the number of times of transfer. Therefore, the data transfer apparatus is suitable to be applied to a system, such as a printer for example, so as to control stepping motors, print data control of the printer, and accumulation of received data on memory.

Patent Literature 2 further points out that, by the data transfer apparatus reading/writing data transfer information or performing data transfer in a bus that is operable in parallel to the bus mainly used by the CPU, wasteful operations in reading or writing back the data transfer information can be suppressed.

The inventor of the present invention considers that, the data transfer apparatus such as disclosed in Patent Literatures 1 and 2 in which data transfer information is stored on RAM whose usage is not limited, i.e., which is a general storage apparatus, has the following advantages.

(a) The number of times of data transfer can be increased. As in a so-called DMA controller, with the scheme in which data transfer information is stored on dedicated hardware of the data transfer apparatus itself, the number of times of data transfer is limited depending on the mounted hardware. In contrast, with the scheme in which data transfer information is stored on RAM whose usage is not limited, the number of times of data transfer can be easily increased, and can support various usage methods intended by the user.

(b) As compared to the scheme in a so-called DMA controller in which selection of an activation factor is realized by specification of a control register of the data transfer apparatus itself and an interface of the microcomputer, the scheme in which whether to request an interrupt of the CPU or to request data transfer of the DTC is selected using an interrupt factor can achieve data transfer that supports a greater number of interrupts and event occurrences.

(c) The number of times of data transfer to be executed per activation can be increased, such as by a chain operation. Further, a function of a combined different data transfer can be realized.

(d) The configuration of data transfer information can be changed, increased or reduced.

(e) Dedicated hardware should be provided as many as required for the minimum one data transfer. Therefore, even when functions are added and the scale of the hardware is increased, an increase in the physical scale of the whole microcomputer can be suppressed.

(f) A control register or the like is not provided as dedicated hardware of the data transfer apparatus itself. Therefore, it is not necessary to take into consideration of a complicated operation condition such as conflict with a write operation from the CPU. This can contribute toward suppressing an increase in the physical scale.

Meanwhile, with the data transfer apparatus in which data transfer information is stored in the storage apparatus such as described above, even when a transfer factor of data to be currently transferred is identical to the previous transfer factor, the current data transfer information is again acquired without using the previously used data transfer information. Accordingly, from the viewpoint of acceleration of data transfer processing, the time that is actually not necessary is wasted.

Focusing on this problem, Japanese Unexamined Patent Application Publication No. 2001-160025 (Patent Literature 3) proposes a data transfer apparatus in which, when a transfer factor of data to be transferred is identical between the previous case and the current case, the known transfer information previously used is again used, to thereby achieve acceleration of data transfer.

Further, Japanese Unexamined Patent Application Publication No. 2004-021401 (Patent Literature 4) discloses acceleration in the data transfer apparatus, in which, in writing back data transfer information to the storage apparatus after execution of data transfer, whether or not write-back is necessary is determined depending on whether or not the data transfer information is updated. As to information whose write-back is not necessary, a cycle of writing back the data transfer information register to the memory is not performed.

Further, Japanese Unexamined Patent Application Publication No. 2000-194647 (Patent Literature 5) discloses unit that improves convenience of the data transfer apparatus, which includes an arithmetic logic unit that is capable of comparing between data previously set in the data transfer apparatus and data to be transferred and is capable of performing simple operations.

SUMMARY

Though the data transfer apparatus of Patent Literature 3 is advantageous in the suppressed CPU load and improved efficiency of the data transfer apparatus, data transfer information held in the data transfer apparatus is one in number. Accordingly, in the case where a plurality of activation factors occur at similar frequencies, data transfer information is less likely to be used again, and acceleration is also less likely to be achieved.

Further, though the data transfer apparatus of Patent Literature 5 is advantageous in the suppressed CPU load and improved convenience of the data transfer apparatus, for example considering the device control application, in many cases, there is limitation on the procedure of reading/writing bits and on the period in which a bit manipulation is enabled. Therefore, a bit manipulation method addressing such problems is desired.

Other problems and novel features of the present invention will become apparent from the description and accompanying drawings of the present application.

According to one embodiment, a data transfer apparatus 102 of an MCU 100 checks information of a status register, to determine whether to use a transfer information set held in register files or to read a transfer information set from a storage apparatus and to rewrite a prescribed one of the register files. The data transfer apparatus 102 performs data transfer based on the transfer information set stored in one of the register files.

According to one embodiment, when a bit manipulation is specified by information that specifies a bit manipulation, the data transfer apparatus 102 of the MCU 100 reads the transfer information set from storage apparatus onto the data transfer apparatus 102, and reads a specified address, to execute the specified bit manipulation.

Note that, embodiments of the present invention can be realized by replacing the apparatus in the above-described one embodiment by a method or a system. Alternatively, a program that causes a computer to execute the process of the apparatus or part of the apparatus, an imaging apparatus including such an apparatus and the like can also be embodiments of the present invention.

According to the above-described one embodiment, the advantage of a data transfer apparatus in which data transfer information is stored on a general storage apparatus (RAM) is maintained. Thus, various requests in a device control application are flexibly satisfied. On the other hand, data transfer can be accelerated because read/write operations of data transfer information stored in the storage apparatus are omitted.

BRIEF DESCRIPTION OF THE DRAWINGS

The above and other aspects, advantages and features will be more apparent from the following description of certain embodiments taken in conjunction with the accompanying drawings, in which:

FIG. 27 is a diagram showing data transfer information according to a first example of the sixth embodiment;

FIG. 30 is a diagram showing data transfer information according to a second example of the sixth embodiment;

FIG. 33 is a diagram showing data transfer information according to a third example of the sixth embodiment;

FIG. 35 is a diagram showing data transfer information according to a fourth example of the sixth embodiment;

FIG. 41 is a diagram showing data transfer information according to the variation of the sixth embodiment;

FIG. 44A is a diagram showing data transfer information according to the variation of the sixth embodiment;

DETAILED DESCRIPTION

<First Embodiment>

Figure 1:
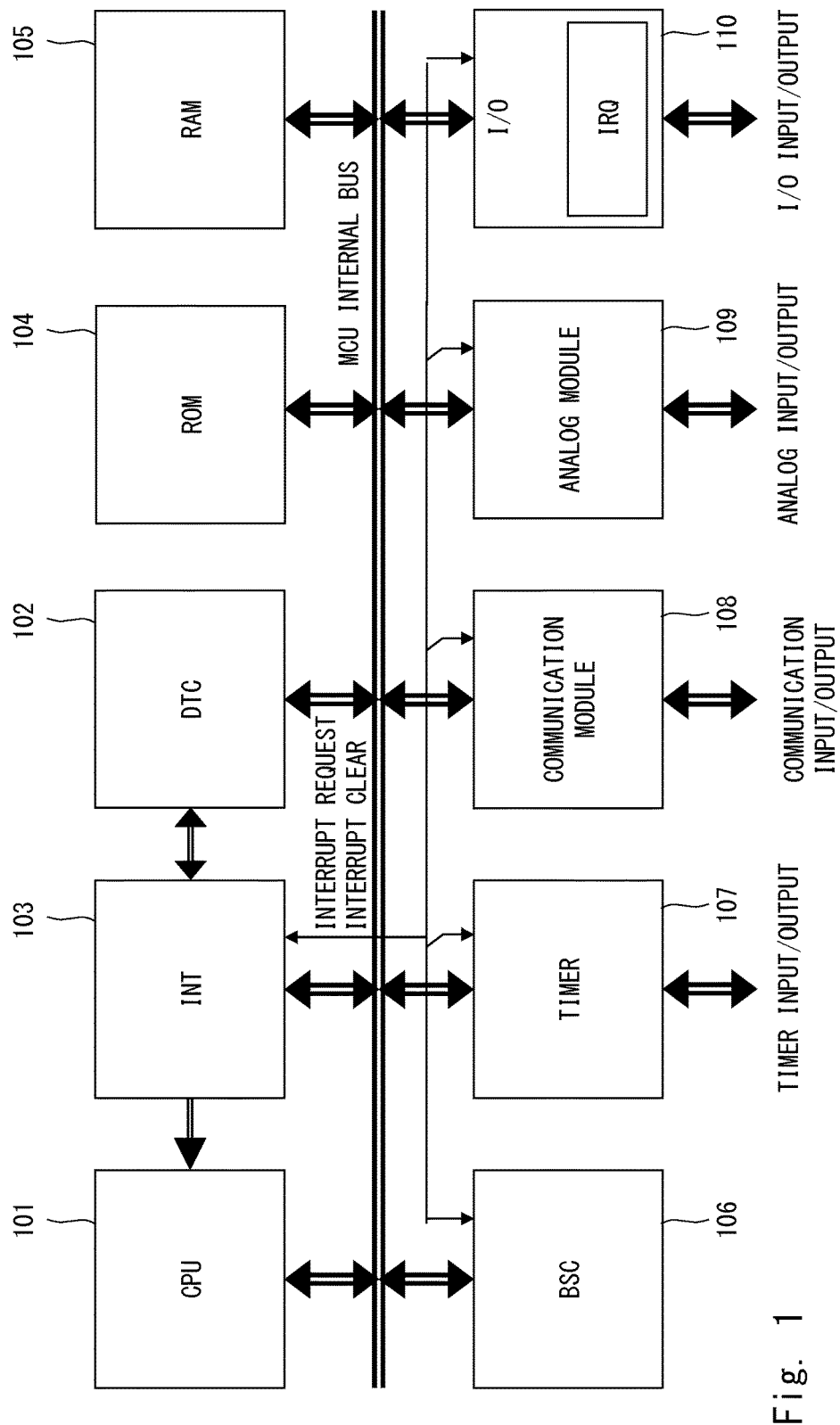
FIG. 1 is a diagram showing the configuration of an MCU 100 according to a first embodiment.

Firstly, a description will be given of the configuration of a microcomputer (MCU) 100 according to a first embodiment with reference to the block diagram of FIG. 1.

The MCU 100 is configured by a central processing unit (CPU) 101, a data transfer controller (DTC) 102, an interrupt controller (INT) 103, read-only memory (ROM) 104, random-access memory (RAM) 105, a bus controller (BSC) 106, a timer 107, a communication module 108 such as a serial communication interface, an analog module 109 such as an A/D converter and a D/A converter, an input/output port (I/O) 110, and not-shown functional blocks or modules of reset control, operation mode control and the like. These are connected to one another by an MCU internal bus (master and slave buses).

In the MCU 100, the CPU 101 principally performs operations. The CPU 101 reads instructions mainly from the ROM 104 and operates accordingly. The DTC 102 performs data transfer in place of the CPU 101 based on the setting of the CPU 101.

The INT 103 receives interrupt requests from the timer 107, the communication module 108, the analog module 109 and the like, and interrupt requests from the I/O 110 based on a plurality of external interrupt request signals from the outside of the MCU 100, and outputs an interrupt request or a data transfer request to the CPU 101 or the DTC 102. Further, when the INT 103 starts or ends a process triggered by an interrupt signal, the INT 103 outputs an interrupt clear signal for clearing the interrupt, in association with the interrupt signal or an interrupt factor flag of the timer 107, the communication module 108, the analog module 109, or the I/O 110.

The BSC 106 receives bus request signals from the CPU 101 and the DTC 102 and arbitrates in the occupation of the MCU internal bus (the master bus), to output a not-shown bus-use permission signal. The BSC 106 interfaces with the CPU 101 and the DTC 102 as to a bus request, a bus acknowledge, a bus command, wait, addresses, data and the like, to allow the CPU 101 and the DTC 102 to read/write from/to the RAM 105 or other functional blocks or modules connected to the internal bus of the MCU 100.

Figure 2:
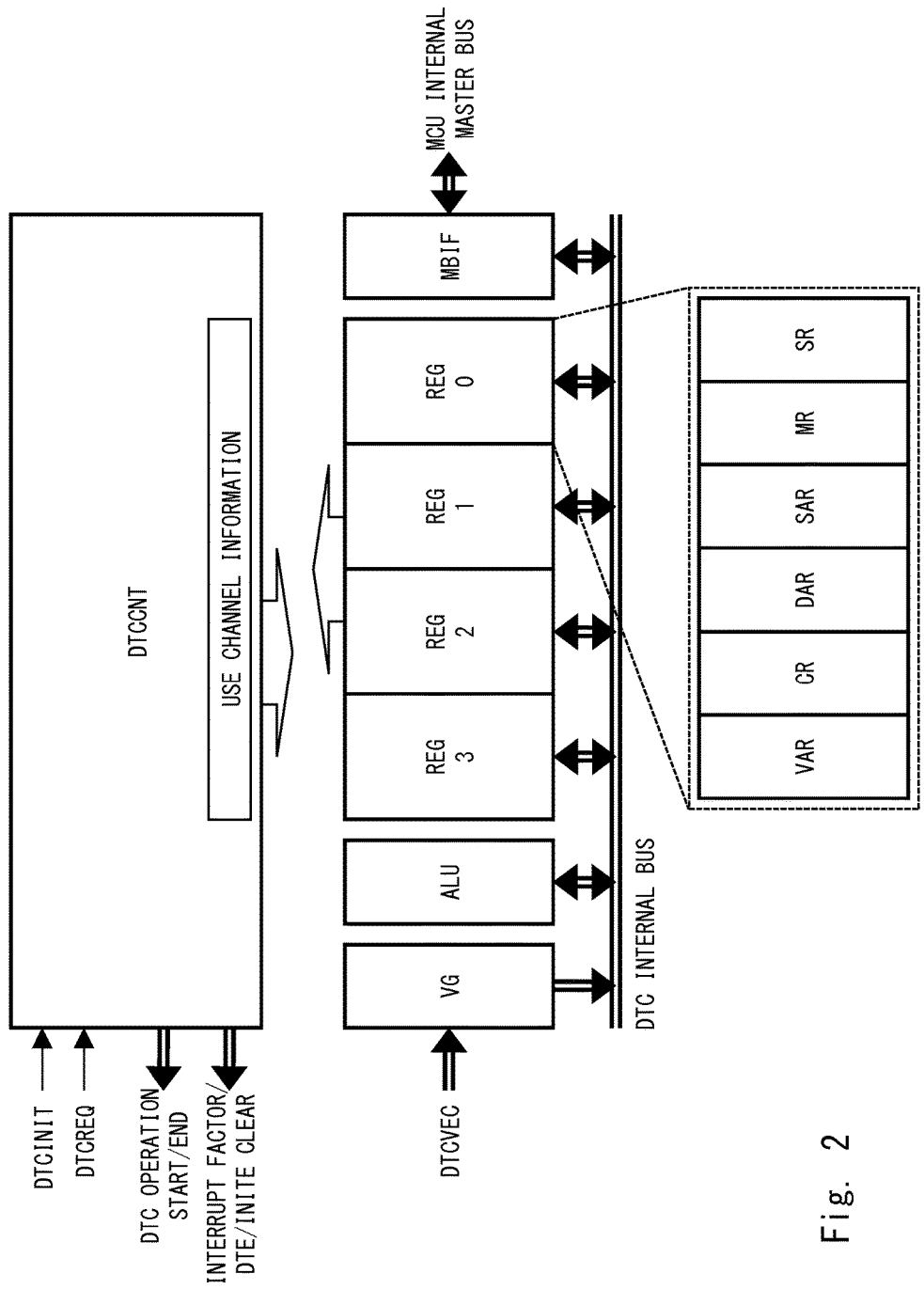
FIG. 2 is a diagram showing the configuration of a DTC 102 according to the first embodiment.

FIG. 2 is a block diagram showing the configuration of the DTC 102.

The DTC 102 includes a data transfer control block (DTCCNT), a bus interface (MBIF), a vector generation block (VG), four-channel register files (REG0 to REG3), and an arithmetic logic unit (ALU).

Each register file includes a vector address register (VAR), a mode register (MR), a source address register (SAR), a destination address register (DAR), a counter register (CR), and a status register (SR).

The DTCCNT has, as the interface to the INT 103, inputs of DTCINIT, DTCREQ, and DTCVEC, and outputs of interrupt factor/DTE/INITE clear, and DTC operation start/end. Further, the interface (MBIF) with the internal master bus of the MCU 100 enables use of the internal bus of the MCU 100 as the bus master.

The DTCCNT controls the DTC 102, based on input signals such as DTCREQ from the INT 103 and the content of the MR. Further, the DTCCNT outputs interrupt factor/DTE/INITE clear signals and the like to the INT 103. The DTCCNT includes use-channel information storing unit. When the DTC is activated, the DTCCNT clears an interrupt factor flag or a DTE bit, and holds the channels of the register files that are used until the DTC stops.

The MBIF interfaces between the DTC internal bus and the internal master bus of the MCU 100. The interface includes a bus request, a bus acknowledge, a bus command, wait, addresses, data and the like.

The VG generates a vector address according to an interrupt vector number DTCVEC provided from the INT 103. For example, the VG multiplies the DTCVEC by four and adds a prescribed offset.

The VAR stores the starting address of data transfer information read from the vector address.

The MR, the SAR, the DAR, and the CR store data transfer information subsequently read from the data transfer information starting address.

The SR holds the vector number of data transfer information held by the pertinent register file.

The ALU performs arithmetical operations, logical operations, shift operations and the like.

While not shown, there are a plurality of internal buses of the DTC 102. The internal buses allow the above-described contents of the SAR, the DAR, and the CR to be operated by the ALU.

Figure 3:
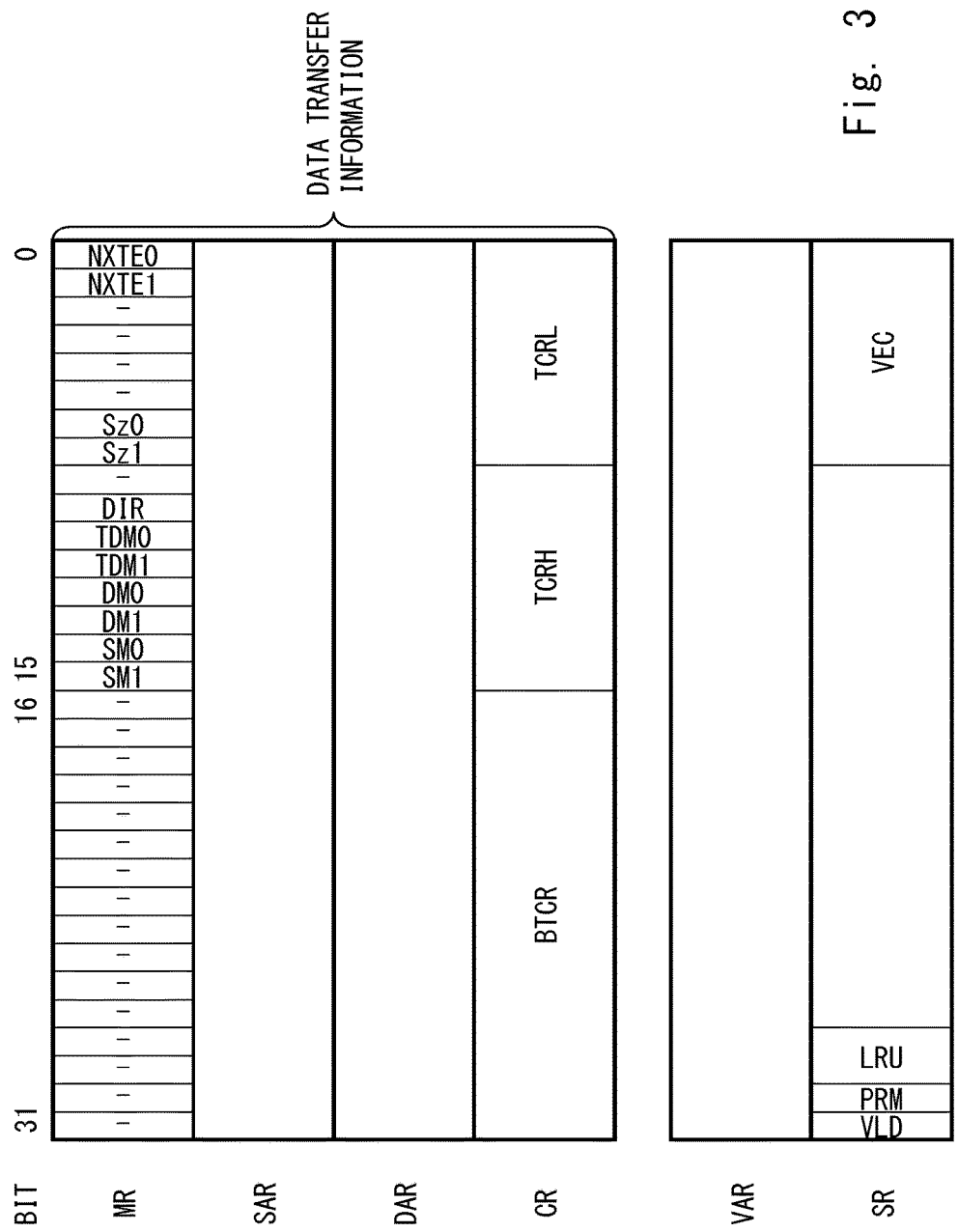
FIG. 3 is a diagram showing a register file and data transfer information according to the first embodiment.

FIG. 3 shows an example of the register file and the data transfer information (a transfer information set) of the DTC 102 according to the first embodiment.

The data transfer information of the DTC 102 is formed by the mode register (MR), the source address register (SAR), the destination register (DAR), and the counter register (CR).

The register file of the DTC 102 includes the above-noted data transfer information, as well as the vector address register (VAR) and the status register (SR).

The CR is divided into a block transfer count register (BTCR) and a transfer count register (TCR). The TCR is divided into higher eight bits (TCRH) and lower eight bits (TCRL). The CR operates according to any data transfer mode which will be described later.

As described above, the register file circuits of four channels are provided in the DTC. The data transfer information pieces (MR, SAR, DAR, CR) to be stored in the register files are arranged on a prescribed data transfer information arrange area such as RAM, on the address space of the CPU by a required number of sets.

The bit configuration of the mode register (MR) is as follows. Bits 15 and 14 are SM1 and SM0 bits for specifying whether to increment, decrement, or fix the SAR after data transfer.

Bits 13 and 12 are DM1 and DM0 bits for specifying whether to increment, decrement, or fix the DAR after data transfer.

Bits 11 and 10 are TMD1 and TMD0 bits for selecting the data transfer mode. When TMD1 and TMD0 bits are cleared to 00, a normal mode is entered. In the normal mode, for a single activation, data transfer is performed once from the address represented by the SAR to the address represented by the DAR.

Thereafter, as specified by the SM1, SM0, DM1, and DM0 bits, the SAR and the DAR are manipulated and the CR is decremented. This is repeated upon every occurrence of an activation factor and for the number of times specified by the CR. Then, when data transfer for the number of times specified by the CR has finished, the DTC operation is prohibited, and the interrupt served as the activation factor is requested of the CPU.

When the TMD1 and TMD0 bits are set to 01, a repeat mode is entered. When the TMD1 and TMD0 bits are set to 10, a block transfer mode is entered. The repeat mode and the block transfer mode can be realized by known techniques.

Bit 9 is a DIR bit for selecting which one of the transfer source and the transfer destination is to be a repeat area or a block area.

Bits 7 and 6 are Sz1 and Sz0 bits for selecting whether one data transfer is performed in a byte size, a word size, or a long word size.

Bit 1 is a NXTE1 bit for selecting, in response to one activation factor, whether data transfer is to be ended or next data transfer is to be performed. When the NXTE1 bit is cleared to 0, after a data transfer information read operation and a data transfer operation are performed, the data transfer information is written, and the DTC operation ends.

Further, when this NXTE1 bit is set to 1, after a data transfer information read operation and a data transfer operation are performed, the data transfer information is written. Data transfer information is further read from a subsequent address and a data transfer operation specified by this data transfer information is performed. Then, the data transfer information is written. This procedure is referred to as chain transfer.

Bit 0 is a NXTE0 bit for specifying whether to perform the chain transfer when the CR reaches 0.

The bit configuration of the status register (SR) is as follows.

Bit 31 is a VLD flag, and represents that the data transfer information held by the pertinent register file is valid. The VLD flag is cleared to 0 by reset. The VLD flag is set to 1 when data transfer information is stored in the pertinent register file. The VLD flag is cleared to 0 when execution of prescribed data transfer is finished.

Bit 30 is a PRM flag bit, and represents that the pertinent register file has performed data transfer information storage by DTCIR write, which will be described later.

Bits 29 and 28 are LRU flags. The value should be varied (0 to 3) among the register file channels. Any varying method can be employed. For example, the channel that was used earlier may assume a greater value, and the channel that was used later may assume a smaller value.

Bits 7 to 0 hold vector when data transfer information is stored in the pertinent register file.

Figure 4:
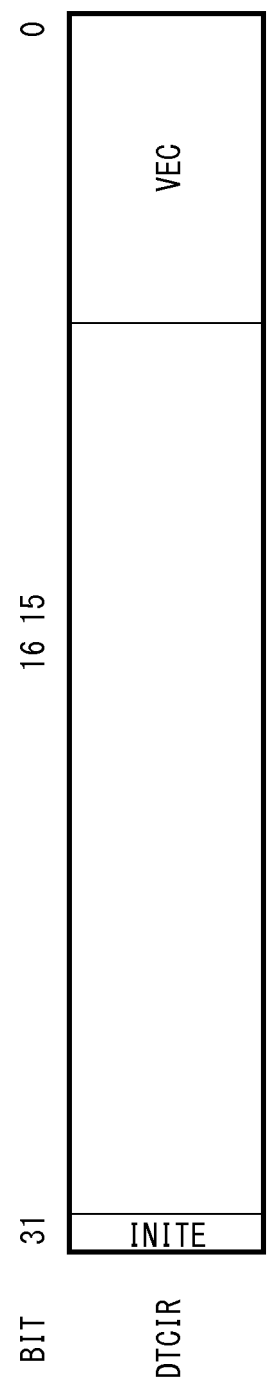
FIG. 4 is a diagram showing a data transfer information initialize register (DTCIR) according to the first embodiment.

FIG. 4 shows a data transfer information initialize register (DTCIR) of the DTC 103 according to the first embodiment.

Bit 31 of the DTCIR is an INITE bit, and bits 7 to 0 are the vector number. Though not particularly limited, the DTCIR is provided by one in number in the interrupt controller (INT).

When the CPU 101 sets the INITE bit to 1, the INT 103 provides DTCINIT and DTCVEC to the DTC 102. The DTCVEC in this case is based on bits 7 to 0 of the DTCIR. Accordingly, the DTC 102 reads a data transfer information starting address and data transfer information. When this read operation has finished, the DTC 102 clears the INITE bit to 0.

In the present embodiment, since the register files of the DTC 102 are provided for four channels, the CPU 101 can execute the foregoing operation to four vectors.

Note that, in the case where an activation factor that is required after initialization cannot be expected, it is also possible to activate the DTC 102 without performing the above-described initialization operation.

Figure 5:
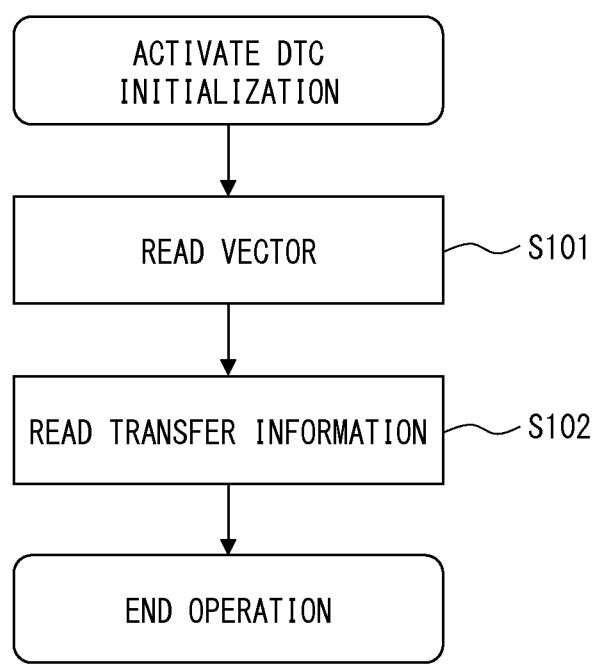
FIG. 5 is a diagram showing an initialization process of the DTC 102 according to the first embodiment.

FIG. 5 is a flowchart of initializing the DTC 102 according to the first embodiment.

In the case where a DTC initialization is activated, the interrupt controller (INT 103) provides the DTC 102 with DTCINIT and DTCVEC based on the DTCIR write described above.

S101: The DTCCNT of the DTC 102 reads a vector area that corresponds to the provided DTCVEC (VR). The content read here is the starting address of a memory area where data transfer information exists.

S102: The DTCCNT reads the data transfer information based on the acquired starting address (IR). The DTCCNT stores the read data transfer information in one of the register files of the DTC 102. At this time, by referring to the VLD and LRU flags of each status register (SR), a register file of VLD=0 (invalid) or a register file whose LRU is the greatest (oldest) is used. When there are a plurality of invalid register files, they are used in the ascending order of channel numbers.

When the DTCCNT has stored the data transfer information, the DTCCNT sets the VLD and PRM flags of the SR to 1. Further, the DTCCNT provides the INT with an INITE clear signal.

Figure 6:
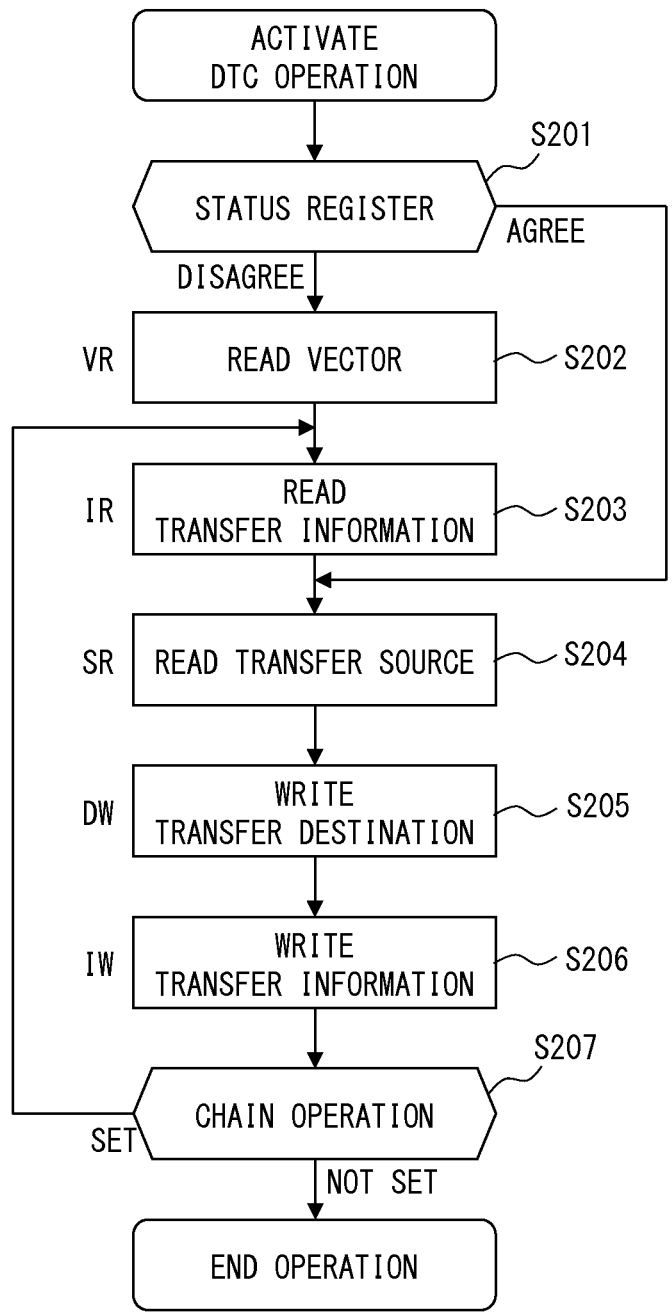
FIG. 6 is a diagram showing data transfer processing of the DTC 102 according to the first embodiment.

FIG. 6 is a flowchart of a data transfer operation of the DTC 102 according to the first embodiment.

The CPU 101 previously writes required data transfer information to a prescribed transfer information address area and sets the DTE bit corresponding to an interrupt factor to serve as an activation factor to 1. In this state, when such an interrupt occurs and a DTC operation is activated, the interrupt controller (INT) provides DTCREQ and DTCVEC to the DTC 102.

S201: The DTCCNT of the DTC 102 compares the DTCVEC against the vector number held in the status register in each register file. When the DTCVEC agrees with the valid vector status, it unit that the pertinent register file held in the DTC can be used. Accordingly, using the register file, a corresponding register set is used.

S202: When the DTCVEC does not agree with the valid vector status, the DTCVEC reads a vector area that corresponds to the provided DTCVEC (VR). The content read here is the starting address of data transfer information.

S203: The DTCCNT reads the data transfer information from the starting address (IR). The DTCCNT stores the read data transfer information in one of the register files of the DTC. At this time, by referring to the VLD and LRU flags of each status register (SR), a register file of VLD=0 (invalid) or a register file whose LRU is the greatest (oldest) is used. When the DTCCNT has stored the data transfer information, the DTCCNT sets the VLD flag of the SR to 1, and clears the PRM flag to 0.

S204: The DTCCNT reads a transfer source address specified by the SAR, according to the held or read data transfer information (SR).

S205: The DTCCNT writes the data read from the transfer source address to a transfer destination address specified by the DAR (DW). The DTCCNT also performs other operation, e.g., decrements the CR. This data transfer procedure can be realized by known techniques.

S206: The DTCCNT performs a transfer information rewrite determination. That is, when the data transfer information is updated, the DTCCNT writes the updated data transfer information to the original address, i.e., the starting address acquired in S202 (IW). When the CR reaches 0 and data transfer of a prescribed number of times has finished, the DTCCNT provides a DTE clear signal to the INT. At the same time, the DTCCNT clears the VLD flag of the SR of every channel specified by the use channel information of the DTCCNT.

When the data transfer of a prescribed number of times of the register file has not finished, the DTCCNT provides an interrupt factor clear signal to the INT.

The DTCCNT causes the VAR to hold a prescribed address based on the data transfer information. For example, the DTCCNT causes the VAR to hold the next address of the data transfer information.

S207: When a chain operation is specified, the DTCCNT reads the next data transfer information, based on the VAR of the pertinent register file (IR). The read data transfer information is stored in one of the register files of the DTC, as described in the foregoing. The operations that follow are performed as in the foregoing description.

Figure 7:
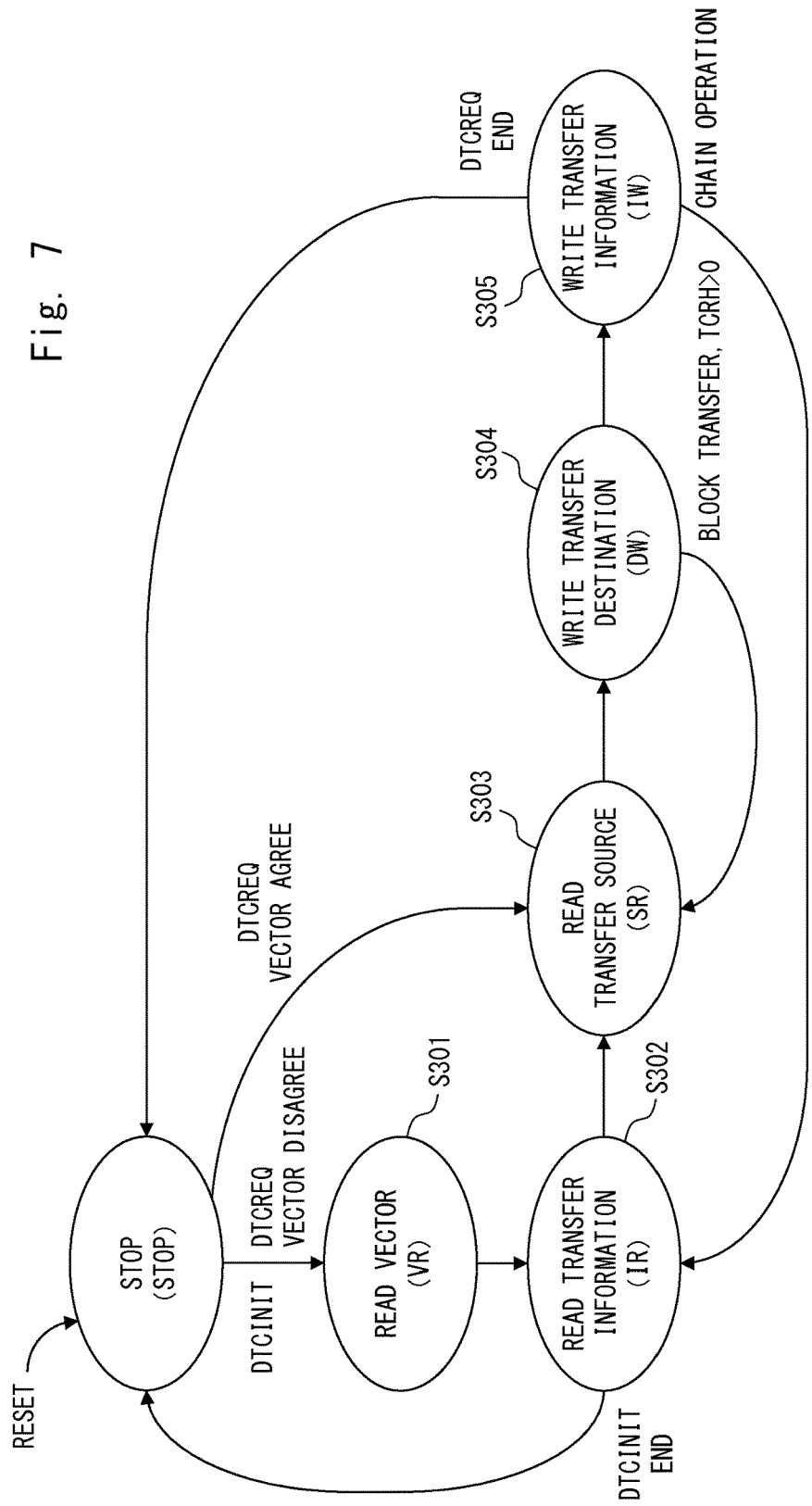
FIG. 7 is a diagram showing data transfer processing of the DTC 102 according to the first embodiment.

FIG. 7 is a state transition diagram in a data transfer operation of the DTC 102 according to the first embodiment. Such a state transition is mainly realized in the DTCCNT of the DTC 102.

The DTC 102 starts to operate upon receipt of DTCINT and DTCREQ from the INT.

When DTCREQ is provided, the DTCCNT of the DTC 102 compares the provided DTCREQ against the vector of the SR of the register files in the DTC. Further, the DTCCNT determines which one of the register files is to be used. When DTCINT is provided, and when DTCREQ is provided and DTCREQ does not agree with the vector, the state transits to the VR state. When DTCREQ is provided and DTCREQ agrees with the vector, the state immediately transits to the SR state.

S301 (VR state): The DTCCNT reflects the provided DTCVEC on the SR. The DTCCNT reads the starting address of data transfer information stored in the vector area (data transfer information starting address arrange area), based on a vector address generated by the VG according to DTCVEC. The DTCCNT stores the read content in the VAR of the register file to be used. The state transits to the IR state.

S302 (IR state): The DTCCNT reads the data transfer information stored in the data transfer information arrange area at the starting address. The content of the data transfer information is the MR, the DR, the SAR, the DAR, and the CR. When the transition to S301 has been caused by DTCINT, the DTCCNT sets the VLD and PRM flags of the SR to 1 and clears the INITE bit. Then the state returns to the stop state. When the transition has been caused by DTCREQ, the DTCCNT sets the VLD flag of the SR to 1 and clears the PRM flag to 0. Then the state transits to the SR state.

S303 (SR state): The DTCCNT reads the content of the transfer source address, based on the content of the SAR. According to the content of the MR, for example the SAR is incremented. Subsequently, the state transits to the DW state.

D304 (DW state): The DTCCNT writes the data read from the transfer source address of the RAM 105 to the transfer destination address, based on the content of the DAR. The DTCCNT for example increments the DAR according to the content of the MR. Further, the DTCCNT for example decrements the CR. Subsequently, the state transits to the IW state.

Here, when it is the block transfer mode, the SR and DW states are repeated for the number of times specified by the TCR.

S305 (IW state): Out of the contents of the DR, the SAR, the DAR, and the CR, the DTCCNT writes back the updated content on the data transfer information arrange area according to the content of the VAR.

Here, when it is the chain transfer, the IR, SR, DW, and IW states are subsequently entered, and data transfer is performed according to other data transfer information read in the IR.

On the other hand, when it is not the chain transfer, the DTCCNT clears the interrupt factor flag or the DTE bit served as the activation factor according to the content of the CR, and the state returns to the stop state.

(Variation)

Figure 8:
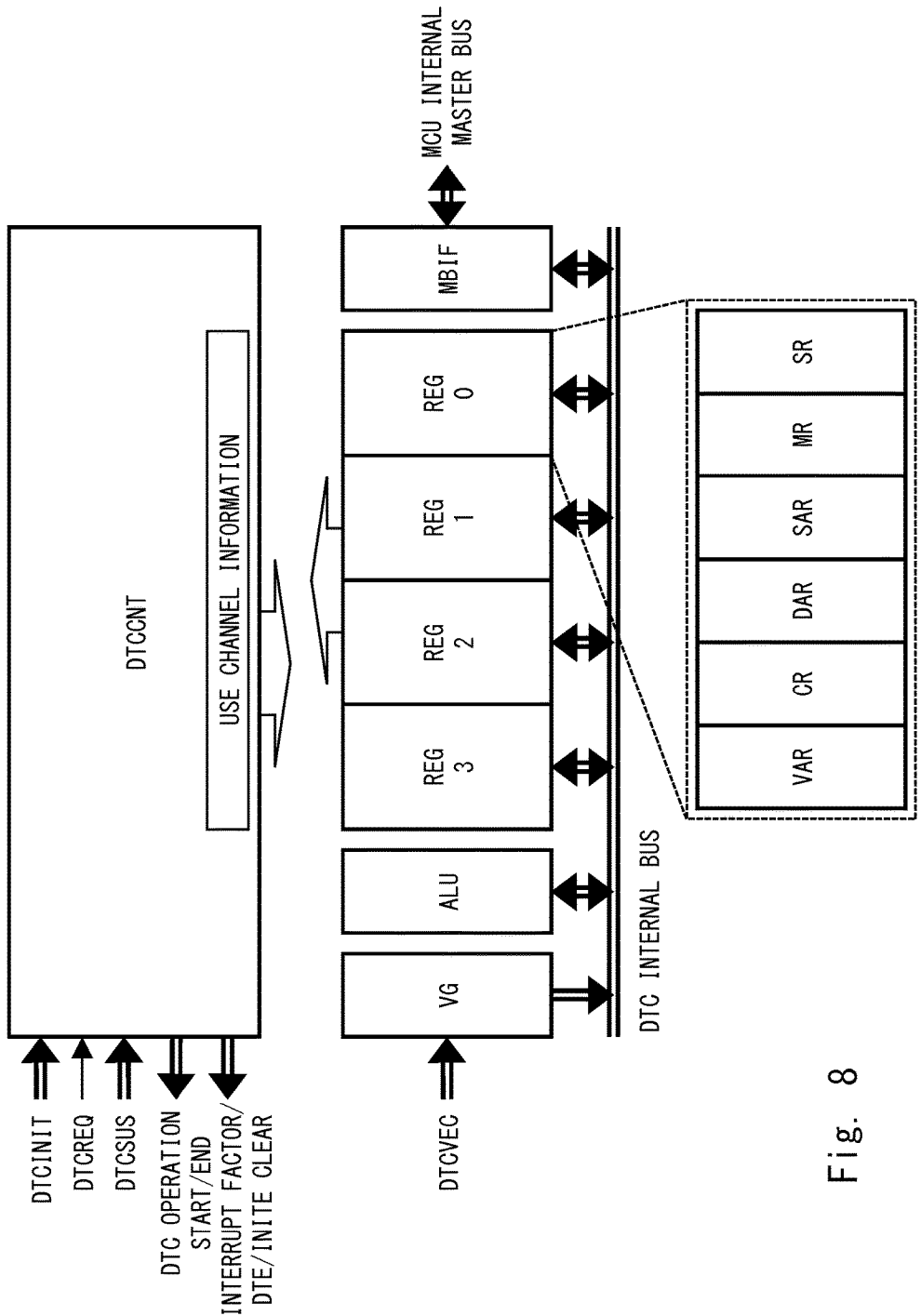
FIG. 8 is a diagram showing the configuration of a DTC 102 according to a variation of the first embodiment.

FIG. 8 is a block diagram of a variation of the DTC 102.

The DTCCNT receives DTCINIT signals as DTCINIT1 to DTCINIT3 corresponding to channels 1 to 3. Further, the DTCCNT receives DTCSUS signals as DTCSUS1 to DTCSUS3 corresponding to channels 1 to 3.

Figure 9:
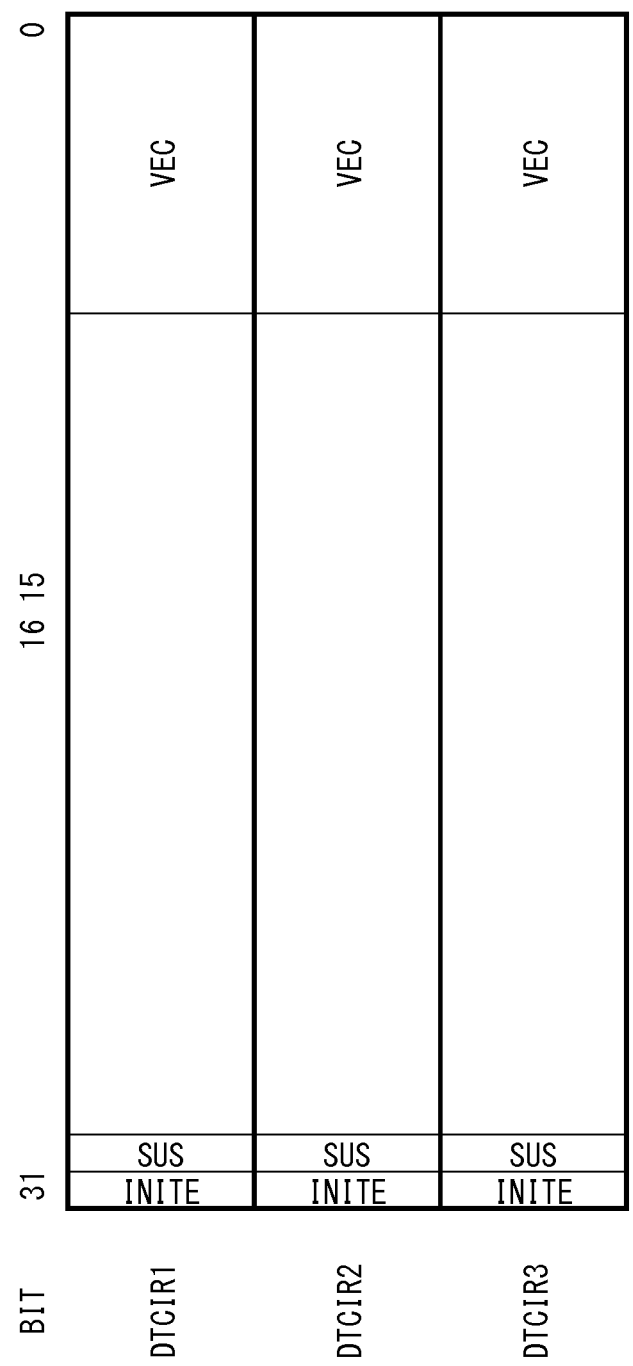
FIG. 9 is a diagram showing a data transfer information initialize register (DTCIR) according to the variation of the first embodiment.

FIG. 9 shows data transfer information initialize registers (DTCIR1 to DTCIR3) of the DTC 103 according to the variation of the first embodiment.

The DTCIR is modified to DTCIR1 to DTCIR3 corresponding to the channels 1 to 3. DTCINIT1 to DTCINIT3 are output so as to correspond to the DTCIR1 to DTCIR3. Further, each of the DTCIR1 to DTCIR3 has an SUS bit at bit 30.

A write operation to the DTCIR1 to DTCIR3 is configured to produce DTCINIT1 to DTCINIT3, and to store data transfer information in the register files 1 to 3 in the DTC.

Specifically, when the held data transfer information is valid and the VLD and PRM flags of the SR are set to 1, the data transfer information is to be held irrespective of the value of the LRU flag. Further, write-back of the data transfer information is not to be performed irrespective of update of the data transfer information.

Thus, since the DTCCNT does not read data transfer information, fast data transfer can be carried out with the register files 1 to 3. So-called real-time processing can be improved by reducing the time that is taken from an occurrence of an event serving as the activation factor until execution of data transfer. In the case where, following data transfer of a prescribed number of times, similar data transfer is to be carried out, the data transfer information may be arranged on the ROM. Then, a program to be executed by the CPU for arranging the data transfer information on the RAM can be eliminated.

By fixing the activation factors which occur highly frequently to the register files 1 to 3 in accordance with the usage of the microcomputer, the overall processing can be accelerated.

Further, when the SUS bit is set to 1, DTCRSUS1 to DTCRSUS3 signals are provided, to clear the VLD and PRM flags of the SR of the corresponding register files to 0.

As in the conventional techniques, with the register file 0, the DTCCNT reads data transfer information in response to DTCREQ and DTCVEC provided from the interrupt controller (INT) and operates accordingly. Further, data transfer information can be reused through use of the SR of the register file 0.

Also in the case where the PRM flag of the SR of the register files 1 to 3 is cleared to 0, operations similar to those of the channel 0 are performed. For example, in the case where data transfer of the register files 1 to 3 has completed and new initialization is awaited, other activation factor can efficiently use this period. The same holds true for the case where the SUS bit is set to 1 and the VLD and PRM flags are cleared to 0.

<Second Embodiment>

Figure 10:
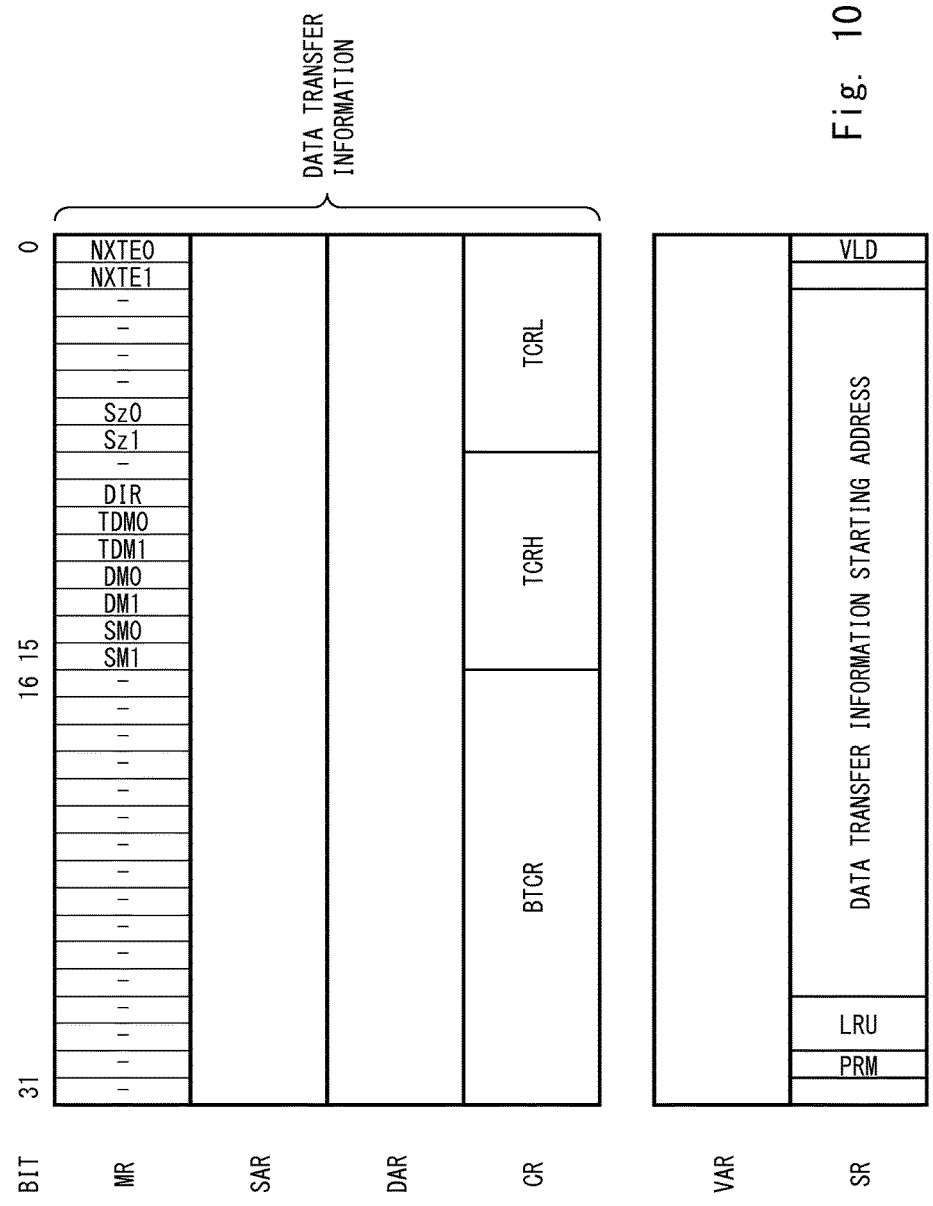
FIG. 10 is a diagram showing a register file and data transfer information according to a second embodiment.

FIG. 10 shows a register file and data transfer information (a transfer information set) of a DTC 102 according to a second embodiment.

The second embodiment is different from the first embodiment in the configuration of the status register (SR). The bit configuration of the SR is as follows.

Bits 27 to 2 are a data transfer information starting address. The data transfer information is in a 32-bit (long word) unit, and low-order 2 bits are regarded as 00.

Bit 0 is a VLD flag, and represents that the data transfer information held by the pertinent register file is valid. Bit 0 is cleared to 0 by reset. Bit 0 is set to 1 when data transfer information is stored on the pertinent register file. Bit 0 is cleared to 0 when execution of prescribed data transfer has finished.

When the address space of the CPU is smaller than 4 GB, or when the address space in which data transfer information can be arranged can be reduced, it is possible to provide PRM and LRU flags in bits 30 to 28. When the address space is great and the address space in which data transfer information can be arranged cannot be reduced, the PRM and LRU flags may not be provided.

Figure 11:
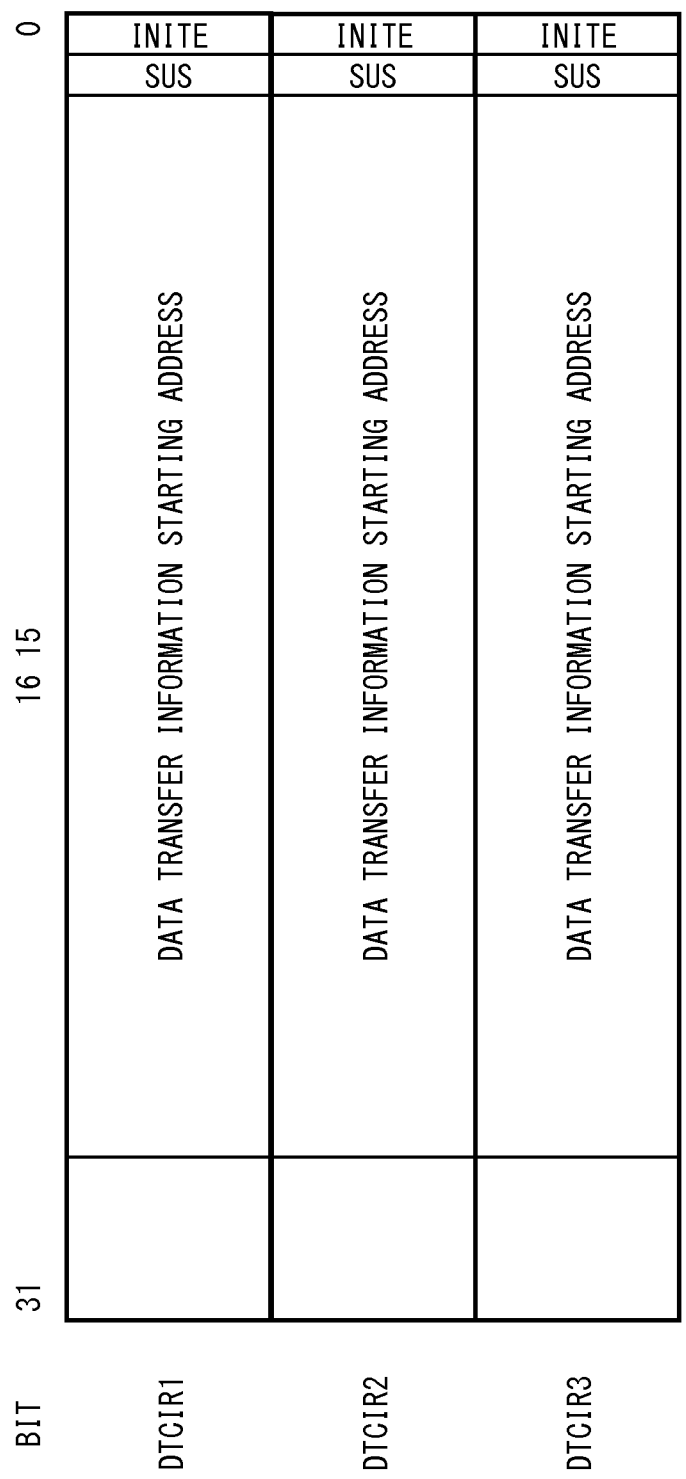
FIG. 11 is a diagram showing a data transfer information initialize register (DTCIR) of a DTC 103 according to the second embodiment.

FIG. 11 shows data transfer information initialize registers (DTCIR1 to DICIR3) of the DTC 103 according to the second embodiment.

Bits 27 to 2 of the DTCIR are a data transfer information starting address. Bit 1 is an SUS bit and bit 0 is an INITE bit.

When the CPU 101 sets the INITE bit to 1, DTCINIT and DTCVEC are provided to the DTC. The number of bits of the DTCVEC in this case is sign-extended, to provide the DTCIR with bits 27 to 2. Accordingly, the DTC reads data transfer information. When this read operation has completed, the DTC clears the INITE bit to 0.

Figure 12:
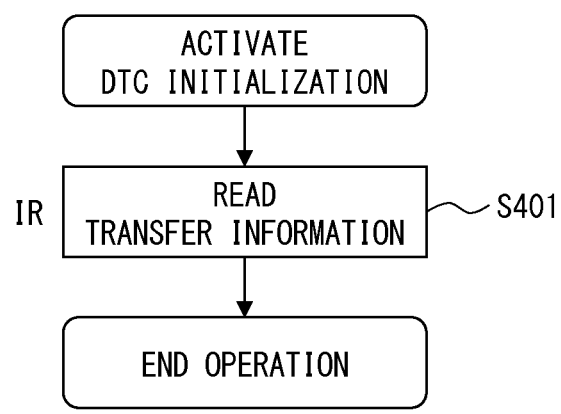
FIG. 12 is a diagram showing an initialization process of the DTC 102 according to the second embodiment.

FIG. 12 shows a flowchart of initializing the DTC 102 according to the second embodiment.

When initialization of the DTC 102 is activated, the interrupt controller (INT 103) provides the DTC 102 with DTCINIT and DTCVEC based on the DTCIR write. DTCVEC represents the starting address of data transfer information.

S401: The DTCCNT of the DTC 102 reads data transfer information that corresponds to the provided DTCVEC (data transfer information starting address) (IR). The DTCCNT stores the read data transfer information in one of the register files of the DTC. At this time, by referring to the VLD and LRU flags of each status register (SR), a register file of VLD=0 (invalid) or a register file whose LRU is the greatest (oldest) is used. When there are a plurality of invalid register files, they are used in the ascending order of channel numbers.

When the DTCCNT has stored the data transfer information, the the DTCCNT sets VLD and PRM flags of the SR to 1. Further, the DTCCNT provides the INT with an INITE clear signal.

Figure 13:
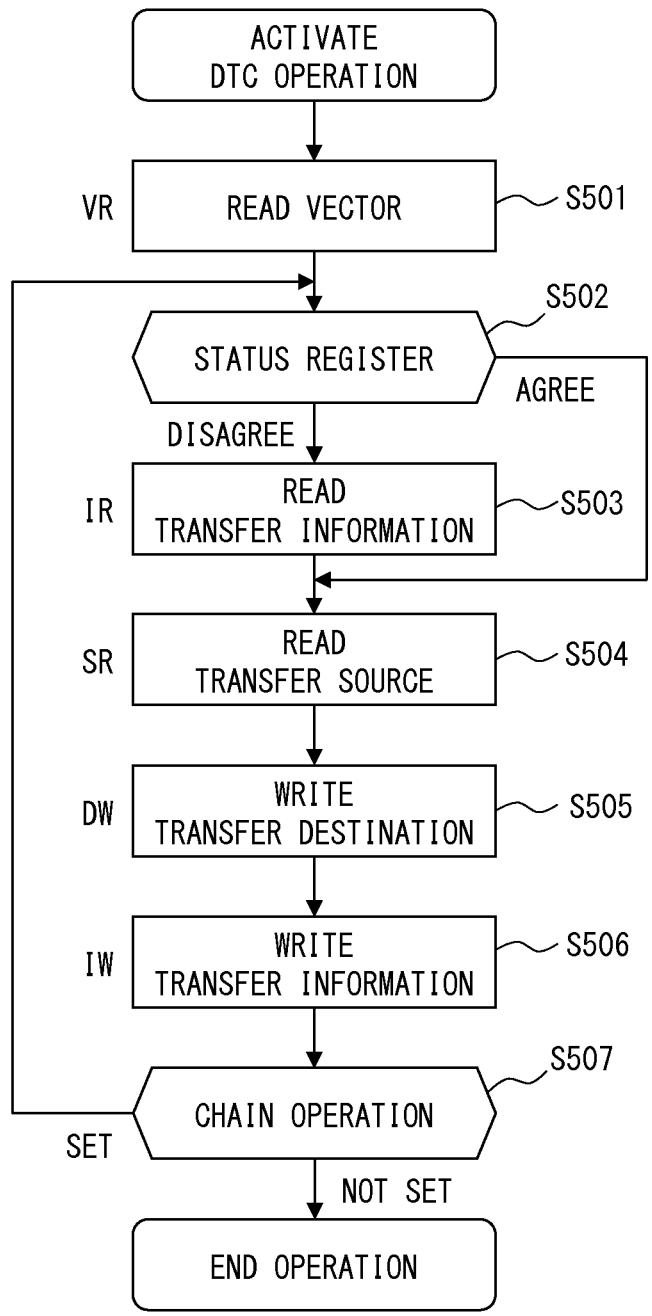
FIG. 13 is a diagram showing data transfer processing of the DTC 102 according to the second embodiment.

FIG. 13 is a flowchart of a data transfer operation of the DTC 102 according to the second embodiment.

When an event such as an interrupt occurs and an operation of the DTC 102 is activated, the interrupt controller (INT) provides DTCREQ and DTCVEC to the DTC 102.

S501: The DTCCNT reads a vector area that corresponds to the provided DTCVEC (VR).

S502: The DTCCNT compares the read data transfer information starting address against a data transfer information starting address that is held in the status register of each register file.

When the read data transfer information starting address agrees with a valid data transfer information starting address, the pertinent register file held in the DTC can be used. Accordingly, using the register file, a corresponding register set is used. The state transits to S504.

S503: When the read data transfer information starting address does not agree with a valid data transfer information starting address, the DTCCNT reads data transfer information based on the read data transfer information starting address (IR). The DTCCNT stores the read data transfer information in one of the register files of the DTC. At this time, by referring to the VLD and LRU flags of each status register (SR), a register file of VLD=0 (invalid) or a register file whose LRU is the greatest (oldest) is used. When the DTCCNT has stored the data transfer information, the DTCCNT sets the VLD flag of the SR to 1, and clears the PRM flag to 0.

S504: The DTCCNT reads a transfer source address specified by the SAR, according to the held or read data transfer information (SR).

S505: The DTCCNT writes the read data to a transfer destination address specified by the DAR (DW). The DTCCNT also performs other operation, e.g., decrement the CR. This data transfer procedure can be realized by known techniques.

S506: The DTCCNT performs a transfer information rewrite determination. That is, when the data transfer information is updated, the DTCCNT writes the updated data transfer information to the data transfer information starting address (IW). When the CR reaches 0 and data transfer of a prescribed number of times has finished, the DTCCNT provides a DTE clear signal to the INT. At the same time, the DTCCNT clears the VLD flag of the SR.

When the data transfer of a prescribed number of times of the register file has not finished, the DTCCNT provides an interrupt factor clear signal to the INT.

The DTCCNT causes the VAR to hold a prescribed address of the data transfer information. For example, the DTCCNT causes the VAR to hold the next address of data transfer information.

S507: When a chain operation is specified, the DTCCNT compares the next data transfer information starting address held by the VAR against data transfer information starting address that is held in the status register of each register file.

When the next data transfer information starting address held by the VAR agrees with the data transfer information starting address, the pertinent register file held in the DTC can be used. Accordingly, using such a register file, a corresponding register set is sued.

When the next data transfer information starting address held by the VAR does not agree with the data transfer information starting address, the DTCCNT reads data transfer information based on the next data transfer information starting address held by the VAR (IR). The DTCCNT stores the read data transfer information in one of the register files of the DTC, as described in the foregoing. The operations that follow are performed as in the foregoing description.

In the case where data transfer is performed for a plurality of times for one activation factor by chain transfer, data transfer information for every transfer can be held in the register files. In the case where data transfer information is shared by a plurality of activation factors also, this data transfer information can be held in the register files. Acceleration in transferring data that can be shared and is frequently used can be achieved.

Figure 14:
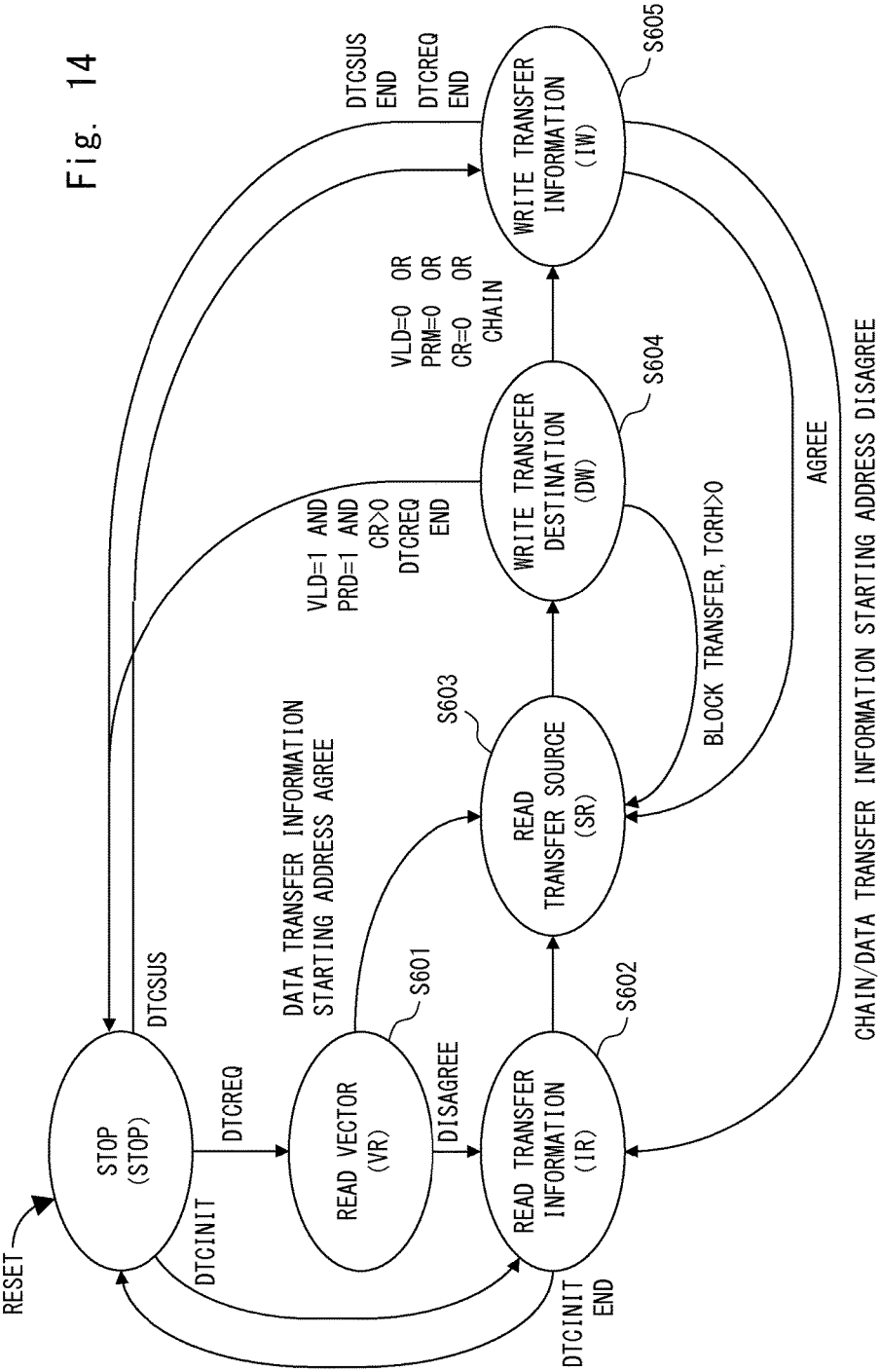
FIG. 14 is a diagram showing data transfer processing of the DTC 102 according to the second embodiment.

FIG. 14 is a state transition diagram of the DTC 102 according to the second embodiment.

When the DTCCNT of the DTC 102 is provided with DTCINT, the state transits to the IR state. When the DTCCNT is provided with DTCREQ, the state transits to the VR state. When the DTCCNT is provided with DTCSUS, the state transits to the IW state.

S601 (VR state): Based on the vector address generated by the VG according to the provided DTCREQ, the DTCCNT reads the starting address stored in the vector area (data transfer information starting address arrange area) of data transfer information. The DTCCNT compares the read data transfer information starting address against the data transfer information starting address of the SR of each register file in the DTC. Further, the DTCCNT determines which one of the register files is to be used.

When the data transfer information starting addresses does not agree with each other, the state transits to the IR state. On the other hand, when the data transfer information starting addresses agree with each other, the state immediately transits to the SR state.

S602 (IR state): When transition to the IR state has been triggered by DTCINT, the DTCCNT reads data transfer information stored in the data transfer information arrange area. The content is the MR, the DR, the SAR, the DAR, and the CR. Then, the DTCCNT sets the VLD and PRM flags of the SR to 1 and clears the INITE bit. Then, the state returns to the stop state.

When the state has transited from the VR state to the IR state, the DTCCNT reads data transfer information stored in the data transfer information arrange area according to the above-described starting address. The content is the MR, the DR, the SAR, the DAR, and the CR. Then, the DTCCNT sets the VLD flag of the SR to 1 and clears the PRM flag to 0, and the state transits to the SR state.

S603 (SR state): The DTCCNT reads the content of the transfer source address according to the content of the SAR. According to the content of the MR, the DTCCNT for example increments the SAR. Subsequently, the state transits to the DW state.

S604 (DW state): According to the content of the DAR, the DTCCNT writes data read from the transfer source address to the transfer destination address. According to the content of the MR, the DTCCNT for example increments the DAR. Further, the DTCCNT for example decrements the CR.

When both the VLD and PRD flags are set to 1, the data transfer information in the register files in the DTC is reused. Therefore, write-back of data transfer information is not performed and hence the state does not transit to the IW state. Note that, in the case where data transfer of a prescribed number of times has finished and the CR reaches 0, the state may transit to the IW state.

S605 (IW state): When the state has transited from the DW state to the IW state, the DTCCNT writes back any updated content of the MR, the DR, the SAR, the DAR, and the CR to the data transfer information arrange area according to the content of the VAR.

In the case of chain transfer, the DTCCNT compares the next data transfer information starting address represented by the VAR against the data transfer information starting address of the SR of the register file in the DTC. As in the manner described above, the state transits to the IR state or the SR state.

When it is not the case of chain transfer, according to the content of the CR, the DTCCNT clears the interrupt factor flag or the DTE bit served as the activation factor, and the state returns to the stop state. When data transfer of a prescribed number of times has finished and the DTE bit is cleared, the VLD and PRM flags of the SR are also cleared to 0.

When transition to the IW state has been triggered by DTCSUS, the DTCCNT clears the VLD and PRM flags of the SR to 0, and writes back the MR, the DR, the SAR, the DAR, and the CR to the data transfer information arrange area according to the content of the VAR.

(Variation)

Figure 15:
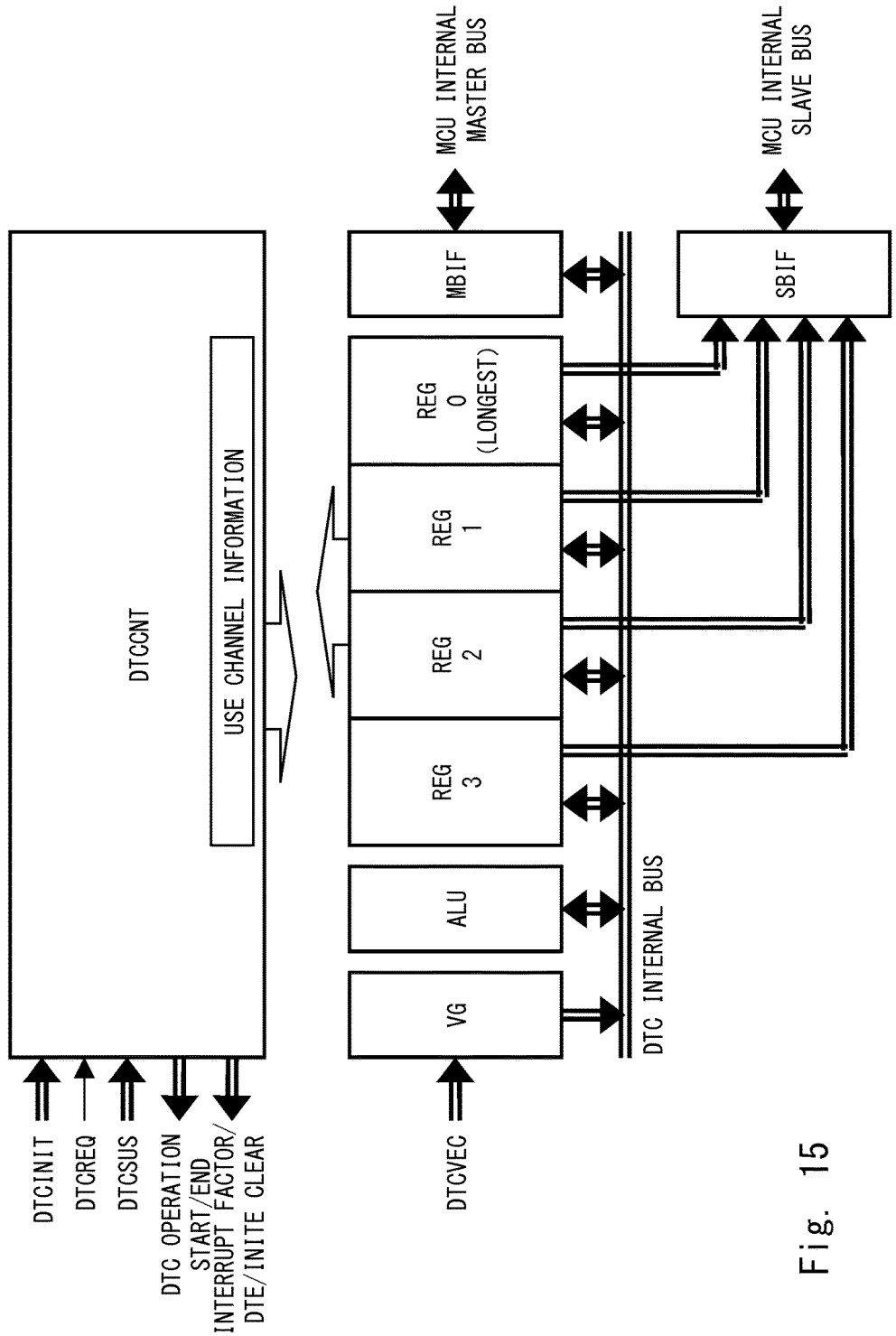
FIG. 15 is a diagram showing the configuration of a DTC 102 according to a variation of the second embodiment.

FIG. 15 is a block diagram of a variation of a DTC 102 according to the second embodiment.

In the variation, a bus interface (SBIF) is provided for interfacing with the MCU internal slave bus. The SBIF receives output of the SR of the register files in the DTC, such that the CPU 101 can read the SR via the MCU internal slave bus.

The CPU 101 can learn the state of the register files in the DTC 102 by reading the SR. Further, provision of the MCU internal slave bus realizes use of the register files by other function such as emulation.

In the present embodiment, the description has been given on the case where data transfer information is of 32 bits×four pieces (fixed). This is because, it is general to specify the mode of data transfer, the transfer source address, the transfer destination address, and the number of times of transfer.

On the other hand, data transfer information may be of variable length. For example, there may be included a format of data transfer information with a data register (32 bits×five pieces), or a format of data transfer information without any restriction on the number of times by invalidating the CR (32 bit×three pieces).

In such cases where data transfer information is of a variable length, the number of data transfer information pieces should be smaller than that of the registers included in a register file. Accordingly, register files that conform to the maximum data transfer information should be provided.

Alternatively, since the data that requires accelerated transfer is not necessarily the maximum data transfer information, just the channel 0 should be set as the register file that supports the maximum data transfer information, while the channels 1 to 3 may support smaller and frequently used data transfer information.

<Third Embodiment>

Figure 16:
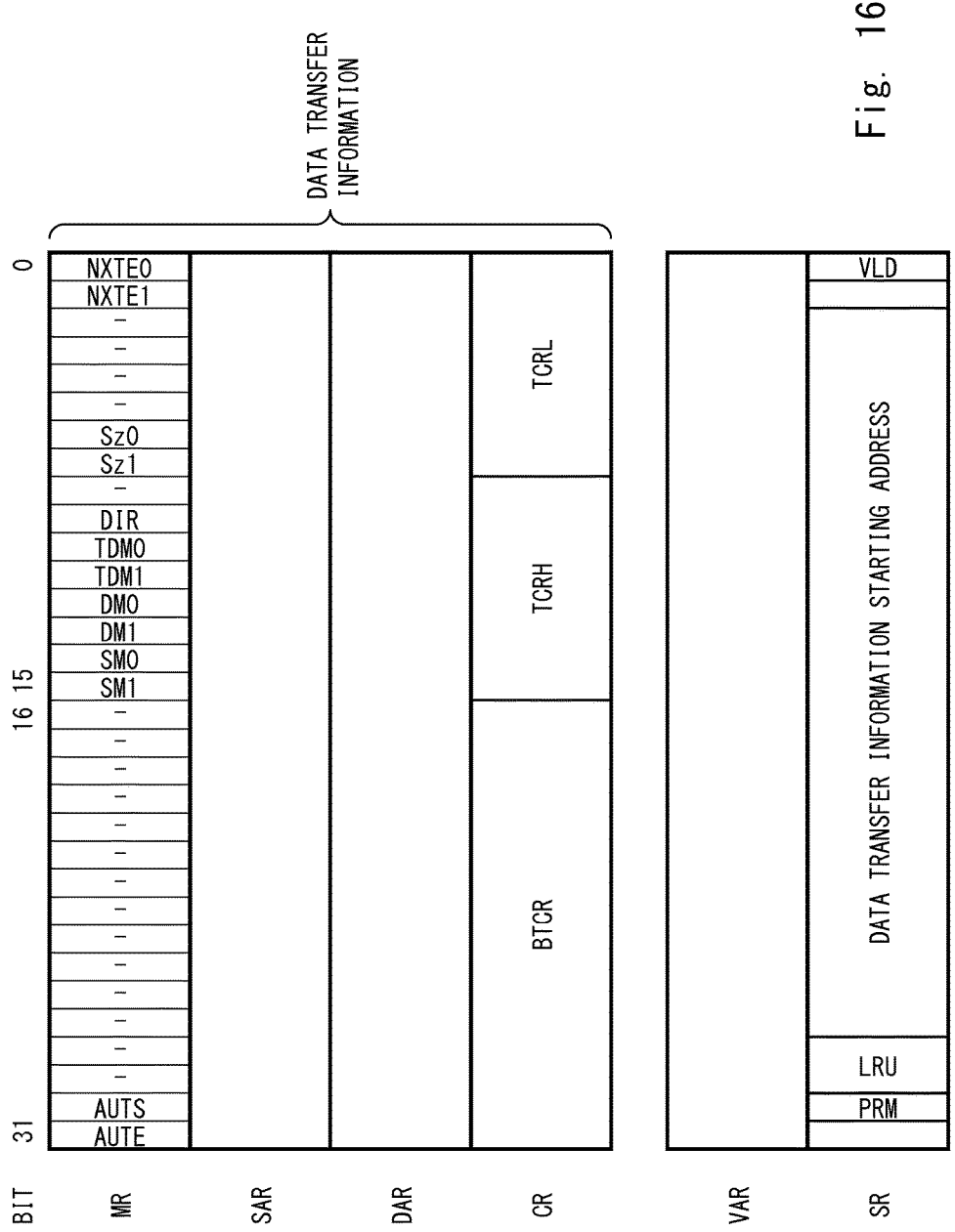
FIG. 16 is a diagram showing a register file and data transfer information according to a third embodiment.

FIG. 16 shows a register file and data transfer information (a transfer information set) of a DTC 102 according to a third embodiment.

In the present embodiment, bits 31 and 30 of the mode register (MR) are AUTE and AUTS bits.

When the AUTE bit is set to 1, the DTCCNT successively performs data transfer for the number of times specified by the CR. The AUTS bit specifies whether to hand over the bus right to the CPU midway through the successive execution.

Figure 17:
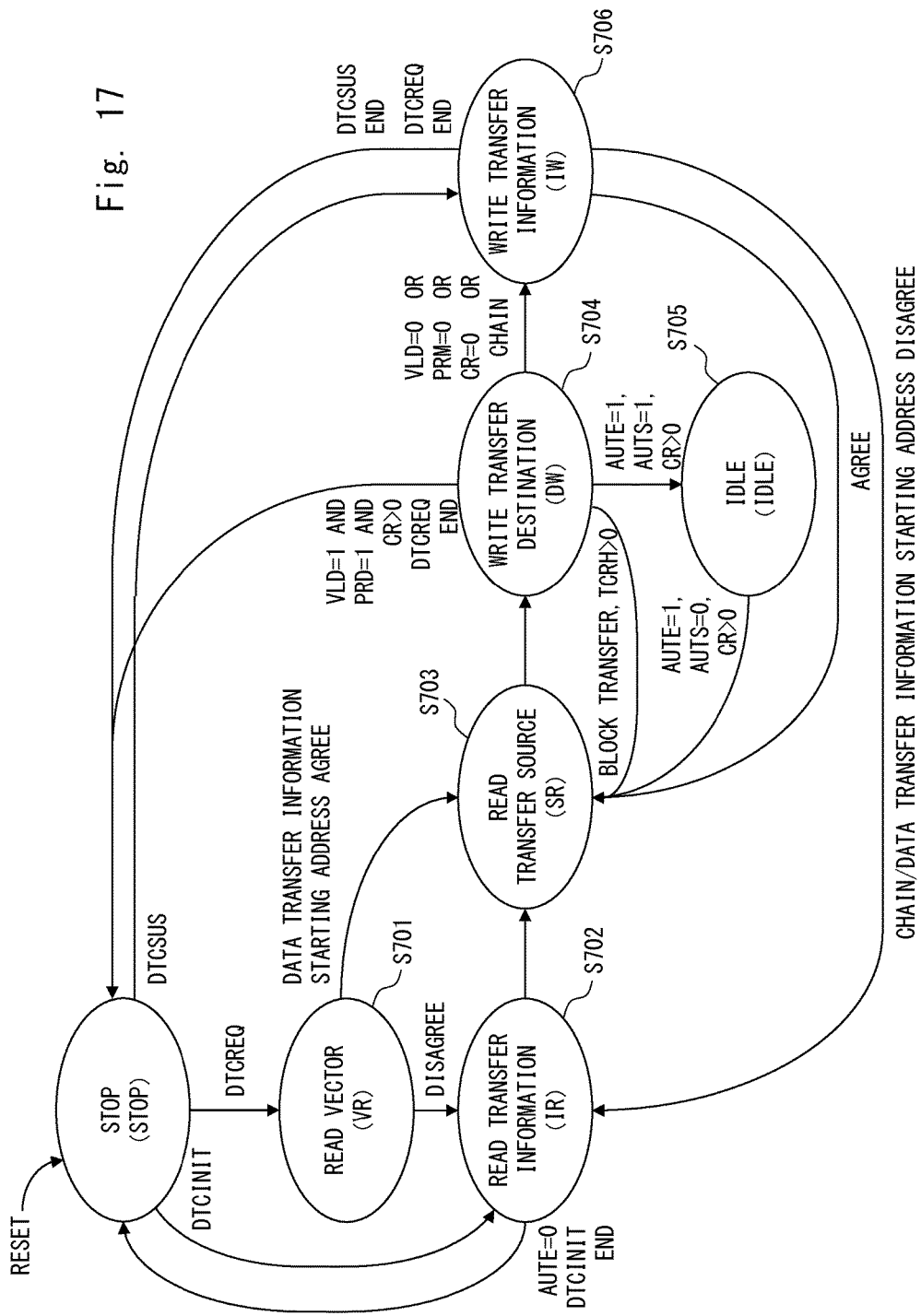
FIG. 17 is a diagram showing data transfer processing of a DTC 102 according to the third embodiment.

FIG. 17 shows a state transition diagram of the DTC 102 according to the third embodiment.

When the DCTCNT is provided with DTCINT, the state transits to a vector IR state.

S702 (IR state): When transition to the IR state has been triggered by DTCINT, the DCTCNT reads data transfer information stored in the data transfer information arrange area. When the AUTE bit of the read MR is cleared to 0, the state returns to the stop state. When the AUTE bit is set to 1, the state subsequently transits to the SR and DW states.

S703 and S704 (SR state, DW state): the DCTCNT successively executes data transfer for the number of times specified by the CR. At this time, when the AUTS bit is set to 1, the state once transits to the IDLE state (S705). In the IDLE state, the bus right is once released. When data transfer of a prescribed number of times has finished and the CR reaches 0, the state returns to the IW state.

S706 (IW state): When the AUTE bit is set to 1, the DCTCNT does not write back data transfer information.

In the case of a chain operation, as described in the foregoing, the state transits to the IR state or the SR state.

Note that, the time to be spent in the IDLE state can be changed by other bit of the MR, for example.

The data transfer with the AUTE bit being set to 1 is preferable for initializing the microcomputer. It is possible to directly use data transfer information on the ROM, and to set an initial value prepared on the ROM to a prescribed address of the microcomputer. Through use of chain transfer, initialization can be performed at intermittent addresses.

Figure 18:
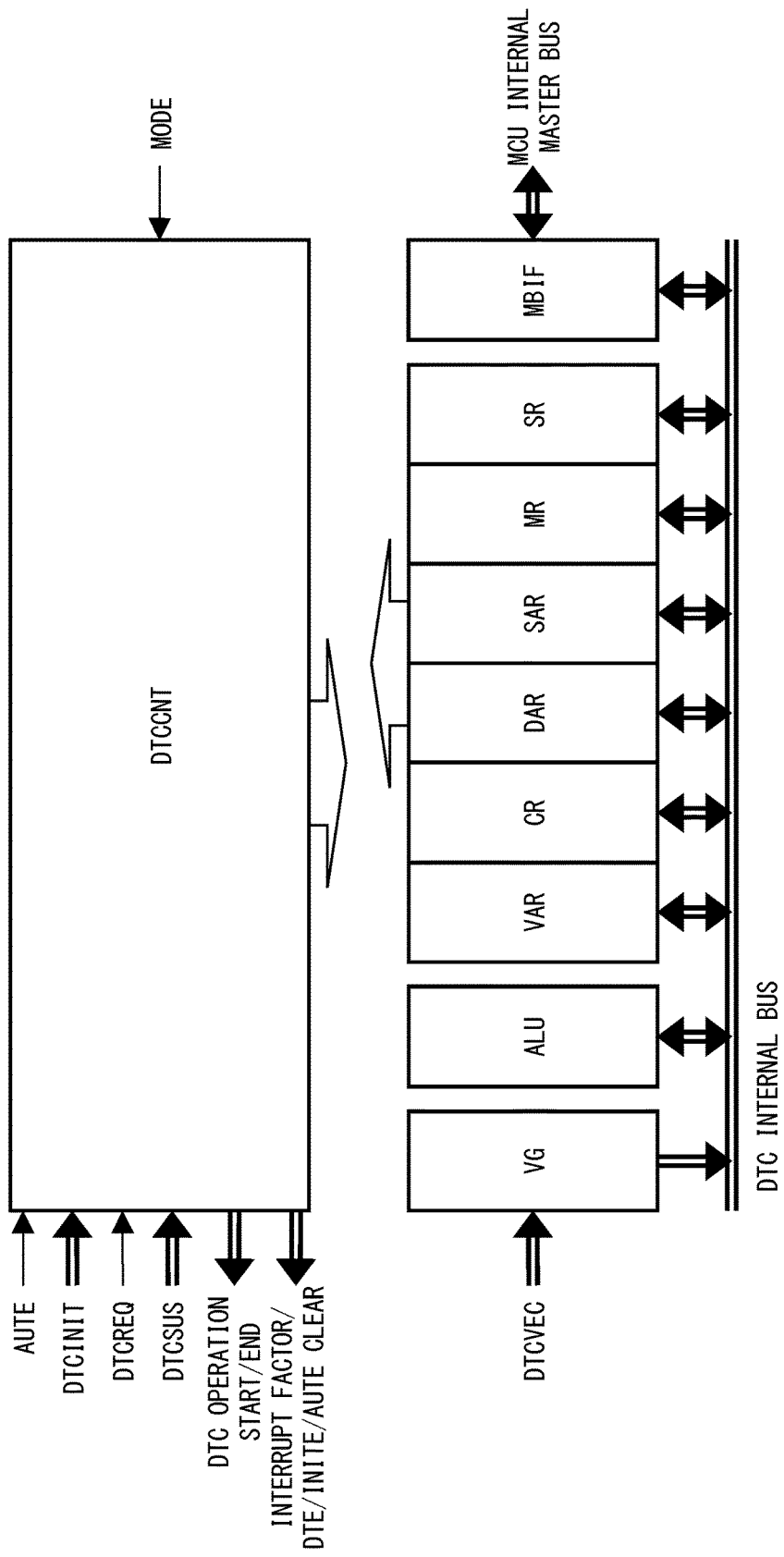
FIG. 18 is a diagram showing the configuration of a DTC 102 according to a variation of the third embodiment.

(Variation) FIG. 18 is a block diagram of a DTC 102 according to a variation of the third embodiment.

In the variation, a register file of one channel is provided. One channel suffice for use of the DTC in executing the above-described initialization.

Further, the AUTE bit is provided together with the DTCINIT, instead of being provided in data transfer information.

An input of a mode signal is provided, such that activation of the DTC during reset release can be selected by the operation mode of the microcomputer or the like. The mode signal is determined by a mode input of the microcomputer or the like.

Figure 19:
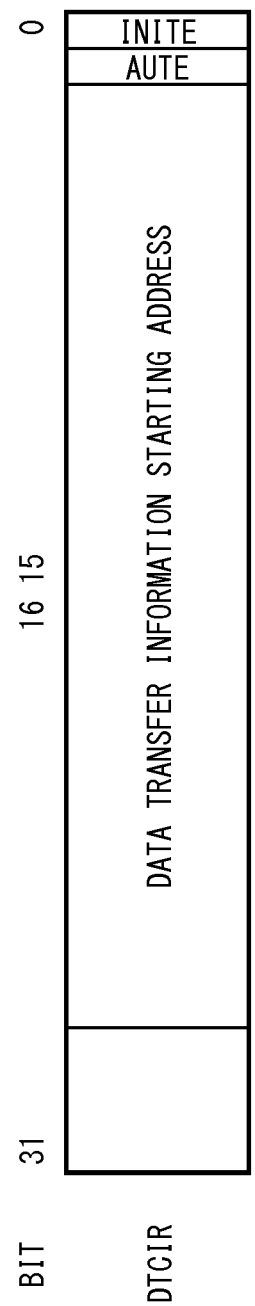
FIG. 19 is a diagram showing a data transfer information initialize register (DTCIR) according to the variation of the third embodiment.

FIG. 19 shows a data transfer information initialize register (DTCIR) of the DTC 103 according to the variation of the third embodiment.

In connection with the register file being provided by one channel, the DTCIR is also one in number. Further, bit 1 is AUTE. In use of the DTC for the above-described initialization, both the AUTE and INITE bits are set to 1.

The DTC 102 reads data transfer information (the IR state), and thereafter successively performs data transfer (the SR and DW states). As necessary, the DTC 102 writes back data transfer information on the data transfer information arrange area (the IW state), and performs a chain operation.

When a prescribed number of times of data transfer including the chain operation is finished, the AUTE and INITE bits are cleared to 0.

<Fourth Embodiment>

The DTC 102 can be used for initializing the MCU 100. In this case, a vector corresponding to reset should be prepared, and the DTC 102 should be activated after reset. This can be implemented as follows. In the state transition of the DTC 102, in the case where the state transits to the stop state by reset and activation of the DTC 102 is permitted by the above-described mode signal by releasing reset, the state transits to the VR state.

Setting of the DTCIR by the CPU 101 can be dispensed with.

Figure 20:
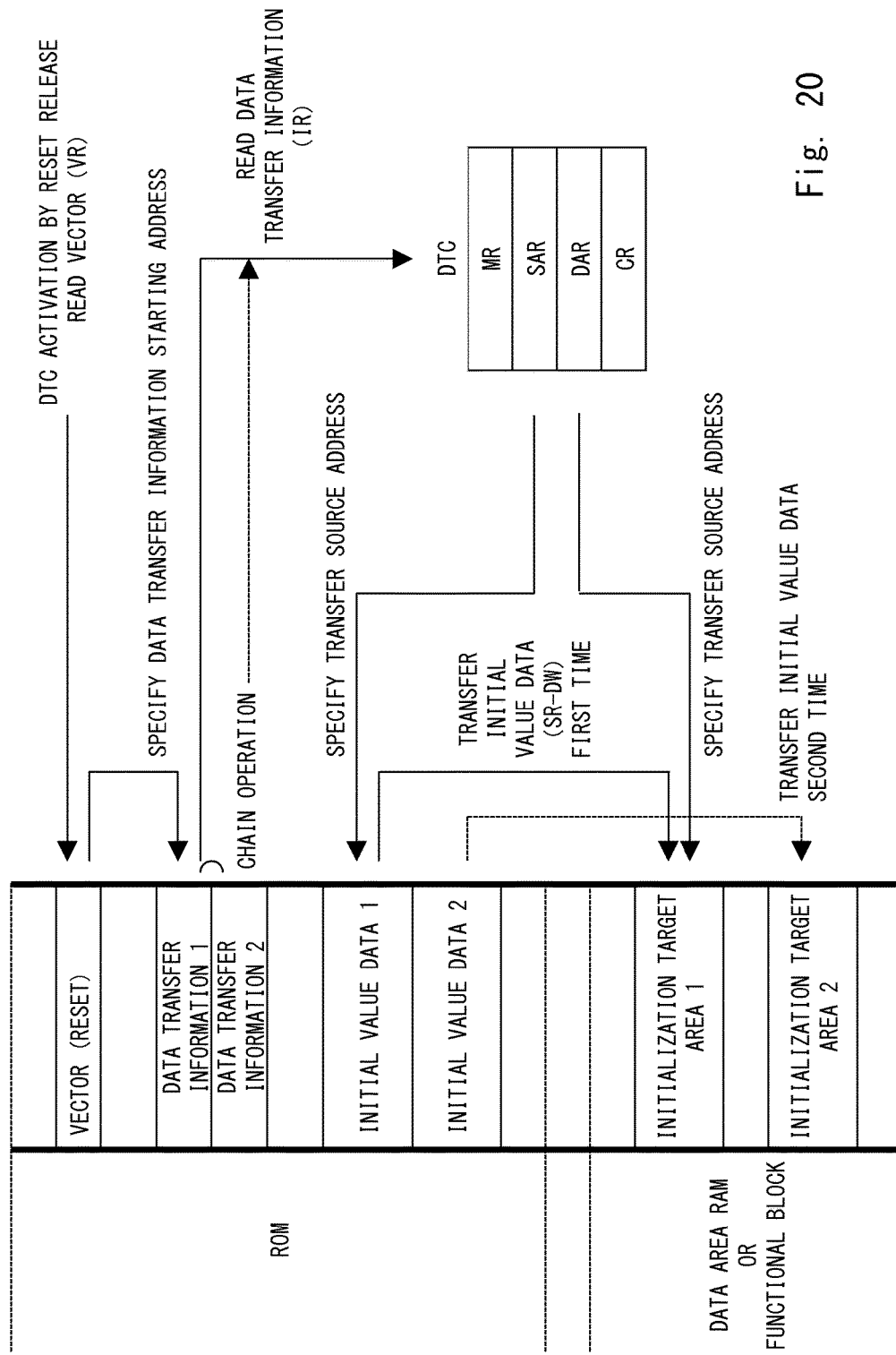
FIG. 20 is a diagram showing an initialization process of an MCU 100 by a DTC 102 according to a fourth embodiment.

FIG. 20 is an operation explanatory diagram of the initialization of the MCU 100 by the DTC 102.

When reset is released and the DTC 102 is activated, the DTC 102 reads a data transfer information starting address from the vector area corresponding to reset on the ROM 104.

Based on the address, the DTC 102 reads data transfer information (transfer information 1) from the data transfer information arrange area on the ROM 104 (the IR state). In the MR of the data transfer information, the AUTE and NXTE1 bits are previously set to 1.

The DTC 102 reads initial value data from an initial value data storage area on the ROM 104 specified by the SAR (the SR state), and writes the read data on the RAM 105 being the data area or the initialization target area on a prescribed functional block specified by the DAR (the DW state). This is successively performed for the number of times specified by the CR. In the case where the AUTE bit is set to 1, the DTC 102 does not perform write-back of data transfer information.

Since the NXTE1 bit is set to 1, the DTC 102 reads data transfer information (transfer information 2) from the data transfer information arrange area on the ROM, and repeat the foregoing operation as the chain operation.

While FIG. 20 shows two initial value data transfers, the chain operation can be repeated according to the number of the initialization target area. In the MR of the final data transfer information, the NXTE1 bit is previously cleared to 0.

By the AUTS bit being set to 1 such that the DTC 102 hands over the bus right midway through the process to the CPU 101, the CPU 101 to execute parallel processing.

This initialization can be executed by the user. Further, the manufacturer can use this process for configuring the MCU 100 as an individual semiconductor integrated circuit.

<Fifth Embodiment>

Figure 21:
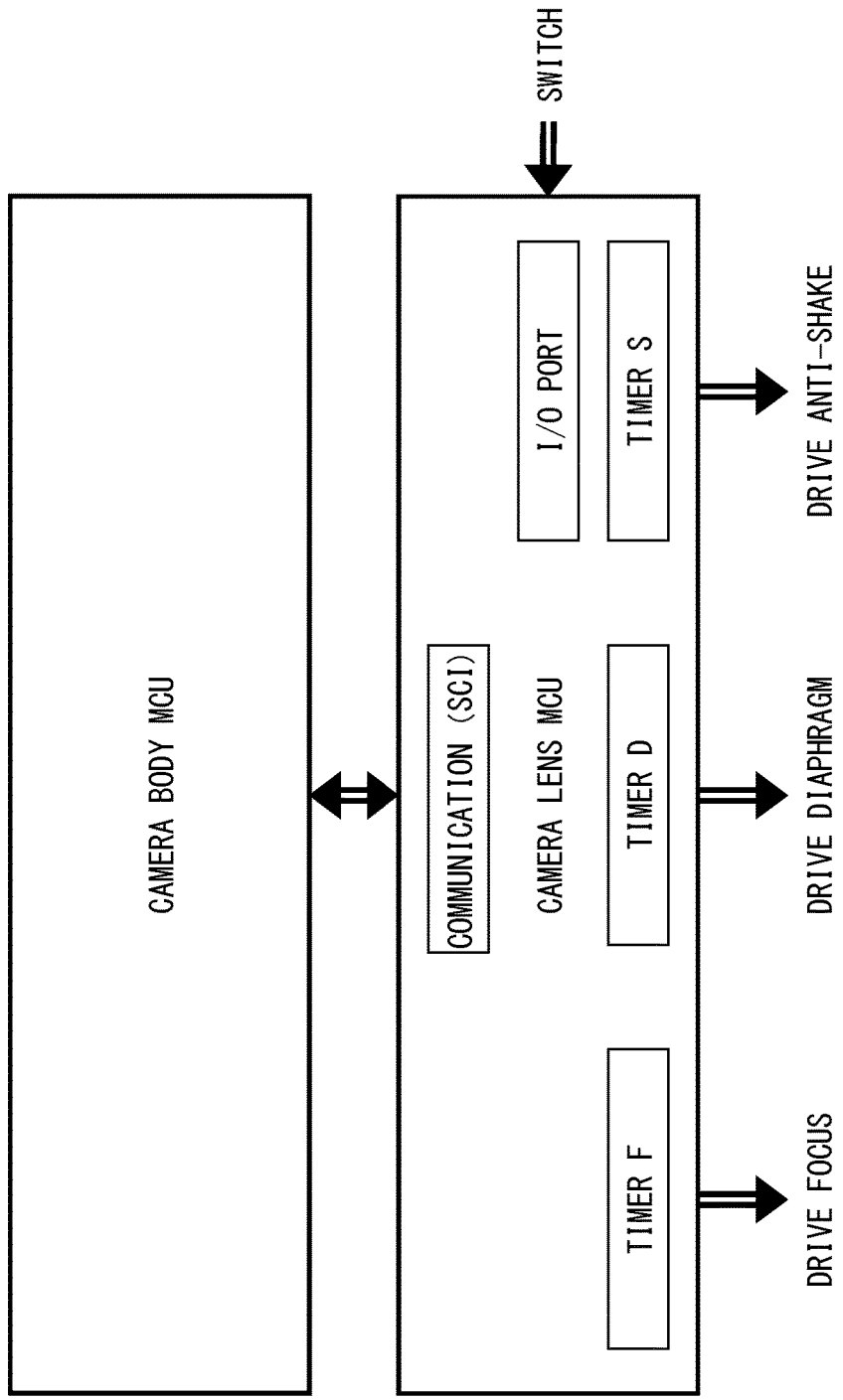
FIG. 21 is a diagram showing a system configuration using an MCU 100 according to a fifth embodiment.

FIG. 21 shows a block diagram of a system in which the present invention is applied to a camera.

The microcomputer to which the present invention is applied is a camera lens MCU. Control is exerted on focus, diaphragm, and anti-shake, using independent timer F, timer D, and timer S, respectively. Further, a switch for permitting auto-focusing or anti-shake function is input through an input/output port (I/O).

The camera lens MCU receives commands and accompanying data, from the camera body MCU through communication unit of a single line such as a serial communication interface (SCI). The DTC is activated by this reception complete interrupt.

The DTC is activated by the reception complete interrupt by the SCI. The DTC transfers a command being the reception data from a reception data register to prescribed RAM or the like, and requests an interrupt of the CPU. The CPU analyzes the command. When the command is a control command of focus, diaphragm, or anti-shake, the CPU sets the DTC based on the command, and transfers the data that follows to the timer F, the timer D, or the timer S of focus, diaphragm, or anti-shake, respectively.

When the received command is, for example, a status request command and requires a reply as to a prescribed state of the lens, e.g., the state of a shake-correction permission switch, the CPU transfers a prescribed functional block of the camera lens MCU, e.g., the content of the input/output port (I/O), to the transmission data register of the SCI to carry out transmission.

Most of the operations are performed based on a reception complete interrupt by the SCI. Accordingly, by setting the vector or data transfer information starting address of the DTC by a reception complete interrupt to the register file channel 1 of the DTC, acceleration can be realized. Also as to the channels 2 and 3, an activation factor or data transfer that is used frequently should be set.

While the DTC is executing the foregoing process, the CPU may be in a low-power consumption state, e.g., a sleep or standby mode. This can contribute toward reducing the power consumption of the system. Since the DTC is smaller than the CPU in logic scale and can perform fast-speed processing, the effect of reducing power consumption can be enhanced. It goes without saying that a reduction in power consumption is critical in the camera system or the like that is driven by a battery.

Figure 22:
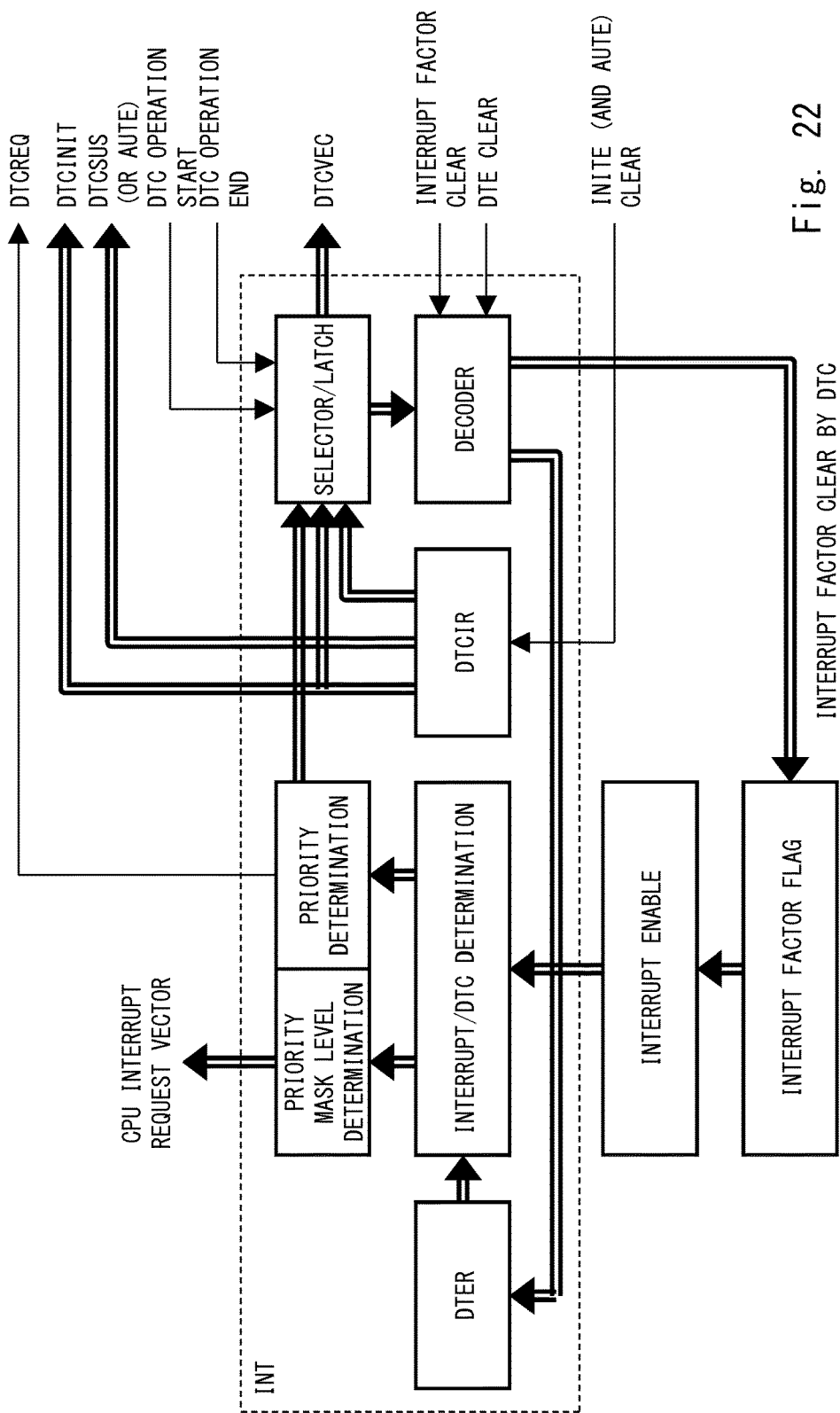
FIG. 22 is a diagram showing the configuration of an INT 103.

<Interrupt Controller (INT 103)>Finally, a description will be given of the configuration of the interrupt controller (INT 103) with reference to FIG. 22.

As to the interrupt factor of the MCU 100, there are two types, namely, an internal interrupt and an external interrupt, each of which has an interrupt factor flag. The interrupt factor flag is set to 1 when the functional blocks of timer, communication, and analog enter a prescribed state.

The external interrupt factor flag is set to 1 when an external interrupt input terminal attains a prescribed level, or when a prescribed signal change has occurred. The interrupt factor flag is cleared to 0 by a write operation of the CPU, and also cleared to 0 when transfer by the DTC 102 has finished.

The output of each bit of the interrupt factor flag is provided to an interrupt enable circuit. The interrupt enable circuit further receives the content of an interrupt enable register, i.e., an interrupt enable bit. The interrupt enable register can be read/written by the CPU 101 and selects whether to permit or prohibit a corresponding interrupt. When the interrupt factor flag is set to 1 and the interrupt enable bit is set to 1, an interrupt is requested.

The output of the interrupt enable circuit is provided to an interrupt/DTC determine circuit. The interrupt enable circuit further receives the content of a DTC enable register (DTER). As described above, the DTC enable register selects, upon request of an interrupt, whether to activate the DTC 102 or to permit the interrupt request to the CPU 101. When the bit of the DTC enable register corresponding to the interrupt factor is set to 1, activation of the DTC 102 is requested and an interrupt of the CPU 101 is not requested. When the bit of the DTC enable register is cleared to 0, an interrupt of the CPU 101 is requested and activation of the DTC 102 is not requested.

As to the output of the DTC enable circuit, a CPU interrupt request and a DTC activation request are independently input to a priority determine circuit. A priority determine/mask level determine circuit of the CPU 101 is controlled according to a priority register, an interrupt mask level and the like.

When a plurality of interrupt requests are present for each of the CPU interrupt request and the DTC activation request, priority is determined. As a result of the determination, a request of the highest priority is selected and a vector number is generated. Then, the CPU interrupt request and the vector number, as well as the DTC activation request (DTCREQ) and the vector number (DTCVEC) are output.

The DTC activation request is input to the DTC 102, and the DTC vector number is input to a selector/latch circuit. A DTC operation start signal and a DTC operation end signal are output from the DTC 102, and input to the selector/latch circuit. That is, when the DTC 102 starts to operate, the DTC operation start signal enters an active state, and the vector is latched or held. Then, data transfer of the DTC 102 ends and the DTC operation end signal enters an active state, and latch is released.

Further, the DTC vector number and the DTC operation end signal are input to a decoder circuit. A factor clear signal enters an active state in response to a corresponding interrupt factor flag, and the factor flag or the DTE bit is cleared.

When the DTC 102 is activated by a required interrupt factor, the CPU 101 previously writes data transfer information and the like to a required address, and sets an interrupt enable bit of the interrupt and a DTE bit corresponding to the interrupt factor of the DTC enable register to 1.

When the interrupt factor flag is set to 1 in this state, the DTC 102 is activated. In the state where the DTC 102 is executing any operation such as prescribed data transfer, the DTC 102 clears the interrupt factor flag to 0 every time data transfer is carried out. At this time, an interrupt is not requested of the CPU 101.

When the DTC 102 has finished the prescribed data transfer or the like, the DTC 102 clears the DTE bit to 0 at the end of the operation. At this time, since the interrupt factor flag is held to 1 and the DTE bit is cleared to 0, an interrupt is requested of the CPU 101. The CPU 101 executes a process corresponding to the end of the prescribed data transfer or the like, and resets the data transfer information and the DTE bit. These operations are realized by known techniques.

The DTCIR outputs DTCINIT and DTCSUS to the DTC, according to its bits. Further, the DTCIR outputs a vector number or a data transfer information starting address to the DTC via the selector/latch circuit. When both DTCREQ and DTCINIT are requested of the selector/latch circuit, the selector/latch circuit prioritize the vector based on the DTC activation request. The INITE bit is cleared in response to an INITE clear signal from the DTC.

In accordance with the interface to the DTC according to the foregoing variation and embodiments, necessary modifications such as presence/absence of signals and bandwidth are added. In the first embodiment, the DTCINIT signal is one in number and the DTCSUS signal is omitted. In the variation of the third embodiment, the AUTE signal is output in place of the DTCSUS signal, and AUTE clear signal is input with the INITE clear signal.

Note that, while the DTER, the DTCIR, the interrupt factor flag, and the interrupt enable register are connected to the MCU internal slave bus, this manner is not shown in the drawings.

<Operation and Effect of First to Fifth Embodiments>

According to the foregoing embodiments, the following operation and effect can be obtained.

(1) An advantage of a data transfer apparatus that stores data transfer information on a general storage apparatus (RAM) is obtained. For example, by using an interrupt factor, data transfer in response to a multitude of interrupts or event occurrences can be carried out. That is, flexibility and efficiency are achieved. Additionally, a plurality of sets of register files each storing data transfer information are prepared in the data transfer apparatus and the data transfer information in the register files is used. Thus, the necessity of reading the data transfer information from the storage apparatus is eliminated. Therefore, it becomes possible to increase the occasion where accelerated data transfer is achieved, or where accelerated processing of the microcomputer is achieved. When there exists a software resource that controls a data transfer apparatus having a single set of register file storing known data transfer information read from a storage apparatus, acceleration can be achieved while using the software resource with ease.

(2) The information that specifies the data transfer information stored in the register files is vectors. Accordingly, in addition to the necessity of reading the data transfer information, the necessity of reading vectors can be eliminated.

(3) The information that specifies the data transfer information stored in the register files is a data transfer information starting address. Accordingly, also in the case where data transfer information is shared among a plurality of activation factors, i.e., different vectors, the necessity of reading the data transfer information can be eliminated.

(4) It is enabled to specify that data transfer information is to be held in part of the register files and data transfer information of high activation request frequency is held in the register files. Accordingly, the necessity of reading the data transfer information from the storage apparatus can be eliminated. Thus, accelerated processing can be surely realized. In connection with the register files holding the register transfer information, when data transfer takes place, the necessity of write-back to the storage apparatus can be eliminated even when the data transfer information is updated. That is, accelerated processing can be achieved. In the case where, after data transfer of a prescribed number of times has been executed, similar data transfer is to be again performed, the data transfer information can be arranged on the ROM. Thus, a program executed by the CPU for arranging the data transfer information on the RAM can be omitted. That is, efficiency can be improved.

Similarly to a so-called DMA controller, what is approximated is a scheme of holding data transfer information as hardware dedicated to the data transfer apparatus. Further, specification and logic that are common to the data transfer supporting a multitude of interrupts or occurrence of events can be employed. Accordingly, improved convenience can be realized and an increase in the logic scale can be prevented. As described above, it is also possible to arrange data transfer information on the ROM, and hence a program executed by the CPU for setting data transfer information to a so-called DMA controller can be omitted. That is, efficiency can be improved.

(5) The control register (DTCIR) is provided for instructing readout of data transfer information onto the register files. It is enabled to activate the data transfer apparatus by setting of the control register to read data transfer information onto the register files. This process is executed in initializing the microcomputer or the like. Thus, along with the specification of holding data transfer information in part of the register files, the necessity of reading data transfer information upon an occurrence of an activation request from the storage apparatus can always be eliminated. Thus, accelerated processing and improved real-time processing can be achieved.

(6) Information (VLD) for representing that data transfer information stored in the register files is valid is provided. Further, after the DTC is activated, an interrupt factor flag or a DTE bit is cleared. The channels of the register files used until the DTC is stopped is held. When data transfer of a prescribed number of times has finished and the CR reaches 0, the VLD flag of the SR of every channel specified by use channel information of the DTCCNT is cleared. Thus, without holding unnecessary data transfer information, the register files can be efficiently used. That is, accelerated processing can be achieved.

(7) Information (AUTE) for specifying successive data transfer is provided to the data transfer information. The data transfer apparatus is activated by setting of the control register (DTCIR) to read data transfer information onto the register files. In the case where the information specifying the successive data transfer is set, data transfer is immediately performed. Thus, it becomes possible to directly use data transfer information on the ROM to set an initial value prepared on the ROM to a prescribed address on the microcomputer. Through use of the chain transfer, setting can be performed to intermittent addresses. That is, improved convenience is provided. Just by preparing required data transfer information and a required initial value on the ROM and by the CPU setting the control register, the microcomputer can be initialized. Programs to be executed by the CPU for initialization can be minimized, and use efficiency of the ROM can be improved.

(8) It is also possible to integrate a data transfer apparatus such as a so-called DMA controller and a data transfer apparatus that has a single set of register file that stores data transfer information read from a storage apparatus. In this case, a so-called DMA controller cannot operate unless data transfer information is initialized by the CPU or the like. Further, even when the data transfer apparatuses of the two types are to be integrated, they may be different from each other in the format of data transfer information. Then, two types of programs to be executed by the CPU, which controls the data transfer information, become necessary. It is not easy to selectively use one of the formats, by making a change in a system configuration or the like. According to the present invention, just data transfer information of a single type should be prepared. Also, it is easy to change by which data transfer holding of data transfer information in any register file should be specified. For example, the performance of the system can be evaluated while changing this specification.

(9) Since the DTC can execute data transfer in place of the CPU, the frequency of interrupts required of the CPU can be reduced, or the period in which the CPU stays in a low-power consumption state can be increased. Execution of exception handling, stack save/restore operations, and a restore instruction that must otherwise be executed by the CPU in interrupt handling can be dispensed with. This contributes toward simplified programs and improved efficiency of the system. Further, a time that is taken from an occurrence of an event to execution of a required operation can be reduced. That is, what is called responsiveness can be improved. Since the DTC being smaller than the CPU in logic scale and being capable of achieving high-speed processing operates and the CPU is maintained in a low-power consumption state, a reduction in power consumption can be realized. The present invention can increase the number of the processes that can be executed by the DTC, and the above-noted advantages can be greatly enjoyed.

<Variations of First to Fifth Embodiments>

Note that, the present invention is not limited to the embodiments described above, and can be modified in various manners within a range not deviating from the gist of the invention.

For example, the number of bits of the address register is not limited to 32 bits, and can be changed corresponding to the CPU or the address space of the microcomputer. For example, the number of bits should be 24 bits for the address space of 16 Mbyte. Though it has been described that the data transfer mode, the transfer source address, the transfer destination address, and the number of times of transfer are each 32 bits and data transfer information is 32 bit×four pieces, data transfer information may be 32 bit×three pieces.

The configuration of the DTC and the interrupt controller can be modified as appropriate. For example, the register files in the DTC are not limited to four channels, and can be arbitrarily changed. The number of the DTCIR can also be changed.

Further, the program to be executed by the CPU is not limited to be arranged on the ROM, and can be arranged on external memory. Similarly, the memory being the working area of the CPU is not limited to the RAM and may be external memory. Further, the ROM or the RAM may not be provided on-chip.

As to the data transfer information of the register files of the DTC also, they are not limited to be arranged on the RAM, and can be arranged on the ROM or external memory. When they are held in the register files in the DTC and data transfer information is not rewritten, they may be arranged on the ROM and others may be arranged on the RAM.

In addition to the DTC, a data transfer apparatus such as a so-called DMA controller can be provided. The function of the DTC and that of the DMA controller may be implemented as a single function module. When there are software resources respectively for data transfer information formats of two types, they can easily be used.

Specific configuration of the DTC and that of the interrupt controller can also be modified in various manners.

Though the BSC and bus operations such as the bus right and wait have not been detailed, they can be implemented as appropriate.

The configuration of the microcomputer is not limited also. Other constituents and functional blocks can be modified in various manners.

<Sixth Embodiment>

A sixth embodiment discusses an improvement in convenience of the data transfer apparatus in the device control application.

In the device control application, in addition to data handling in a byte (8 bits), a word (16 bits), and a long word (32 bits), in many cases, data becomes meaningful by a unit of a bit. For example, input/output terminals of the microcomputer are often used individually for separate purposes, e.g., for controlling ON/OFF of a switch (the output terminal) and for controlling the state (the input terminal), and are represented as bits of a prescribed register. In some cases, a combination of such a plurality of bits controls other bit. For example, a switch D may be controlled by the state of switches A, B, and C.

In such cases, the process must be carried out so as not to influence other bits arranged at the identical address. Accordingly, the process may not be handled by simple read/write. The following is exemplary cases.

Figure 48:
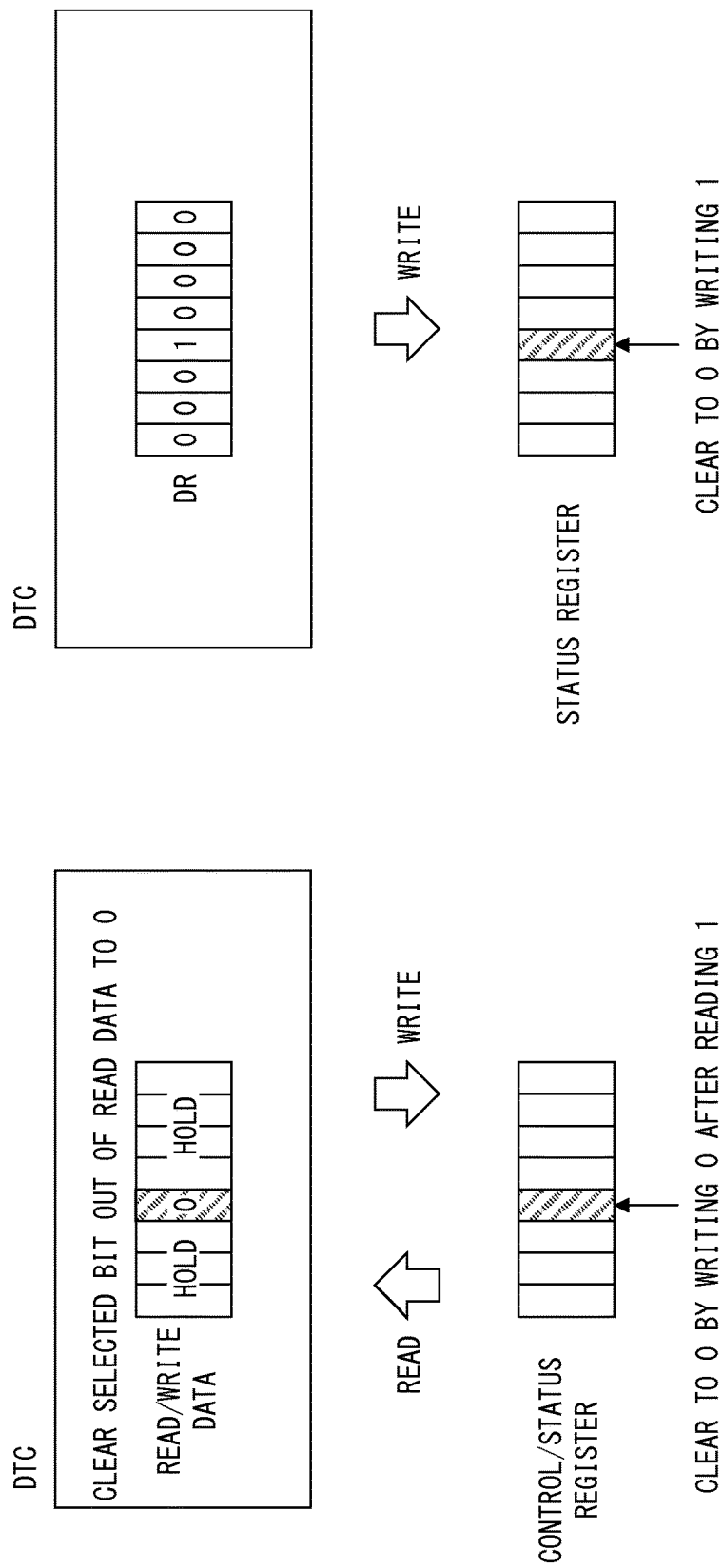
FIG. 48 is a diagram showing a background technique.

(a) In connection with an interrupt factor flag or the like, it may be required to read the state of 1 and thereafter write 0. Here is a scheme including: setting a flag to 1 by hardware; reading the state of 1; and thereafter writing 0 to thereby clearing the flag. In this case, by arranging the flag for example at an address in a byte; reading the address even when other control bit or flag exists at the identical address; and performing write with data in which the required flag is cleared to 0 and other bits are held intact, the flag can be cleared to 0 without influencing other bits. Even when other flag exists at the identical address and is set to 1 before or after the read operation, such a flag will not be undesirably cleared to 0. (FIG. 48)

(b) An interrupt factor flag or the like is also cleared to 0 by being subjected to a write operation of 1. When there are a plurality of flags at an identical address, by performing a write operation with data in which only the bit desired to be cleared is set to 1 and other bits are cleared to 0, the flag can be cleared to 0 without influencing other bits. (FIG. 48)

(c) In some cases, addition of a prescribed keyword is required in performing a write operation to a required register. An undesired rewrite operation can be reduced by employing a scheme in which the target register is rewritten only by a write operation in a word (two bytes), in which the keyword is represented by the high order byte and the write data is represented by the low order byte.

In addition to the foregoing write procedures, in some cases, there exists a period in which a write operation is prohibited.

Functions that are embedded in a microcomputer are increasing. A function that is unique to an applied system may be required. It is not always easy to unify bit manipulation schemes in a single microcomputer.

On the other hand, real-time processing is requested of a device control application microcomputer, such as to execute, in response to an occurrence of a certain event, a corresponding process within a prescribed time. Taking advantage of its high-speed processing ability, it has been expected to use a data transfer apparatus to meet such requirement.

Further, functions that are embedded in a microcomputer are increasing. A function that is unique to an applied system may be required. It is not easy to provide a dedicated interface to every functional block, and to realize mutual interface while considering meaningful combinations.

Similarly, there may exists an external input signal that requires any internal functional block to start an operation such as A/D conversion. This external input signal may share a terminal with other function of a microcomputer, for example with the output of a timer. When a terminal is shared, the user must select a single function, and the external input signal may be disabled.

Based on the foregoing knowledge, the inventor has found the necessity of exerting control in a data transfer apparatus by a combination of a plurality of bits.

Accordingly, in the sixth embodiment, what is proposed is a microcomputer which provides a versatile usage manner. That is, the position of a bit to be used, the content of a process, and the step of the process can be specified. Further, what is proposed is a microcomputer which allows, in a single data transfer apparatus that stores information required for data transfer (data transfer information) in a storage apparatus, to vary the volume of the data transfer information for each data transfer.

Figure 23:
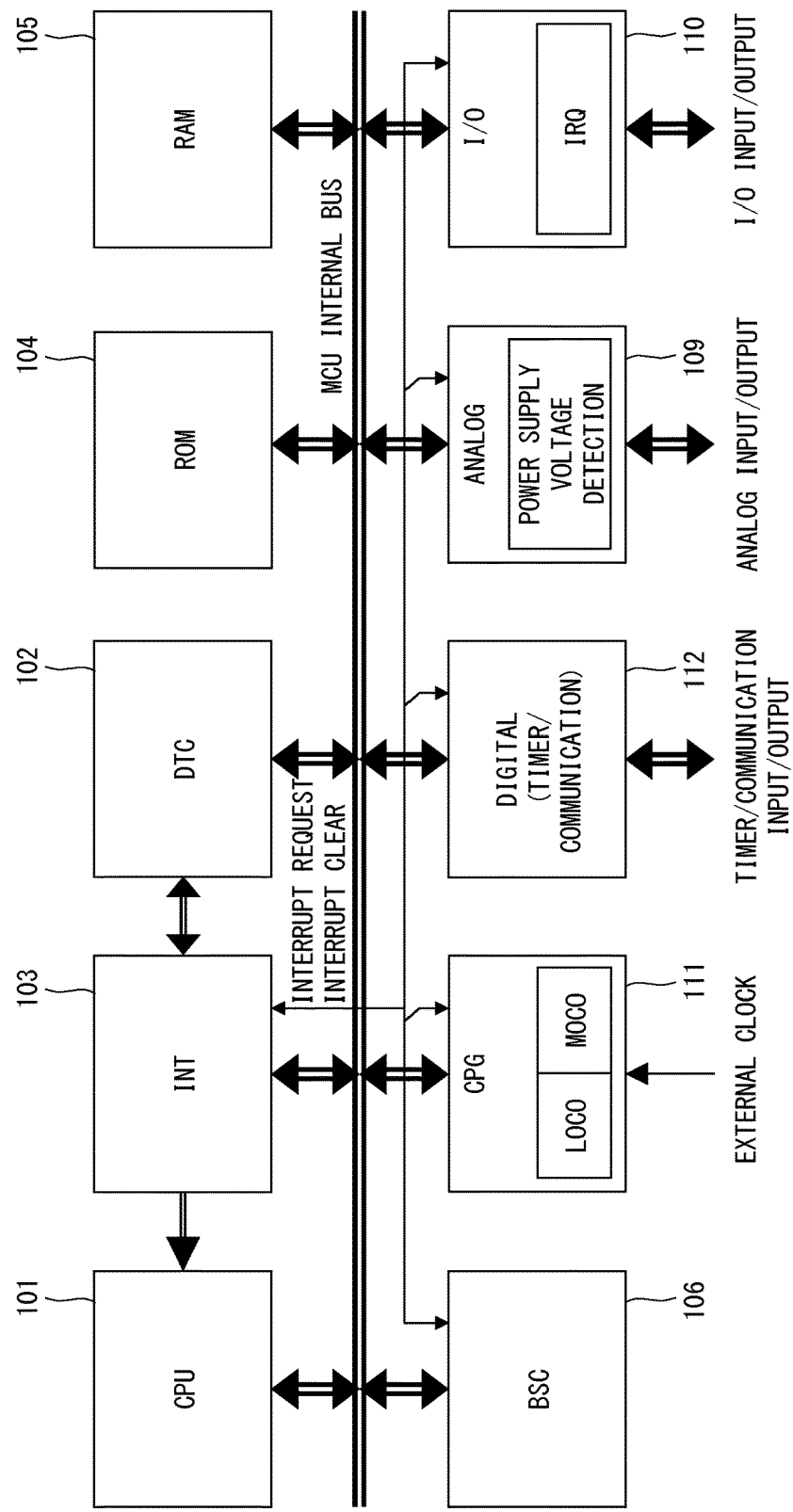
FIG. 23 is a diagram showing the configuration of an MCU 100 according to a sixth embodiment.

FIG. 23 is a block diagram of an MCU 100 according to the sixth embodiment.

The MCU 100 is configured by functional blocks or modules of a CPU 101, a DTC 102, an INT 103, a ROM 104, a RAM 105, a BSC 106, a clock oscillator (CPG) 111, a digital module 112 including a timer function and a communication function such as a serial communication interface, an analog module 109 such as an A/D converter, a D/A converter, and a supply voltage detecting function, and an input/output port (I/O) 110.

The CPU 101 principally performs operations. The CPU 101 reads instructions mainly from the ROM 104 and operates accordingly. The DTC 102 performs data transfer in place of the CPU 101 based on the setting of the CPU 101.

The INT 103 receives interrupt requests from the digital module 112, the analog module 109 and the like, and interrupt requests from the I/O 110 based on a plurality of external interrupt request signals from the outside of the microcomputer, and outputs an interrupt or a data transfer request to the CPU 101 or the DTC 102. Further, when the INT 103 starts or ends a process triggered by an interrupt signal, the INT 103 outputs an interrupt clear signal for clearing the interrupt, in association with the interrupt signal or an interrupt factor flag of the digital module 112, the analog module 109, or the I/O 110.

The analog module 109 includes a supply voltage detecting function, which detects voltage supplied to the supply voltage input terminal of the MCU 100. When it is detected that the supply voltage has dropped to be equal to or lower than a prescribed voltage, the analog module 109 requests a voltage monitor interrupt.

The I/O 110 has an external interrupt (IRQ) function that detects a change in input signals at respective terminals and requests an interrupt.

The BSC 106 interfaces with the CPU 101 and the DTC 102 as to a bus request, a bus acknowledge, a bus command, wait, addresses, data and the like, to allow the CPU 101 to read/write from/to the RAM 105, or other functional blocks or modules connected to the MCU internal bus. Specifically, the BSC 106 receives bus request signals from the CPU 101 and the DTC 102 and arbitrates in occupation of the MCU internal bus, to output a bus-use permission signal. The MCU internal bus is exclusively used by the CPU 101 or the DTC 102. In any event, the functional blocks included in the MCU 100 will not be accessed via the bus simultaneously by the CPU 101 and the DTC 102.

The CPG 111 has a main clock oscillator (MOCO) and a low-speed on-chip oscillator (LOCO) operating based on external clock. The MOCO can divide and double frequency. The operating clock of the MCU is selected by a not-shown clock select register (CKSR), and normally operates high-speed clock, e.g., 100 MHz, by the MOCO. The clock of the LOCO is 125 kHz, for example.

Figure 24:
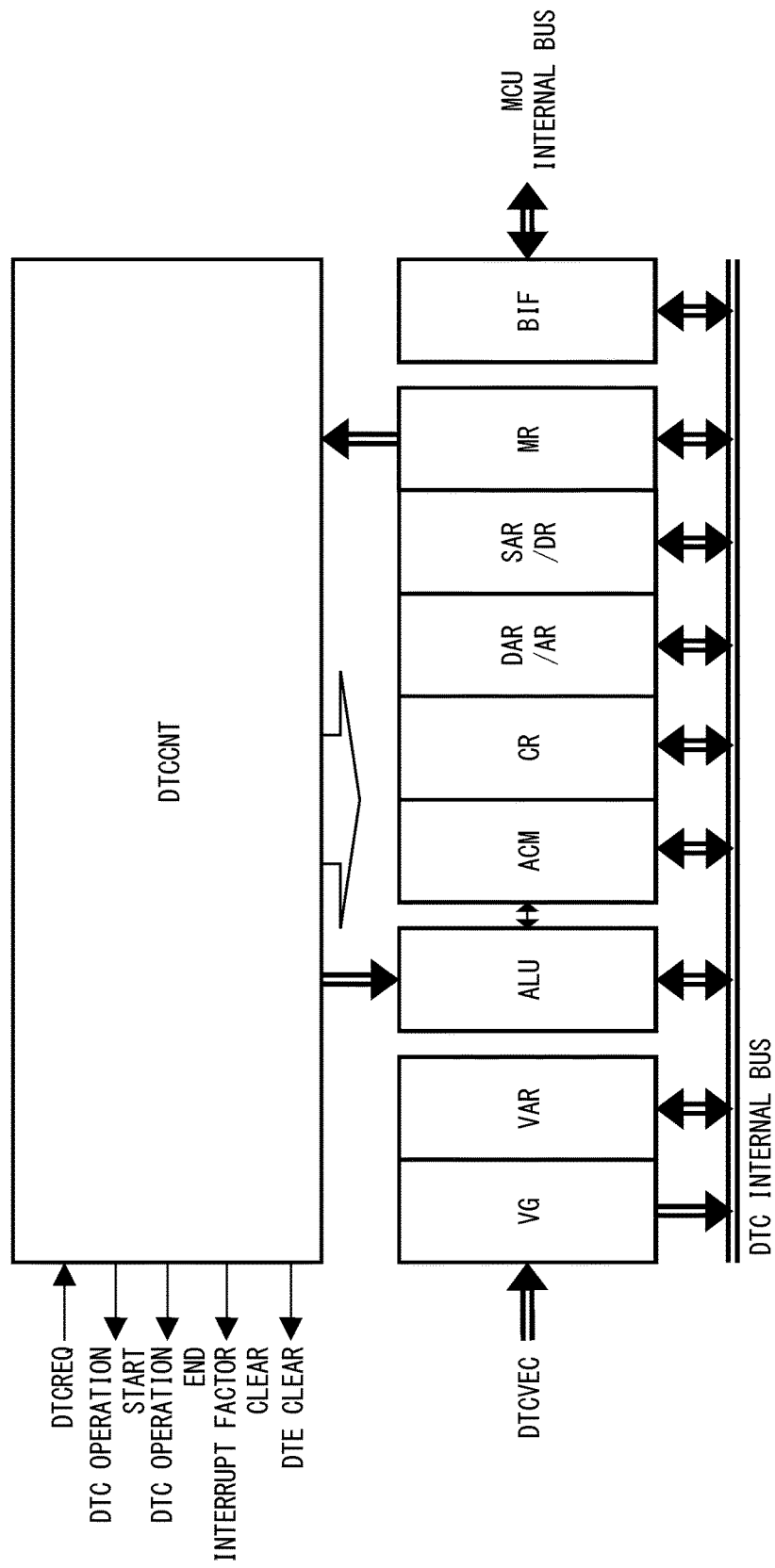
FIG. 24 is a diagram showing the configuration of a DTC 102 according to the sixth embodiment.

FIG. 24 is a block diagram of the DTC 102 according to the present embodiment.

The DTC 102 includes a data transfer control block (DTCCNT), a bus interface (BIF), a vector generation block (VG), a vector address register (VAR), a mode register (MR), a source address register (SAR/DR), a destination address register (DAR/AR), a counter register (CR), a bit accumulator (ACM), and an arithmetic logic unit (ALU).

The MR, the SAR/DR, the DAR/AR, and the CR are a register set storing data transfer information.

The DTCCNT controls operations in the DTC based on the transfer request (DTCREQ, DTCVEC) from the INT and the content of the MR. Further, the DTCCNT outputs control signals to the INT.

The BIF interfaces between the DTC internal bus and the microcomputer internal bus. The interface includes a bus request, a bus acknowledge, a bus command, wait, addresses, data and the like.

The VG generates a vector address according to an interrupt vector number DTCVEC provided from the INT. For example, the VG multiplies the DTCVEC by four and adds a prescribed offset.

The VAR stores the starting address of data transfer information read from the vector address.

The MR, the SAR/DR, the DAR/AR, and the CR store data transfer information subsequently read from the data transfer information starting address.

The ALU performs arithmetical operations, logical operations, shift operations, and decoding of bit numbers.

While not shown, there are a plurality of DTC internal buses, which allow the above-described contents of the SAR/DR, the DAR/AR, the CR, and the ACM to be operated by the ALU.

Figure 25:
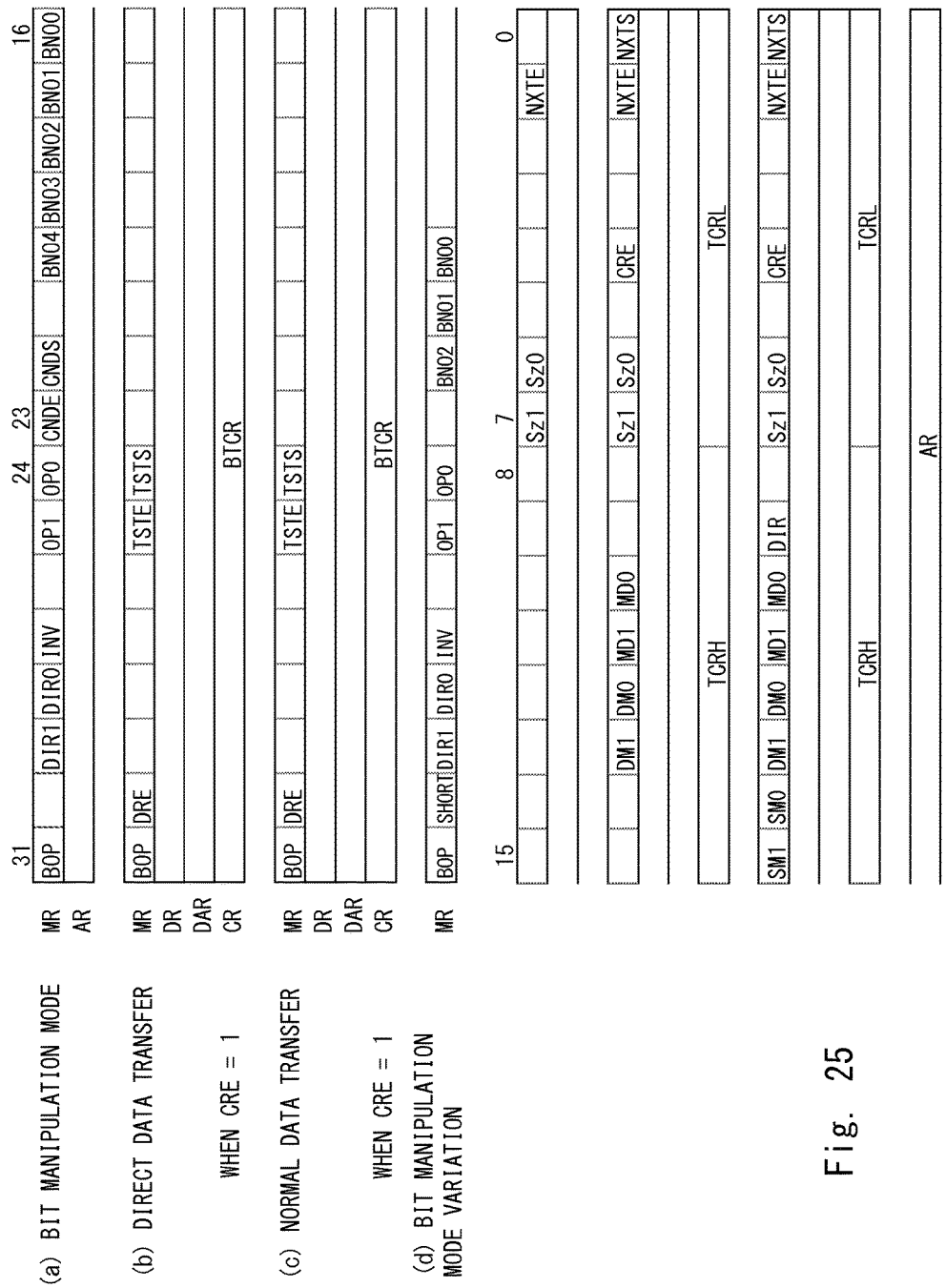
FIG. 25 is a diagram showing data transfer information according to the sixth embodiment.

FIG. 25 shows data transfer information (a transfer information set) of the DTC 102. The data transfer information is of a 32-bit configuration. The data transfer information is shown as being divided into two stages of higher-order side and lower-order side.

The data transfer information of the DTC 102 is formed by a mode register (MR), a source address register (SAR), a destination address register (DAR), a counter register (CR), and a data register (DR).

Depending on the content stored in the MR, the data transfer information assumes three configurations, and the volume of the data transfer information changes. Further, depending on the content stored in the MR, any required registers noted above are used, and in some cases, they perform operations not represented by their names.

The CR is divided into a block transfer count register (BTCR) and a transfer count register (TCR). The TCR is divided into higher eight bits (TCRH) and lower eight bits (TCRL). The CR operates according to data transfer modes which will be described later.

These register circuits are provided by a single set in the DTC 102. Though not particularly restricted, they do not exist on the address space of the CPU 101. The data transfer information to be stored in the registers is arranged on a prescribed data transfer information arrange area such as the RAM 105, on the address space of the CPU 101 by the number of required sets.

Depending on the content specified by the mode register (MR), the data transfer information assumes three configurations as described above.

(a) shows a bit manipulation mode.

Bit 31 is a BOP bit. By this bit being set to 1, the bit manipulation mode is specified.

In the case of the bit manipulation mode (BOP=1), the content of the MR is as follows.

Bits 29 and 28 are DIR1 and DIR0 bits. When they are set to 10, a read operation is performed from an address specified by the AR and a manipulation is performed. When they are set to 11, a read operation is performed from an address specified by the AR and other separately specified process is performed to carry out a write operation. When the DIR1 and DIR0 bits are set to 10, the result of the bit manipulation is held by the bit accumulator (ACM).

Bit 27 is an INV bit for specifying logic inversion in a read or write operation.

Bits 25 and 24 are OP1 and OP10 bits. When they are set to 00, no operation (transfer) is performed; when 01, AND is performed; when 10, OR is performed; and when 11, XOR is performed.

Bit 23 is a CNDE bit. When the CNDS bit is cleared to 0, a bit manipulation is performed once. When it is set to 1, whether to end the bit manipulation or to repeat the bit manipulation is specified by the CNDS bit and the targeted bit.

Bit 22 is a CNDS bit. When the CNDS bit is cleared to 0 and the targeted bit is cleared to 0, the condition is satisfied and the bit manipulation is ended; when the targeted bit is set to 1, the condition is not satisfied and the bit manipulation is repeated. When the CNDS bit is set to 1 and the targeted bit is set to 1, the condition is satisfied and the bit manipulation is ended; when the targeted bit is cleared to 0, the condition is not satisfied and the bit manipulation is repeated.

Bits 20 to 16 bits are BNO4 to BNO0 bits for specifying the bit number.

Bits 7 and 6 are Sz1 and Sz0 bits for selecting by which size, a byte size, a word size, or a long word size, a read/write operation of a single time is to be performed.

Bit 1 is a NXTE bit for selecting whether to end the operation or to start next operation for one activation factor. When this NXTE bit is cleared to 0, after the specified process has finished, data transfer information is written and the operation of the DTC ends.

In the address register (AR), data transfer information of the DTC is provided by a long word x two pieces.

In the case other than the bit manipulation mode (i.e., BOP=0), the content of the MR is as follows.

Bit 30 is a DRE bit. When bit 30 is set to 1, a direct data transfer mode is entered; when bit 30 is cleared to 0, a normal data transfer mode is entered.

(b) shows the direct data transfer mode.

In the direct data transfer mode (BOP=0, DRE=1), the content of the MR is as follows.

Bit 25 is a TSTE bit. When bit 25 is cleared to 0, data transfer is unconditionally performed. When bit 25 is set to 1, whether or not to perform data transfer is specified by a TSTS bit and the bit accumulator (ACM).

Bit 24 is a TSTS bit. When bit 24 is cleared to 0 and the targeted bit is cleared to 0, the condition is satisfied and the direct data transfer mode is executed; when the targeted bit is set to 1, the condition is not satisfied and the operation is ended without a write operation in the direct data transfer mode being performed. When the TSTS bit is set to 1 and the targeted bit is 1, the condition is satisfied and the direct data transfer mode is executed; when the targeted bit is cleared to 0, the condition is not satisfied and the operation is ended without a write operation in the direct data transfer mode being executed.

Bits 13 and 12 are DM1 and DM0 bits for specifying whether to increment, decrement, or fix the AR after data transfer.

Bits 11 and 10 are TMD1 and TMD0 bits for selecting the data transfer mode. When the TMD1 and TMD0 bits are cleared to 00, the normal mode is entered. In the normal mode, for a single activation, data transfer is performed once from the address represented by the SAR to the address represented by the DAR.

Thereafter, as specified by the SM1, SM0, DM1, and DM0 bits, the SAR and the DAR are manipulated and the CR is decremented. This is repeated for every occurrence of an activation factor and for the number of times specified by the CR. Then, when data transfer for the number of times specified by the CR has finished, the DTC operation is prohibited, and an interrupt served as the activation factor is requested of the CPU.

When the TMD1 and TMD0 bits are set to 01, a repeat mode is entered. When the TMD1 and TMD0 bits are set to 10, a block transfer mode is entered. The repeat mode and the block transfer mode can be realized by known techniques.

In the direct data transfer mode, the transfer destination is the repeat area and the block area.

Bits 7 and 6 are Sz1 and Sz0 bits for selecting whether one data transfer is performed in a byte size, a word size, or a long word size.

Bit 4 is a CRE bit. When the CRE bit is cleared to 0, the DTC operation is performed unlimitedly, in response to a DTC activation request. When the CRE bit is set to 1, the DTC operation is performed in accordance with the value initially set in the CR.

Bit 1 is a NXTE bit for selecting, in response to one activation factor, whether data transfer is to be ended or next data transfer is to be performed. When the NXTE1 bit is cleared to 0, after a data transfer information read operation and a data transfer operation are performed, the data transfer information is written, and the DTC operation ends.

Further, when this NXTE bit is set to 1, after a data transfer information read operation and a data transfer operation are performed, the data transfer information is written. Data transfer information is further read from a subsequent address and a data transfer operation specified by this data transfer information is performed. Then, the data transfer information is written. This procedure is referred to as a chain operation (or chain transfer).

Bit 0 is a NXTS bit for specifying, when the CR reaches 0 in the state where the CRE bit is set to 1, whether to perform a chain operation.

(c) shows the normal data transfer mode.

In the normal data transfer mode (BOP=0, DRE=0), the content of the MR is as follows.

Bit 25 is a TSTE bit, and bit 24 is a TSTS bit. They function in the manner as in the direct data transfer mode.

Bits 15 and 14 are SM1 and SM0 bits for specifying whether to increment, decrement, or fix the SAR after data transfer.

Bits 13 and 12 are DM1 and DM0 bits, and bits 11 and 10 are TMD1 and TMD0 bits. They function in the manner as in the direct data transfer mode.

Bit 9 is DIR bit for selecting which one of the transfer source and the transfer destination is to be a repeat area or a block area.

Bits 7 and 6 are Sz1 and Sz0 bits. Bit 3 is a CRE bit and bit 1 is a NXTE bit. Further, bit 0 is a NXTS bit. They function in the manner as in the direct data transfer mode.

(d) shows a variation of the bit manipulation mode (shortened).

Bit 30 is a SHORT bit. When BOP=SHORT=1, a shortened bit manipulation mode is entered. In data transfer information in this mode, the MR and the AR are reduced to a long word x one piece.

Read/write from/to memory is fixed to a byte size, and the Sz1 and Sz0 bits are omitted. The bit number is specified by three bits, namely BNO2 to BNO0 bits. The CNDE and CNDS bits are omitted, and no conditions are set.

Though not particularly limited, such data transfer information should be stored in both the MR and the DAR/AR in the DTC. When the DAR/AR is used in the shortened bit manipulation mode, the higher eight bits should be masked (fixed to 0 or 1).

Thus, the AR becomes 24 bits and the address space that can be specified becomes 16 Mbytes. This poses no substantial problem because the address space used for a bit manipulation is not necessarily the entire space of the CPU. High-speed processing can be achieved by reducing the number of times of reading data transfer information.

Figure 26:
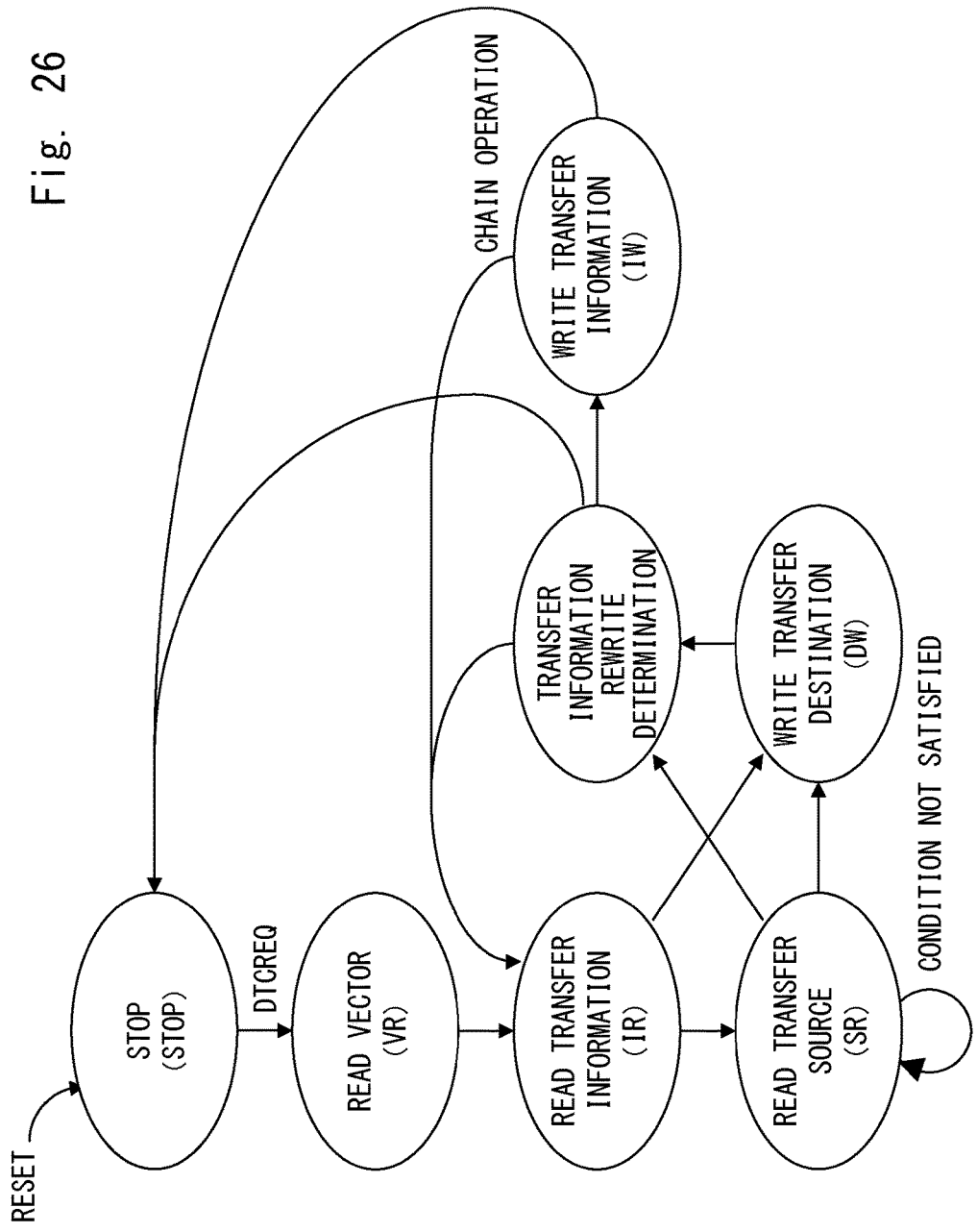
FIG. 26 is a diagram showing data transfer processing of the DTC 102 according to the sixth embodiment.

FIG. 26 is a state transition diagram of the DTC 102 according to the present embodiment. Such a state transition is mainly realized in the data transfer control block (DTC-CNT) of the DTC 102.

When the DTC 102 is provided with a data transfer request signal DTCREQ from the INT, the state transits to the VR state. The DTC 102 reads the starting address of data transfer information stored in the vector area (data transfer information starting address arrange area), based on a vector address generated by the VG according to an interrupt vector number DTCVEC. The read content is stored in the VAR.

Next, the state transits to the IR state. According to the starting address, data transfer information stored in the data transfer information arrange area is read. The content is the MR, the SAR, the DAR, the DR, the AR, and the CR. Among those, the ones to be used in a data transfer function specified by the firstly read MR are successively stored.

When the content of the MR specifies the bit manipulation mode or the normal data transfer mode, the state transits to the SR state. When the direct data transfer mode is specified, the state transits to the DW state.

In the SR state, the memory specified by the SAR or the AR is read. When the condition set by the CNDE and CNDS bits is not satisfied, the SR state is repeated. When DIR1 and DIR0=10 in the bit manipulation mode, a transfer information rewrite determination is performed. When DIR1 and DIR0=11 in the bit manipulation mode and in the normal data transfer mode, the state transits to the DW state.

In the DW state, transfer information is written onto the memory specified by the DAR or the AR. Thereafter, a transfer information rewrite determination is performed.

The transfer information rewrite determination is shown for simplifying the illustration, and actually performed in the previous state. When there is any updated data transfer information, the state transits to the IW state. When there is no updated data transfer information, the state transits to the IR state when a chain operation is specified by the NXTE and NXTS bits. When a chain operation is not specified, an interrupt factor flag corresponding to the activation factor or the DTE bit is cleared to 0, and the state transits to the STOP state.

In the IW state, data transfer information is written to the original address. Thereafter, when a chain operation is specified by the NXTE and NXTS bits, the state transits to the IR state. When a chain operation is not specified, an interrupt factor flag corresponding to the activation factor or the DTE bit is cleared to 0, and the state transits to the STOP state.

While not shown, the SR and DW states are repeated in the block transfer mode.

FIRST EXAMPLE

Figure 27:
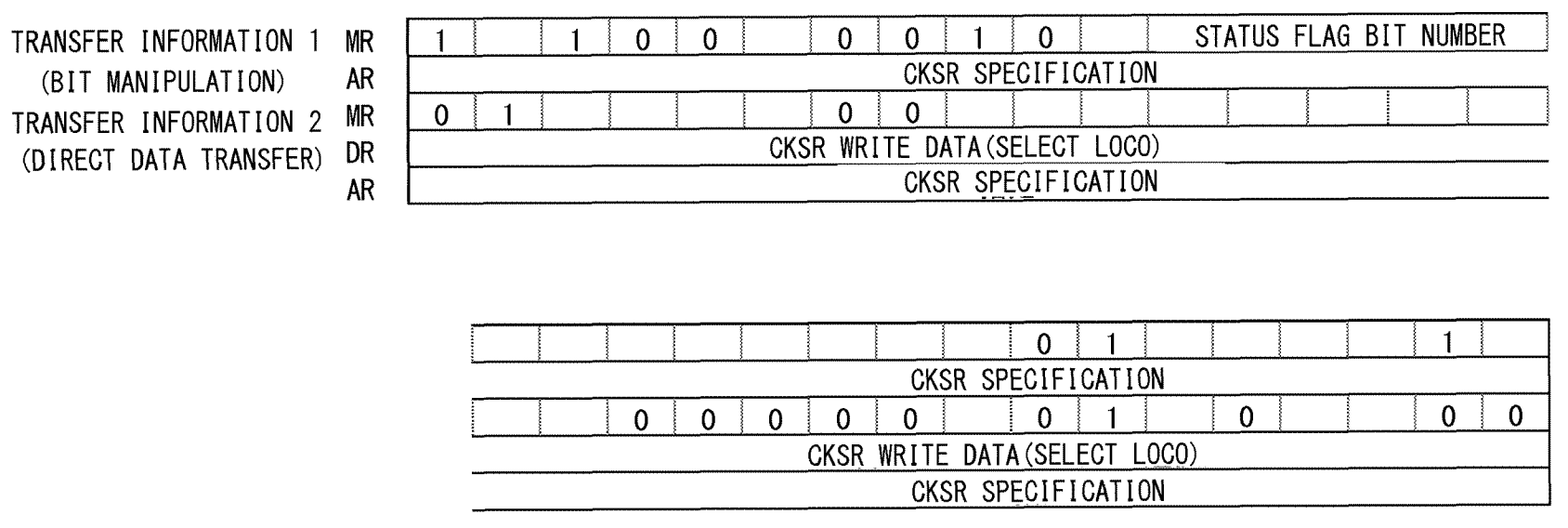

FIG. 27 shows a data transfer information configuration in a first example of the usage of the DTC 102 according to the present embodiment. The data transfer information is of a 32-bit configuration. The data transfer information is shown as being divided into two stages of higher-order side and lower-order side.

In the first example, the operational clock of the MCU 100 is switched by a voltage monitor interrupt that occurs upon detection of a voltage drop in the voltage supplied to the supply voltage input terminal of the MCU 100.

The operational clock of the MCU 100 is selected by the clock select register (CKSR) of the CPG 111. The CKSR consists of a status flag representing the rewrite inhibit state of the CPG 111 and a plurality of select bits for selecting a clock.

When the DTC 102 is activated by the voltage monitor interrupt, transfer information 1 is read based on a prescribed vector. The content of the MR of the transfer information 1 is previously set as follows.

Setting BOP=1, the bit manipulation mode is specified. Setting DIR1, DIR0=10, the address specified by the AR is read and manipulation is performed.

Setting INV=0, logic inversion is not performed.

Setting OP1, OP0=00, no manipulation (transfer) is specified.

Setting CNDE=1, CNDS=0, whether or not the targeted bit is 0 is checked. When the targeted bit is 0, the condition is satisfied and the bit manipulation (the operation with the transfer information 1) is ended. When the targeted bit is 1, the condition is not satisfied and the bit manipulation is repeated.

BNO4 to BNO0 bits specify the bit numbers of the status flag representing the rewrite inhibit state of the CKSR of the CPG.

Setting Sz1, Sz0=01, a byte size is specified.

Setting NXTE=1, the operation with transfer information 2 by a chain operation is specified.

The address register (AR) specifies the address of the CKSR.

When the operation with the transfer information 1 is ended, the transfer information 1 is written to the original address as necessary. However, with the configuration described above, since the content of the transfer information 1 is not updated, such writing is not performed. Subsequently, the transfer information 2 is read. The content of the MR of the transfer information 2 is previously set as follows.

Setting BOP=0, DRE=1, the direct data transfer mode is specified.

Setting TSTE=TSTS=0, no conditions are set.

Setting DM1=DM0, the AR is fixed.

Setting TMD1=TMD0=0, the normal mode is specified.

Setting Sz1, Sz0=01, a byte size is specified.

Setting CRE=0, the CR is not used to permit unlimited number of DTC operations.

Setting NXTE=0, the end of the DTC operation is instructed.

The data register (DR) stores data to be written to the CKSR, i.e., the data that selects the LOCO.

The address register (AR) specifies the address of the CKSR.

Figure 28:
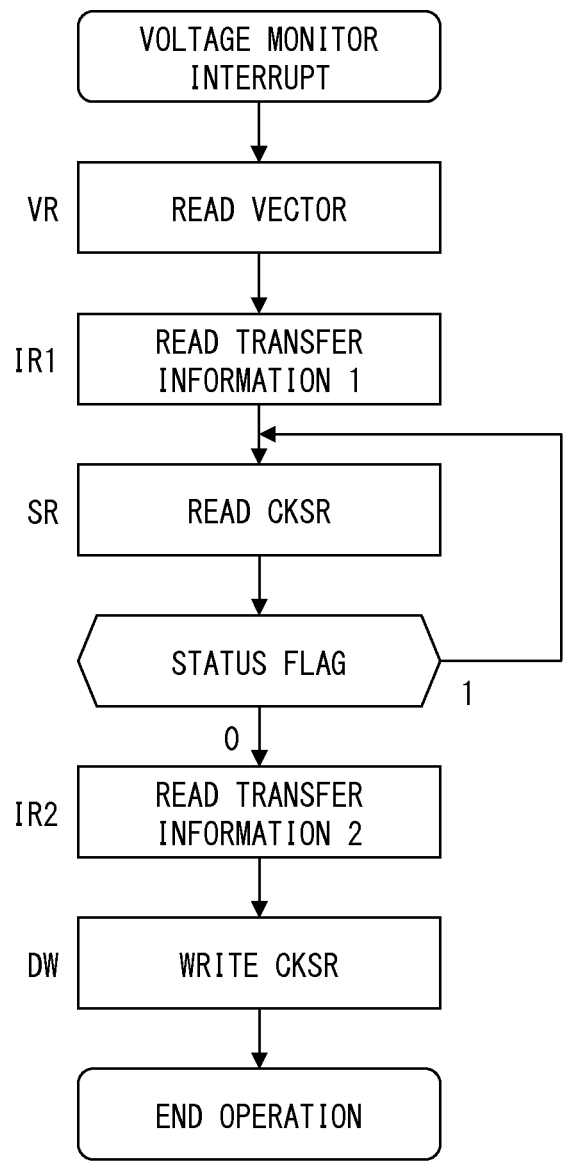
FIG. 28 is a diagram showing data transfer processing of a DTC 102 according to the first example of the sixth embodiment.

FIG. 28 is a flowchart of the process according to the first example of the usage of the DTC 102.

The CPU 101 writes required data transfer information (transfer information 1 and 2) onto a prescribed transfer information address area, and sets a DTE bit, which corresponds to a voltage monitor interrupt serving as an activation factor, to 1. In this state, when a voltage monitor interrupt occurs and the DTC 102 is activated, the DTC 102 reads the vector area corresponding to the voltage monitor interrupt (VR). The read content is the starting address of data transfer information, and the DTC 102 reads the transfer information 1 (IR1). The DTC 102 reads the CKSR according to the transfer information 1 (SR), and determines the specified bit (the status flag representing the rewrite inhibit state). This procedure is repeated until the condition is satisfied.

When the condition is satisfied, the DTC 102 performs a transfer information rewrite determination. Since the content of the transfer information 1 is not updated, the transfer information 1 is not written to the original address. Instead, the DTC 102 reads transfer information 2 (IR2). According to the transfer information 2, the DTC 102 writes the content specified by the DR to the CKSR (DW). The DTC 102 performs a transfer information rewrite determination. Since the content of the transfer information 2 is not updated, the transfer information 2 is not written to the original address. Thus, the operation of the DTC 102 ends.

Figure 29:
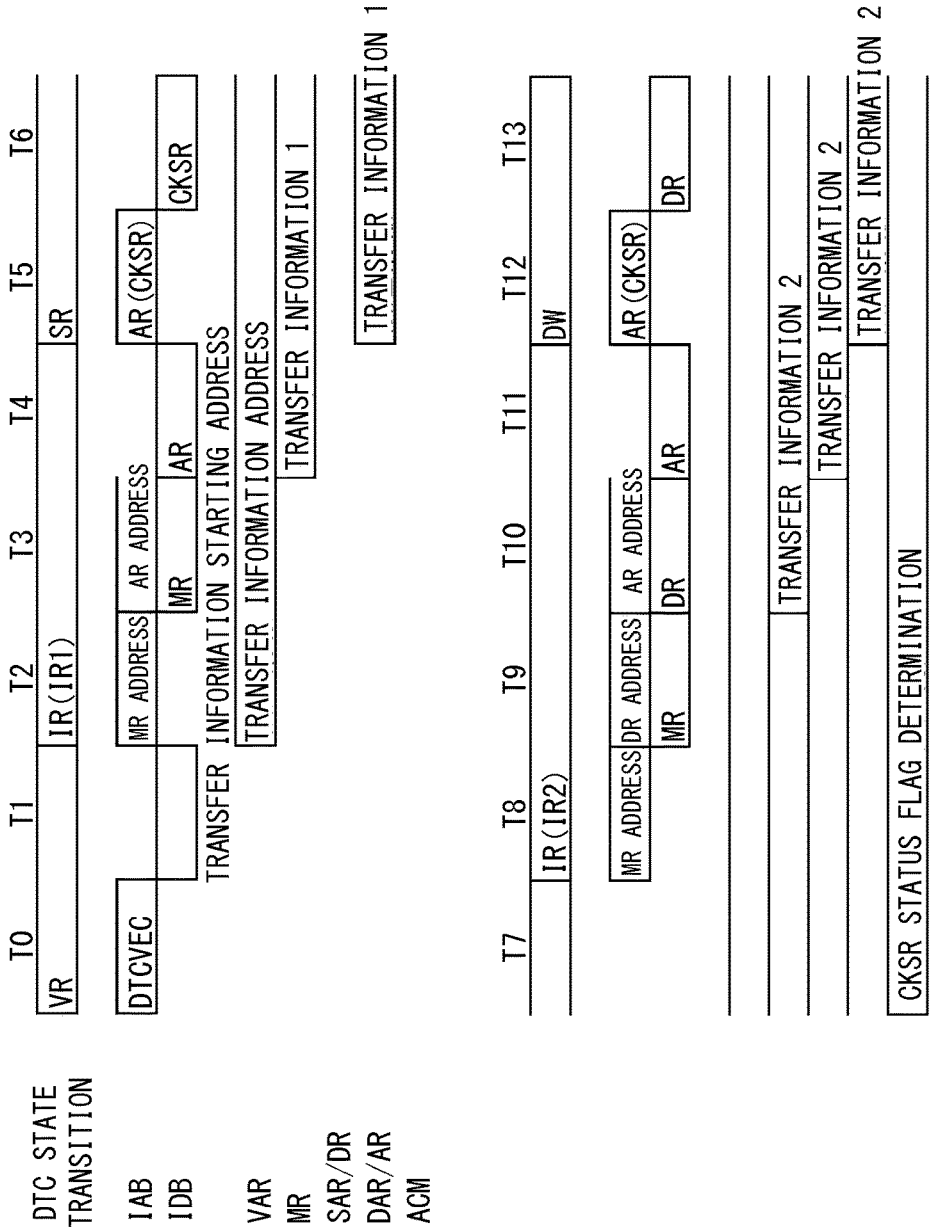
FIG. 29 is a diagram showing data transfer processing of the DTC 102 according to the first example of the sixth embodiment.

FIG. 29 is an operation timing diagram of the process according to the first example of the usage of the DTC 102.

At T0, the DTC 102 transits to the VR, and outputs an address corresponding to the provided DTCVEC onto an address bus (IAB) of the MCU internal bus, to perform a read operation. The read data (a data transfer information starting address) is provided to the data bus (IDB) of the MCU internal bus at the next timing T1. The read data is stored in the VAR.

At T2, the DTC 102 transits to the IR, and performs a read operation by outputting the VAR (the data transfer information starting address) to the IAB. The VAR is for example incremented. The DTC 102 reads data transfer information by a long word x two pieces (transfer information 1), and stores the read data transfer information in the MR and DAR/AR in the DTC 102. After the storage in the DAR/AR, the operation is enabled.

At T5, the DTC 102 transits to the SR, and performs a read operation by outputting the DAR/AR (a CKSR address) to the IAB. At T7, the bit specified by the read data is stored in the ACM, and whether or not the condition is satisfied is determined.

The storage into the ACM is performed by the ALU as follows. Firstly, data obtained by decoding BNO4 to BNO0 bits is generated. In the present example, since data is in a byte size, decoded data pieces 00000001, 00000010, . . . , are generated. AND of the generated data and the read data is derived. Further, OR of the all the bits of this data is derived. The result is transferred to the ACM.

FIG. 29 shows the case where the condition is satisfied.

The DTC 102 performs a transfer information rewrite determination, and transits to the IR at T8. The DTC 102 outputs the incremented VAR onto the IAB to perform a read operation. The DTC 102 for example increments the VAR, reads data transfer information by a long word x three pieces (transfer information 2), and stores the read data transfer information in the MR, the SAR/DR, and the DAR/AR in the DTC 102.

At T12, the DTC 102 transits to the DW. The DTC 102 outputs the DAR/AR (CKSR address) onto the IAB. At T13, the DTC 102 outputs the SAR/DR (the data to be written to the CKSR) onto the IDB, to perform a write operation.

Thus, by the operation with the transfer information 1, the CKSR is read; whether the status flag representing the rewrite inhibit state of the CPG is cleared is checked (T2 to T7); and a write to the CKSR for switching the operational clock of the MCU with the transfer information 2 can be carried out (T8 to T13).

When a voltage drop in the voltage supplied to the supply voltage input terminal is detected, stable operations can be secured by reducing the operating clock frequency of the MCU 100 to thereby reduce the power consumption of the MCU 100. This can be achieved without putting a load on the CPU 101, that is, with small power consumption.

SECOND EXAMPLE

FIG. 30 shows a data transfer information configuration according to a second example of the usage of the DTC 102 according to the sixth embodiment. The data transfer information is of a 32-bit configuration. The data transfer information is shown as being divided into two stages of higher-order side and lower-order side.

In the second example, the timer is started by an external interrupt (IRQ) that occurs upon detection of a prescribed change in a signal being input to the input/output port (I/O) 110.

The timer has a timer counter (TCNT) and a timer start register (TSTR), and the TSTR has a counter start (CST) bit. When the CST bit is set to 1, the TCNT starts to count.

Further, the timer has a compare register, and has a function of measuring a prescribed time, for example by detecting an agreement between the timer counter and the compare register and generating a compare match interrupt.

When the DTC is activated by an IRQ interrupt, transfer information 1 is read based on a prescribed vector. The content of the MR of the transfer information 1 is previously set as follows.

Setting BOP=0, DRE=1, the direct data transfer mode is specified.

Setting TSTE=TSTS=0, no conditions are set.

Setting DM1=DM0, the AR is fixed.

Setting TMD1=TMD0=0, the normal mode is specified.

Setting Sz1, Sz0=10, a word size is specified.

Setting CRE=0, the CR is not used to permit unlimited number of DTC operations.

Setting NXTE=1, an operation with transfer information 2 by a chain operation is specified.

The data register (DR) stores data (the initial value such as 0000) to be written to the TCNT.

The address register (AR) specifies the address of the TCNT.

When the operation with the transfer information 1 is ended, the transfer information 1 is written to the original address as necessary. However, with the configuration described above, since the content of the transfer information 1 is not updated, such writing is not performed. Subsequently, the transfer information 2 is read. The content of the MR of the transfer information 2 is previously set as follows.

Setting BOP=1, the bit manipulation mode is specified.

Setting DIR1, DIR0=11, read/write operations are performed from/to the address specified by the AR.

Setting INV=0, logic inversion is not performed.

Setting OP1, OP0=10, OR (bit set) is specified.

Setting CNDE=CNDS=0, no conditions for the targeted bit are set.

BNO4 to BNO0 bits specify the bit number of the CST bits of the TSTR.

Setting Sz1, Sz0=01, a byte size is specified.

Setting NXTE=0, end of the DTC operation is instructed.

The address register (AR) specifies the address of the TSTR.

Figure 31:
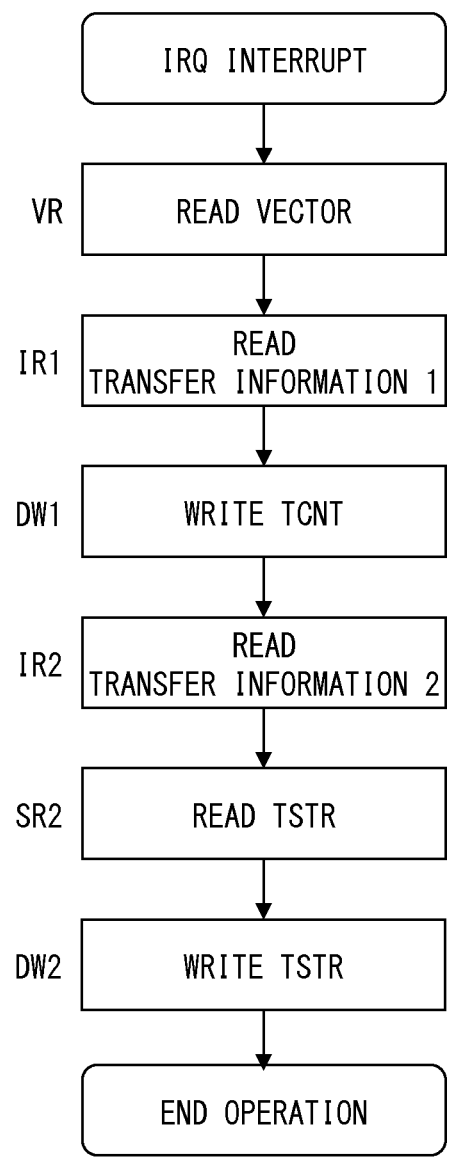
FIG. 31 is a diagram showing data transfer processing of a DTC 102 according to the second example of the sixth embodiment.

FIG. 31 is a flowchart of the process according to the second example of the usage of the DTC 102.

When an IRQ interrupt occurs and the DTC 102 is activated, the DTC 102 reads the vector area corresponding to the IRQ interrupt (VR). The read content is the starting address of data transfer information, and the DTC 102 reads the transfer information 1 (IR1). According to the transfer information 1, the DCT 102 writes the content specified by the DR to the TCNT (DW1).

The DTC 102 performs a transfer information rewrite determination. Since the content of the transfer information 1 is not updated, the DTC 102 does not write the transfer information 1 to the original address, and reads the transfer information 2 (IR2). According to the transfer information 2, the DTC 102 reads from the address (TSTR) specified by the AR (SR2). In response to the read content, the DTC 102 performs a write operation to the address specified by the AR, with the specified bit (CST bit) being set to 1, and other bits being held (DW2). The DTC 102 performs a transfer information rewrite determination. Since the content of the transfer information 2 is not updated, the DTC 102 does not perform a write operation to the original address. Thus, the operation of the DTC 102 ends.

Thus, the initial value can be set to the TCNT by the operation with the transfer information 1, and the CST bit can be set to 1 by the operation with the transfer information 2, to start the operation of the timer.

Figure 32:
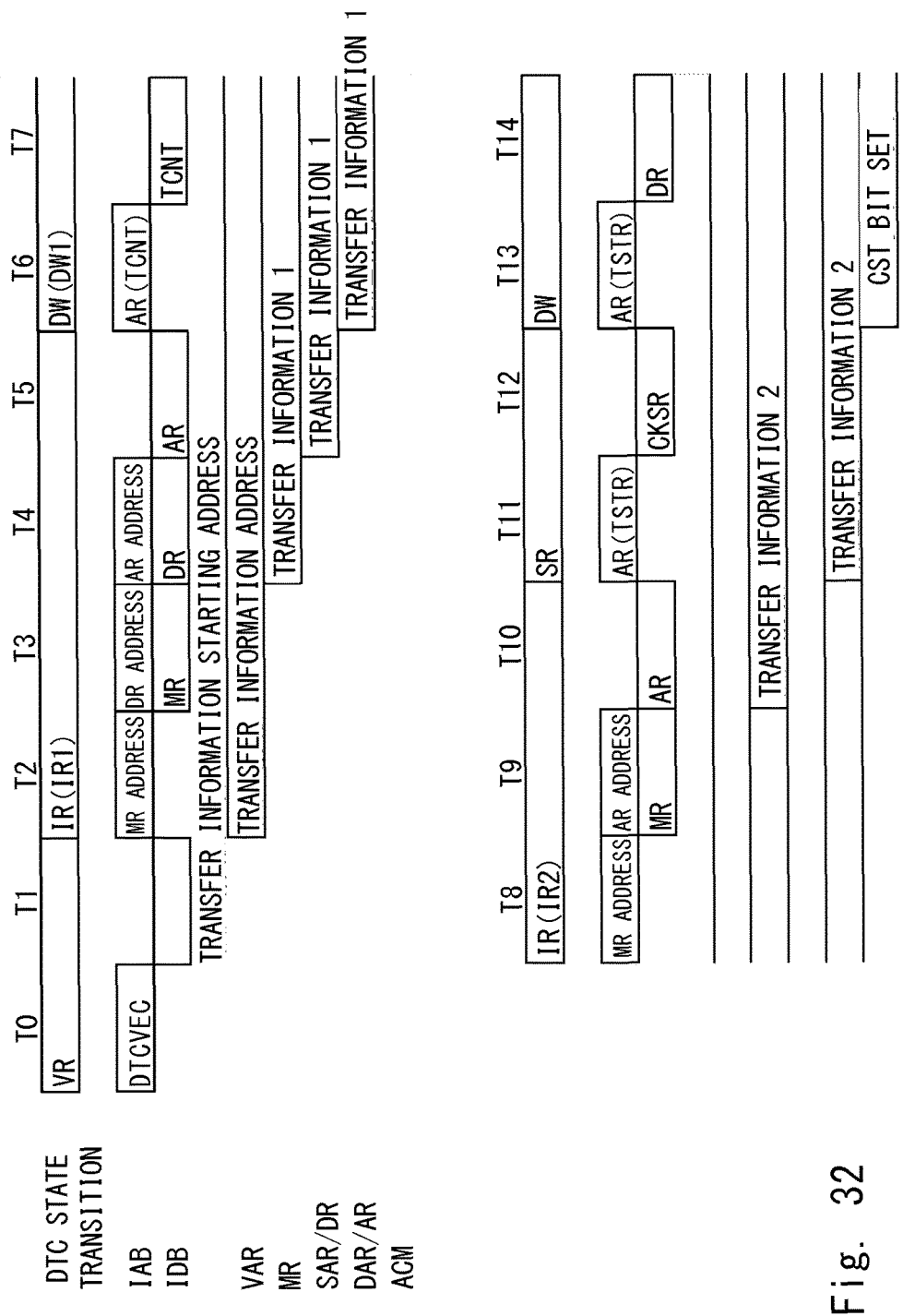
FIG. 32 is a diagram showing data transfer processing of the DTC 102 according to the second example of the sixth embodiment.

FIG. 32 is an operation timing diagram of the process according to the second example of the usage of the DTC 102. The overview is similar to FIG. 29.

At T2, the DTC 102 transits to the IR, and reads data transfer information by a long word x three pieces (transfer information 1), and stores the read data transfer information in the MR, the SAR/DR, and the DAR/AR in the DTC 102.

At T6, the DTC 102 transits to the DW, and performs a write operation to the TCNT.

At T8, the DTC 102 transits to the IR, and reads data transfer information by a long word x three pieces (transfer information 2), and stores the read data transfer information in the MR and the DAR/AR in the DTC.

At T11, the DTC 102 transits to the SR and reads the TSTR.

At T13, the DTC 102 transits to the DW, and writes to the TSTR by setting the CST bit specified by the read TSTR to 1.

Setting of the CST bit is performed as follows. The ALU generates data by decoding BNO4 to BNO0 bits, to derive OR with the read data (TSTR).

By previously setting, for example, a prescribed value to the compare register, a compare match interrupt or the like can be generated after measurement of a prescribed time. Using the compare match interrupt to activate the DTC 102, for example, the A/D converter can be activated.

Thus, it becomes possible to learn the external state, by detecting any change in the external state by IRQ and waiting for a time to lapse for the external state to stabilize, and activating the A/D converter.

THIRD EXAMPLE

FIG. 33 shows a data transfer information configuration according to a third example of the usage of the DTC 102 according to the sixth embodiment. The data transfer information is of a 32-bit configuration. The data transfer information is shown as being divided into two stages of higher-order side and lower-order side.

In the third example, an output port is inverted by external interrupts (IRQ0, IRQ1, IRQ2) that occur upon detection of a prescribed change in signals being input to, for example, three input/output ports (I/O).

The contents of the MR of data transfer information of the IRQ0, IRQ1, and IRQ2 interrupts are previously set as follows.

Setting BOP=1, the bit manipulation mode is specified.

Setting DIR1, DIR0=11, read/write operations are performed to the address specified by the AR.

Setting INV=0, logic inversion is not performed.

Setting OP1, OP0=11, XOR (BIT-NOT) is specified.

Setting CNDE=CNDS=0, no conditions for the targeted bit are set.

BNO4 to BNO0 bits specify the bit number of the targeted bit of the output port.

Setting Sz1, Sz0=01, a byte size is specified.

Setting NXTE=0, end of the DTC operation is instructed.

The address register (AR) specifies the address of the output port.

Figure 34:
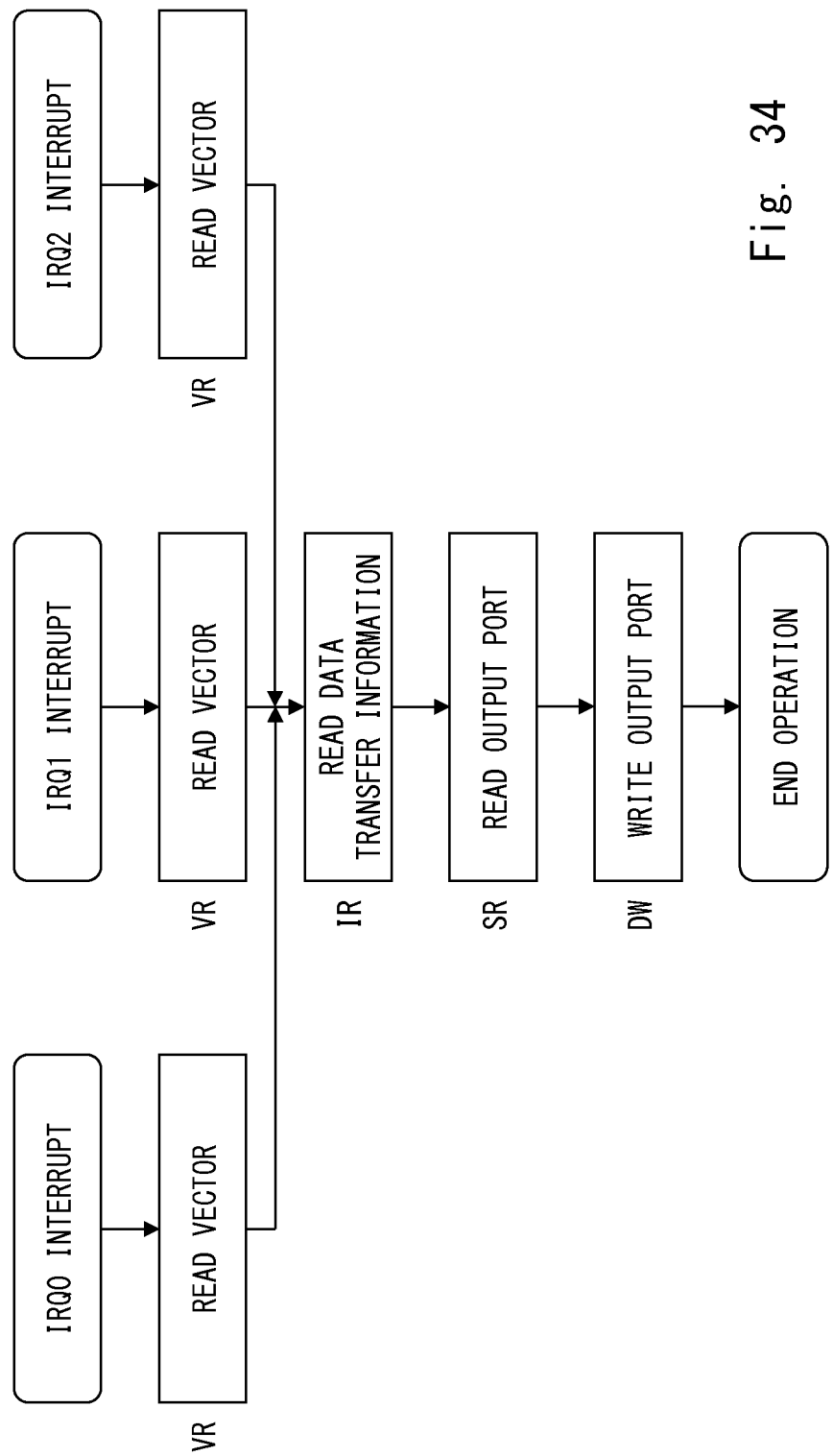
FIG. 34 is a diagram showing data transfer processing of a DTC 102 according to the third example of the sixth embodiment.

FIG. 34 is a flowchart of the process according to the third example of the usage of the DTC 102.

When IRQ0, IRQ1, and IRQ2 interrupts occur and the DTC 102 is activated, the DTC 102 reads the vector areas corresponding to the IRQ interrupts (VR). Though the vector areas are independent for the IRQ0, IRQ1, and IRQ2 interrupts, the starting address of the data transfer information specified thereby is identical.

The DTC 102 reads data transfer information from the data transfer information starting address (IR). According to the data transfer information, the DTC 102 performs a read operation from the address (output port) specified by the AR (SR). In response to the read content, the DTC 102 performs a write operation to the address specified by the AR, with the specified bit being inverted, and other bits being held (DW). The DTC 102 performs a transfer information rewrite determination. Since the content of the data transfer information is not updated, the DTC 102 does not perform a write operation to the original address. Thus, the operation of the DTC 102 ends.

A toggle switch that inverts the output port can be realized by activating the foregoing data transfer by a change in an input of any of the IRQ0, IRQ1, and IRQ2 interrupts.

FOURTH EXAMPLE

FIG. 35 shows a data transfer information configuration according to a fourth example of the usage of the DTC 102 according to the sixth embodiment. The data transfer information is of a 32-bit configuration. The data transfer information is shown as being divided into two stages of higher-order side and lower-order side.

In the fourth example, the output port is controlled in accordance with timer interrupts occurring at certain time intervals, such as compare match interrupts of the timer, e.g, signals being input to three input/output ports (I/O) 110.

In this case, operations of the DTC 102 in five bit manipulation modes are successively executed by a chain operation.

The content of the MR of the transfer information 1 is previously set as follows.

Setting BOP=1, the bit manipulation mode is specified.
Setting DIR1, DIR0=10, the address specified by the AR is read and manipulated.
Setting INV=0, logic inversion is not performed.
Setting OP1, OP0=00, no manipulation (transfer) is specified.
Setting CNDE=CNDS=0, no conditions for the targeted bit are specified.
BNO4 to BNO0 bits specify the bit number of the targeted bit of the output port.
Setting Sz1, Sz0=01, a byte size is specified.
Setting NXTE=1, an operation with the subsequent transfer information 2 by a chain operation is specified.
The Address register (AR) specifies the address of the output port.

For the sake of convenience, transfer information pieces 2, 3, and 4 are assumed to be manipulated identically, and the content of the MR is previously set as follows.
Setting BOP=1, the bit manipulation mode is specified.
Setting DIR1, DIR0=10, the address specified by the AR is read and manipulated.
Setting INV=0, logic inversion is not performed.
Setting OP1, OP0=11, XOR (inversion) is specified.
Setting CNDE=CNDS=0, no conditions for the targeted bit are specified.
BNO4 to BNO0 bits each specify the bit number of the targeted bit of the input port to refer.
Setting Sz1, Sz0=01, a byte size is specified.
Setting NXTE=1, an operation with the subsequent transfer information 3, 4 or 5 by a chain operation is specified.

The address register (AR) specifies the address of the input port to refer.

The content of the MR of transfer information 5 is previously set as follows.
Setting BOP=1, the bit manipulation mode is specified.
Setting DIR1, DIR0=11, read/write operations are performed from/to the address specified by the AR.
Setting INV=0, logic inversion is not performed.
Setting OP1, OP0=00, no manipulation (transfer) is specified.
Setting CNDE=CNDS=0, no conditions for the targeted bit are specified.
BNO4 to BNO0 bits specify the bit number of the targeted bit of the output port.
Setting Sz1, Sz0=01, a byte size is specified.
Setting NXTE=0, end of the DTC operation is instructed.
The address register (AR) specifies the address of the output port.

Figure 36:
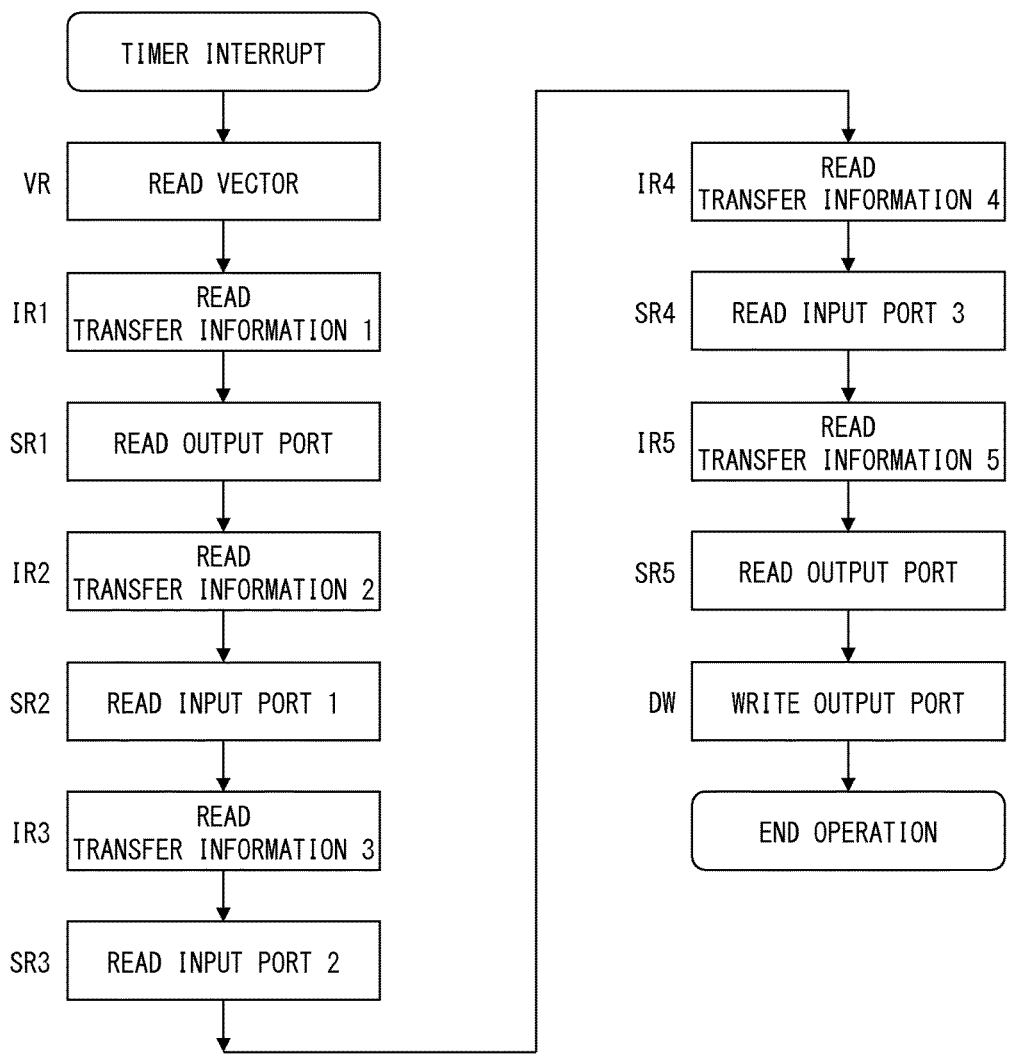
FIG. 36 is a diagram showing data transfer processing of a DTC 102 according to the fourth example of the sixth embodiment.

FIG. 36 is a flowchart of the process according to the fourth example of the usage of the DTC 102.

When a timer interrupt occurs and the DTC 102 is activated, the DTC 102 reads the vector area corresponding to the timer interrupt (VR). As described in the foregoing, the DTC 102 reads transfer information 1 (IR1). According to the transfer information 1, the DTC 102 reads the content of the output port specified by the AR (SR1). The DTC 102 stores the content of the specified bit in the bit accumulator (ACM).

The DTC 102 reads transfer information 2 (IR2). According to the transfer information 2, the DTC 102 reads the content of an input port 1 specified by the AR (SR2). The content of thus specified bit is subjected to an operation (XOR) with the ACM. The operation result is stored in the ACM. Similarly, IR3, SR3, IR4, and SR4 are executed.

Thereafter, the DTC 102 reads transfer information 5 (IR5). According to the transfer information 5, the DTC 102 reads the content of the output port specified by the AR (SR5). The DTC 102 performs a write operation while inserting the content of the ACM to the bit specified by the read data and holding other bits (DW).

Note that, the number of bits to refer can be increased or reduced arbitrarily. The operation content with such bits can be changed arbitrarily.

Through use of an interval timer, the DTC 102 can be activated at a certain time interval to perform bit operations. Thus, required control such as ON/OFF of a switch can be carried out.

(Variation: Prefetch Added)

Figure 37:
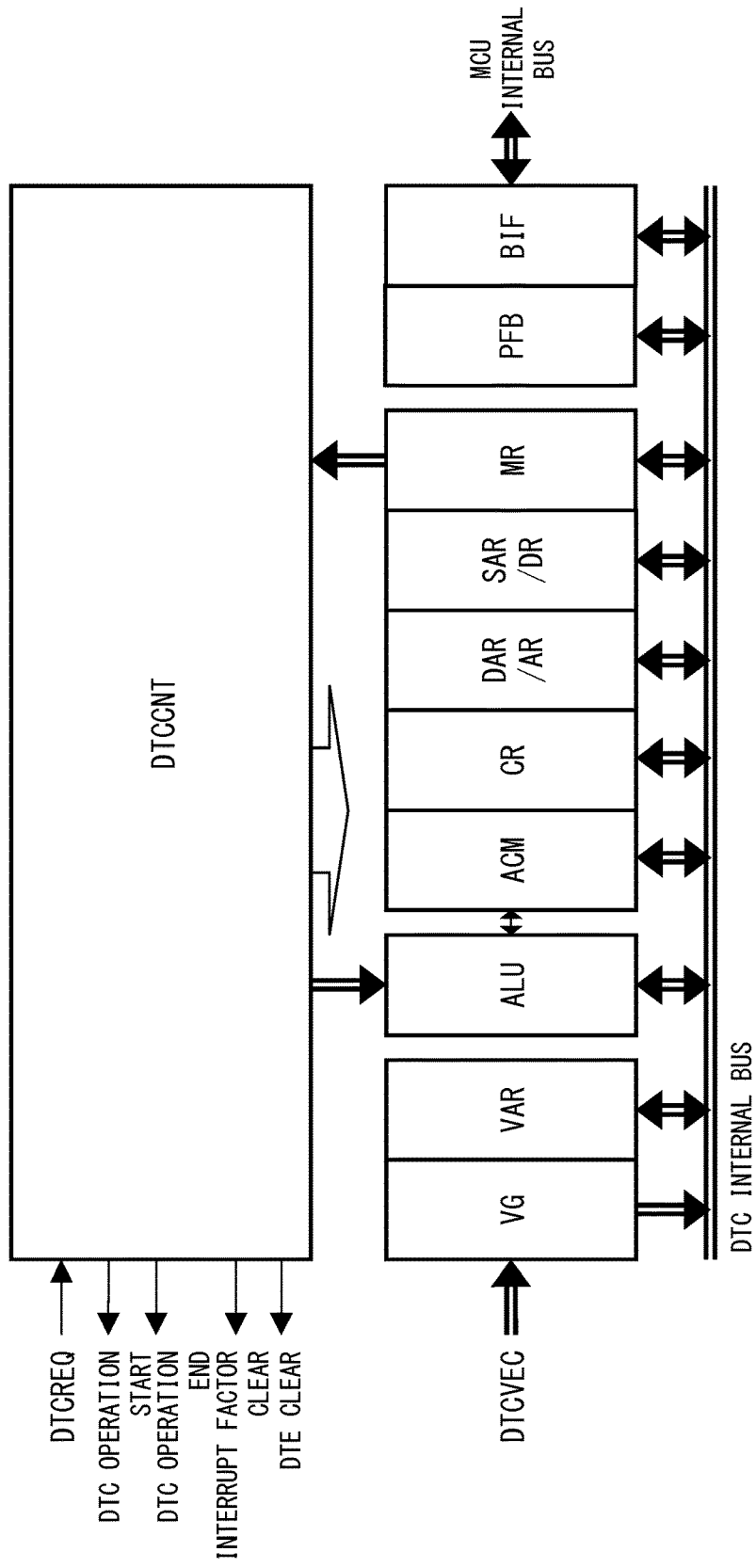
FIG. 37 is a diagram showing the configuration of a DTC 102 according to a variation of the sixth embodiment.

FIG. 37 is a block diagram of a variation of the DTC 102 according to the sixth embodiment.

The DTC 102 according to the variation includes a prefetch buffer (PFB) which is directly connected to the bus interface (BIF). The prefetch buffer makes it possible to read, in an open bus cycle during a read operation of certain data transfer information, next data transfer information.

The prefetch buffer can be prepared as many as a plurality of long words, depending on the latency of a read operation of the data transfer information, the capacity of minimum data transfer information and the like.

Figure 38:
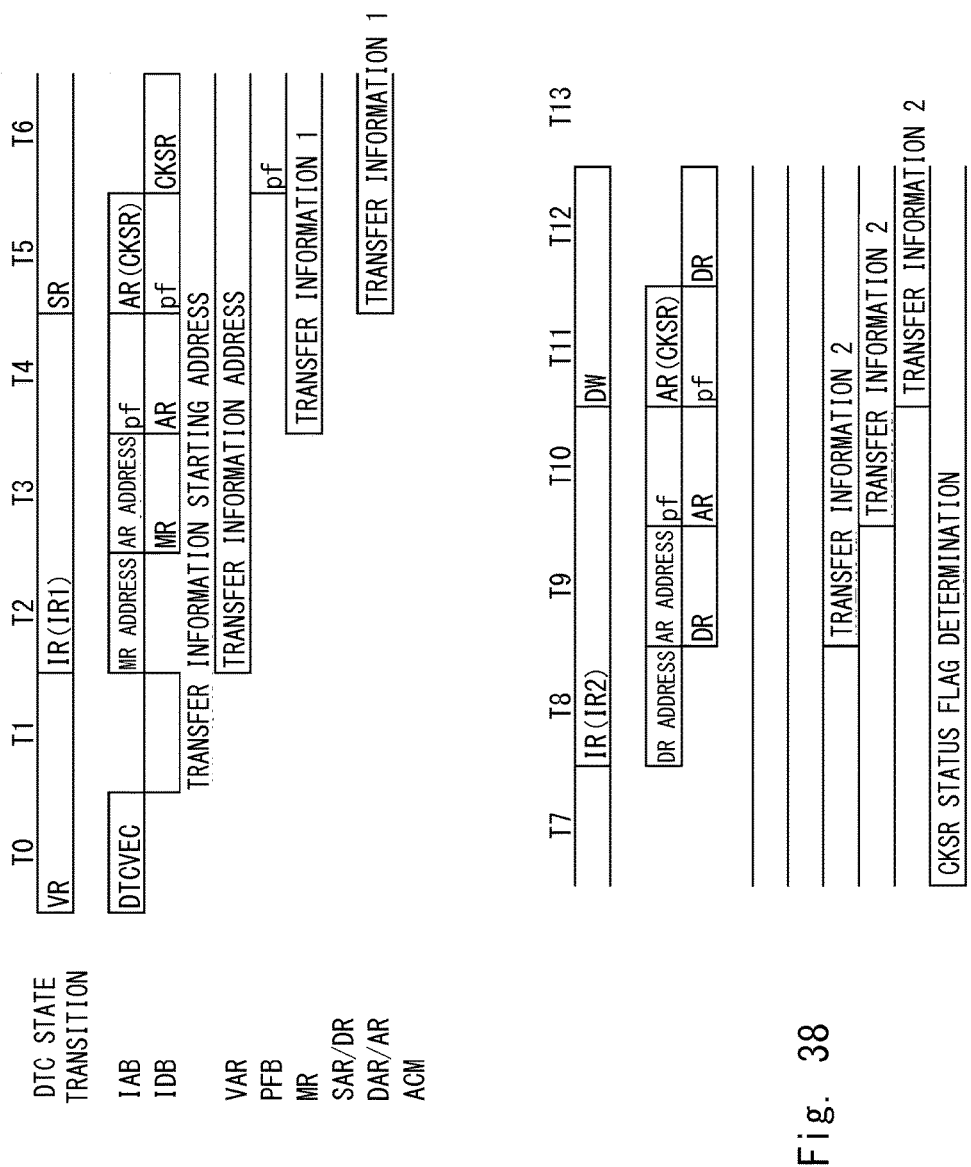
FIG. 38 is a diagram showing data transfer processing of the DTC 102 according to the variation of the sixth embodiment.

FIG. 38 is an operation timing diagram of the process according to a first example of the usage of the DTC 102 according to the variation.

As compared to the FIG. 29, FIG. 38 is characterized in that, a read operation of the first long word of the next data transfer information is performed at T4. This content is once stored in the PFB at T6.

From T8, the remaining two long words of the transfer information 2 are read. At T9, the content of the transfer information 2 held in the PFB is transferred to the MR.

The state until the read MR becomes usable in the DTC is efficiently used, and the number of states to be executed can be reduced.

(Variation: Branch Mode Added)

Figure 39:
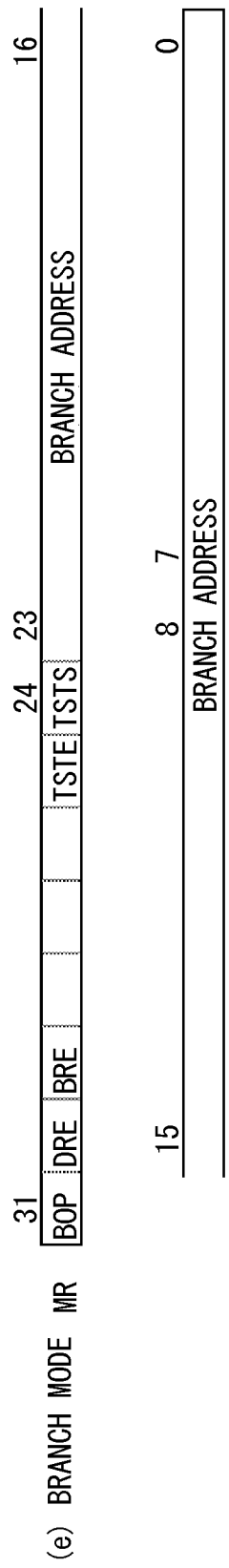
FIG. 39 is a diagram showing data transfer information according to the variation of the sixth embodiment.

A description will be given of a variation in which a branch mode is added to the DTC 102 according to the sixth embodiment. FIG. 39 shows data transfer information (a transfer information set) in the present variation. The data transfer information is of a 32-bit configuration. The data transfer information is shown as being divided into two stages of higher-order side and lower-order side.

When BOP=0, DRE=1, a BRE bit is provided at bit 29.

The direct data transfer mode is entered when BOP=0, DRE=1, BRE=0.

(e) is the branch mode, which is specified by BOP=0, DRE=1, BRE=1. In this branch mode, similarly to NXTE=1 in other modes, an operation based on the next data transfer information is performed as a chain operation. Other than to read the next data transfer information from a subsequent address, it is enabled to read (branch) data transfer information from other address.

The content of the MR is as follows.

Bit 25 is a TSTE bit. When the TSTE bit is 0, branch is unconditionally performed. When the TSTE bit is 1, whether or not to execute branch is specified by the TSTS bit and the bit accumulator (ACM).

Bit 24 is a TSTS bit. When the TSTS bit is 0 and the targeted bit is 0, the condition is satisfied and branch is executed; when the targeted bit is 1, the condition is not satisfied and data transfer information is read from the subsequent next address. When the TSTS bit is 1 and the targeted bit is 1, the condition is satisfied and branch is executed; when the targeted bit is 0, the condition is not satisfied and data transfer information is read from the subsequent next address.

Bits 23 to 0 are a branch address specifying part. This part is subjected to sign extension, and added to the VGR, to generate the starting address of next data transfer information. That is, the branch address specifying part specifies a relative value between the next address of the data transfer information and the address of data transfer information to be executed when the condition is satisfied.

Figure 40:
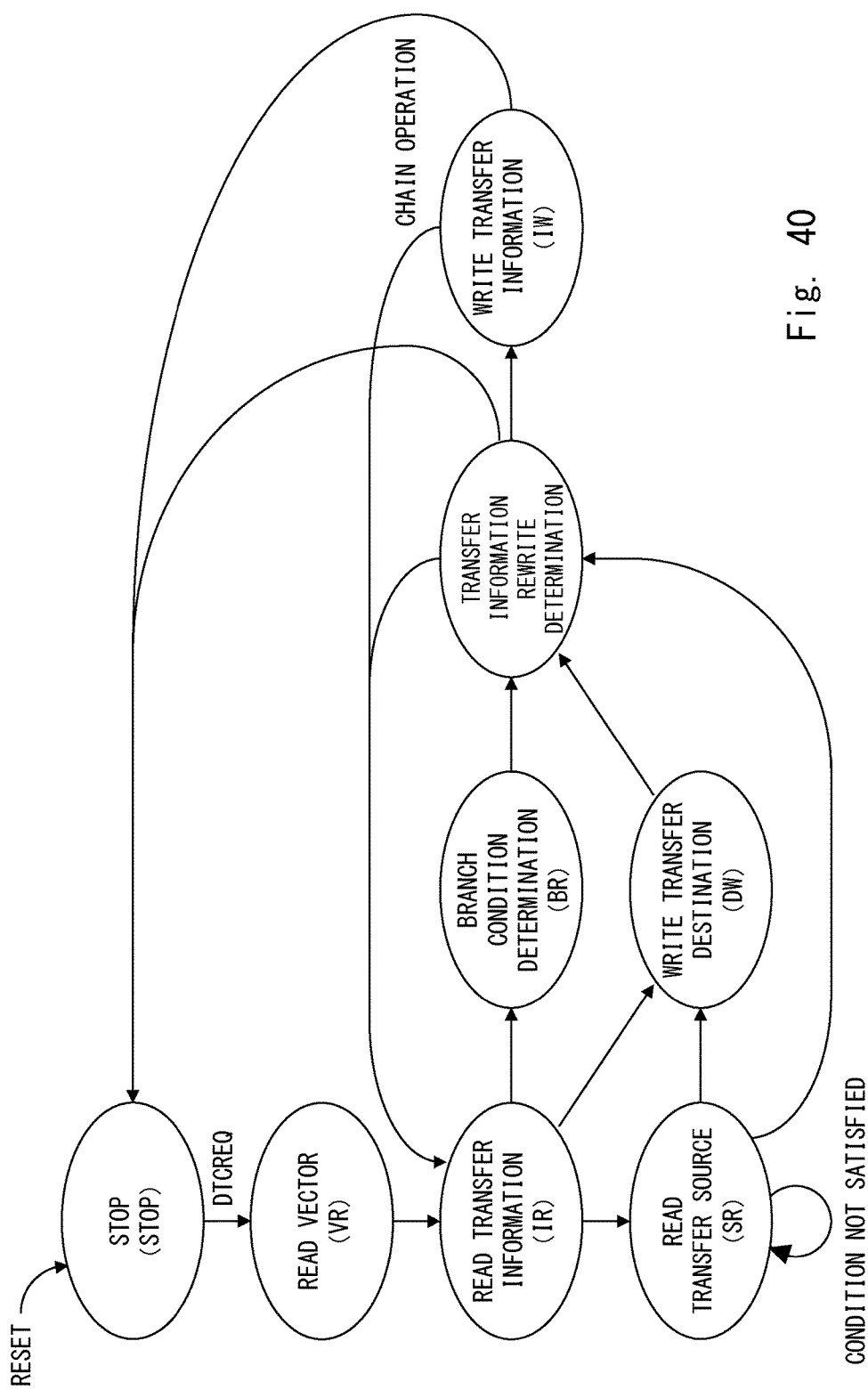
FIG. 40 is a diagram showing data transfer processing of the DTC 102 according to the variation of the sixth embodiment.

FIG. 40 shows a state transition diagram in the variation in which the branch mode is added to the DTC 102.

From the IR state, when it is the branch mode according to the MR, the state transits to the BR state.

In the BR state, the content of the bit accumulator (ACM) is checked. When the condition is satisfied, the branch address specifying part of the MR having undergone sign extension is added to the VGR. When the condition is not satisfied, addition is not performed. Thereafter, though a transfer information rewrite determination is performed, the state always transits to the IR state in the branch mode.

In the next IR state, based on the VGR subjected to the foregoing addition, data transfer information is read.

FIG. 41 shows an example in which the branch mode is additionally specified to the data transfer information configuration of the first example of the usage of the DTC 102. The data transfer information is of a 32-bit configuration. The data transfer information is shown as being divided into two stages of higher-order side and lower-order side.

No conditions are set for the transfer information 1. As to the transfer information 2, by setting BOP=0, DRE=1, and BRE=1, the branch mode is specified. Setting TSTE=1, TSTS=1, whether the targeted bit is 0 is checked. When the targeted bit is 1, the condition is satisfied, and FFFFF4 stored in bits 23 to 0 are subjected to sign extension. The result is added to the VGR to derive the starting address of the transfer information 1, and branch is executed. When the targeted bit is 0, the condition is not satisfied, and the next transfer information 3 is executed.

The transfer information 3 is identical to the transfer information 2 shown in FIG. 27.

In this manner, by enabling conditional branch, a flexible process can be realized.

Figure 42:
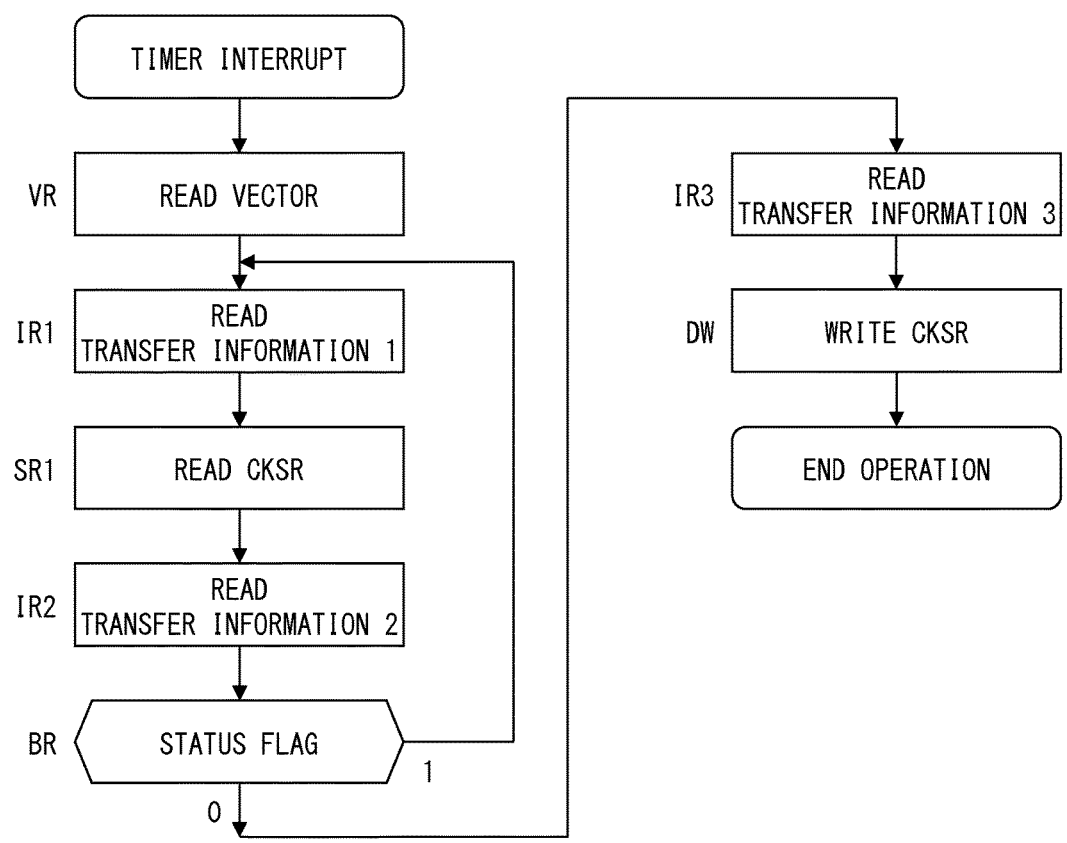
FIG. 42 is a diagram showing data transfer processing of the DTC 102 according to the variation of the sixth embodiment.

FIG. 42 is a flowchart of the variation in which the branch mode is added to the first example of the usage of the DTC 102.

When a voltage monitor interrupt occurs and the DTC is activated, the DTC reads the vector area corresponding to the voltage monitor interrupt (VR). The read content is the starting address of data transfer information, and the DTC reads transfer information 1 (IR1). According to the transfer information 1, the DTC reads the CKSR (SR). The DTC stores the specified bit in the ACM.

Next, the DTC reads transfer information 2 (IR2). According to the transfer information 2, the DTC checks the content of the ACM, and performs a branch condition determination (BR). When the condition is satisfied, the DTC adds to the VGR the result of the branch address specifying part of the MR having undergone sign extension. Then the state returns to IR1.

When the condition is not satisfied, the DTC does not perform addition and reads transfer information 3 (IR3). According to the transfer information 3, the DTC writes the content specified by the DR to the CKSR (DW). The DTC performs a transfer information rewrite determination. Since the content of the transfer information 2 is not updated, the DTC does not write to the original address and ends the operation.

(Other Variation)

Figure 43:
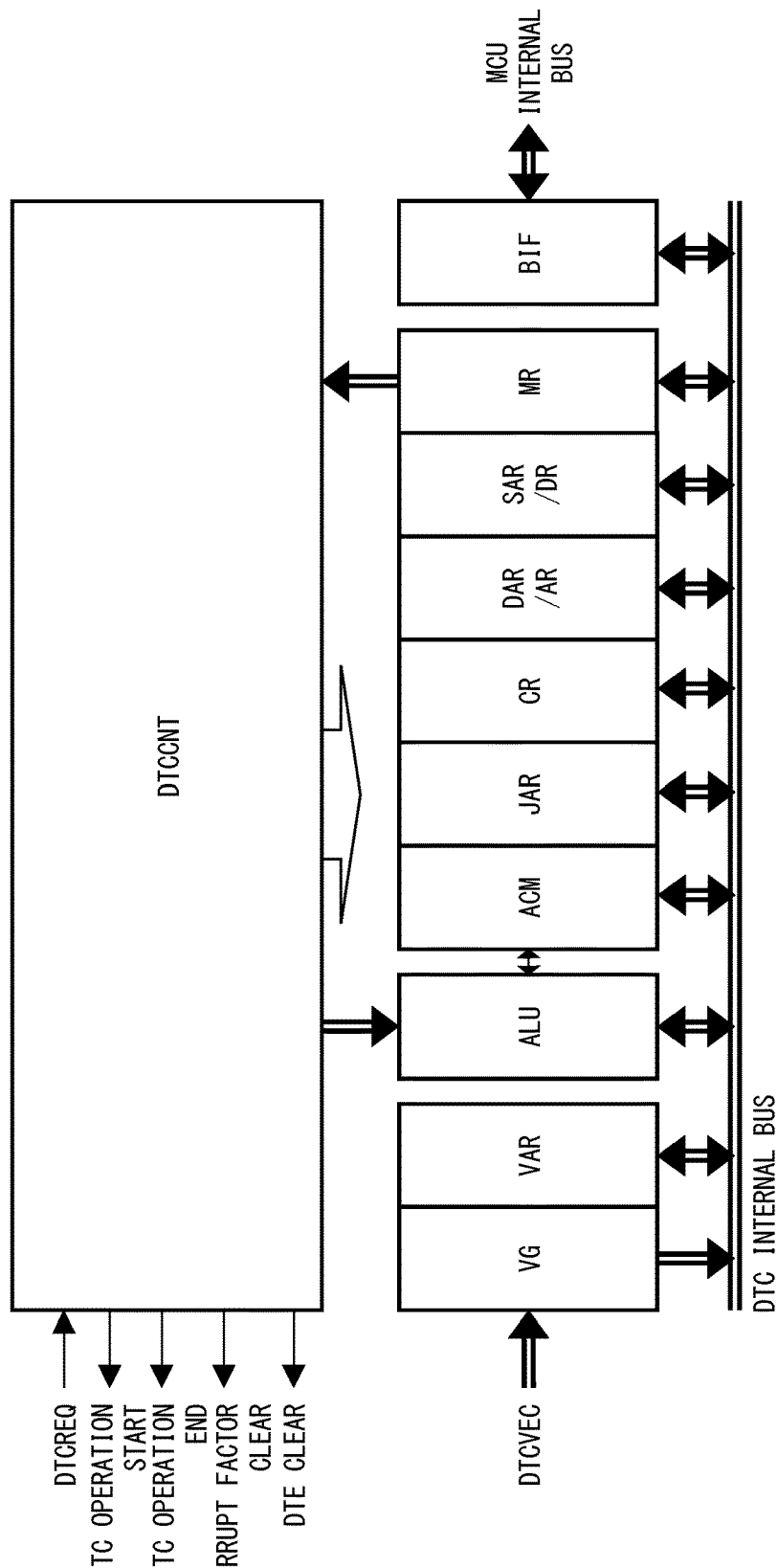
FIG. 43 is a diagram showing the data configuration of the DTC 102 according to the variation of the sixth embodiment.

FIG. 43 shows a block diagram of other variation of the DTC 102 according to the sixth embodiment.

As a register set for storing data transfer information, a branch address register (JAR) is added.

Figure 44A:
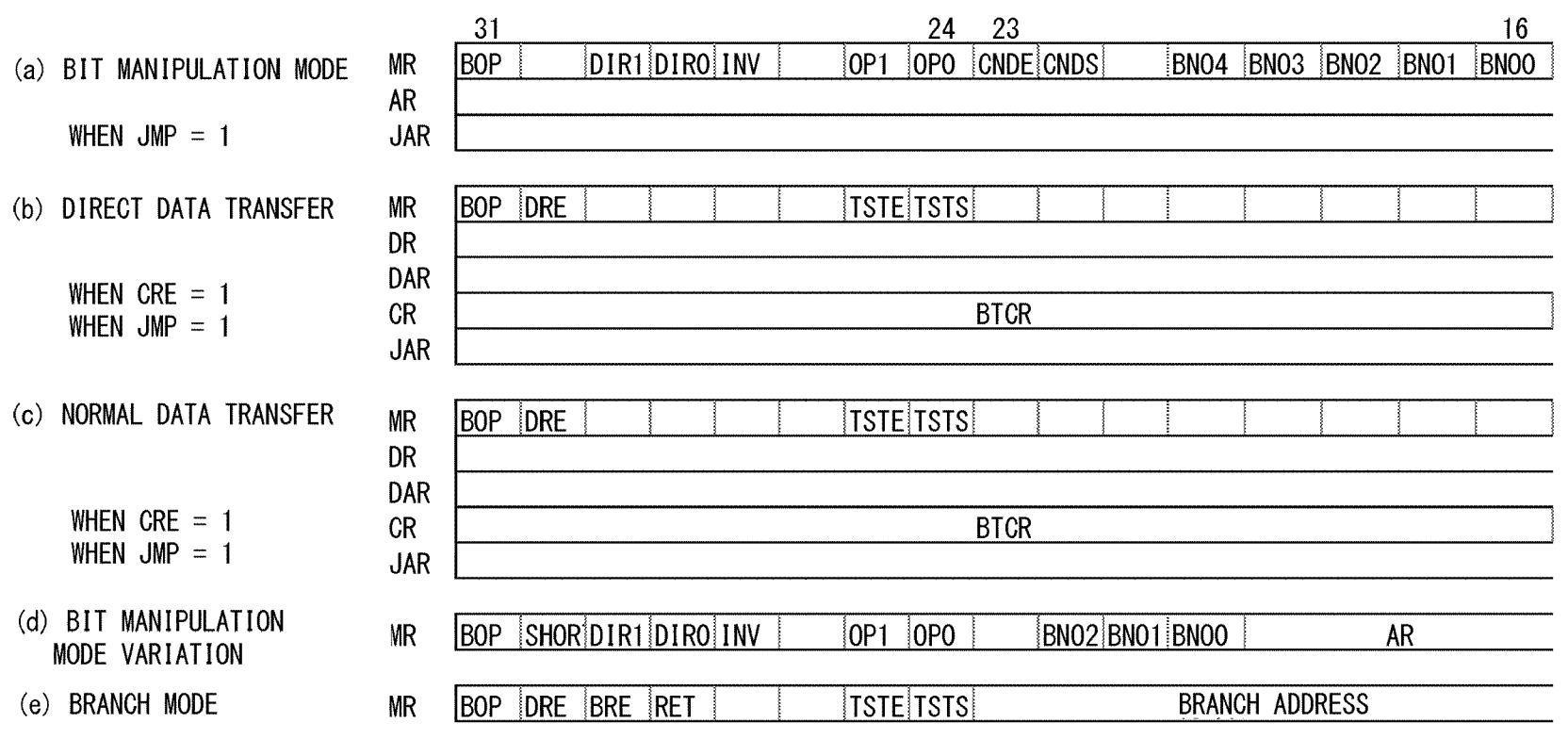
Figure 44B:
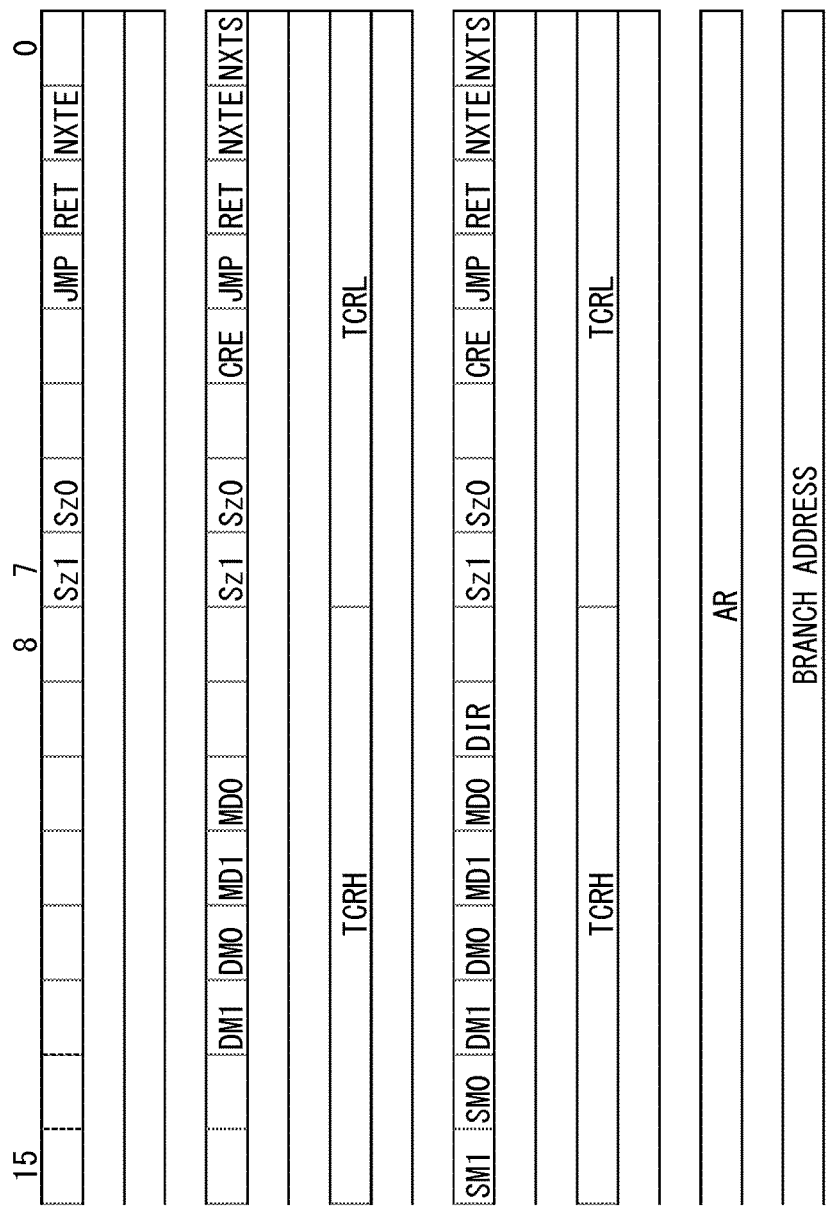
FIG. 44B is a diagram showing data transfer information according to the variation of the sixth embodiment.

FIGS. 44A and 44B show data transfer information (a transfer information set) in the above-noted configuration. The data transfer information is of a 32-bit configuration. The higher-order side of the data transfer information is shown in FIG. 44A and the lower-order side thereof is shown in FIG. 44B.

A JMP bit is added to bit 3 of the MR and a RET bit is added to bit 2 of the MR in the bit manipulation mode, the direct data transfer mode, and the normal data transfer mode. A RET bit is added to bit 28 in the branch mode.

When the JMP bit is set to 1, the JAR should be included in data transfer information. In this case, after required operations, similarly to a chain operation, next data transfer information is read. The starting address of this data transfer information is specified by the JAR in place of the VAR.

When the RET bit is cleared to 0, the JAR is copied to the VAR. When a chain operation is performed with next data transfer information, data transfer information is read from the address subsequent to the next data transfer information.

When the RET bit is set to 1, the VAR should be held. When a chain operation is performed with next data transfer information, data transfer information is read from the address subsequent to the data transfer information in which the JMP bit is set to 1.

Note that, when the JMP bit is set to 1, the NXTE and NXTS bits should be neglected. In the branch mode also, whether to copy the branch address to the VAR is selected by the RET bit.

Figure 45:
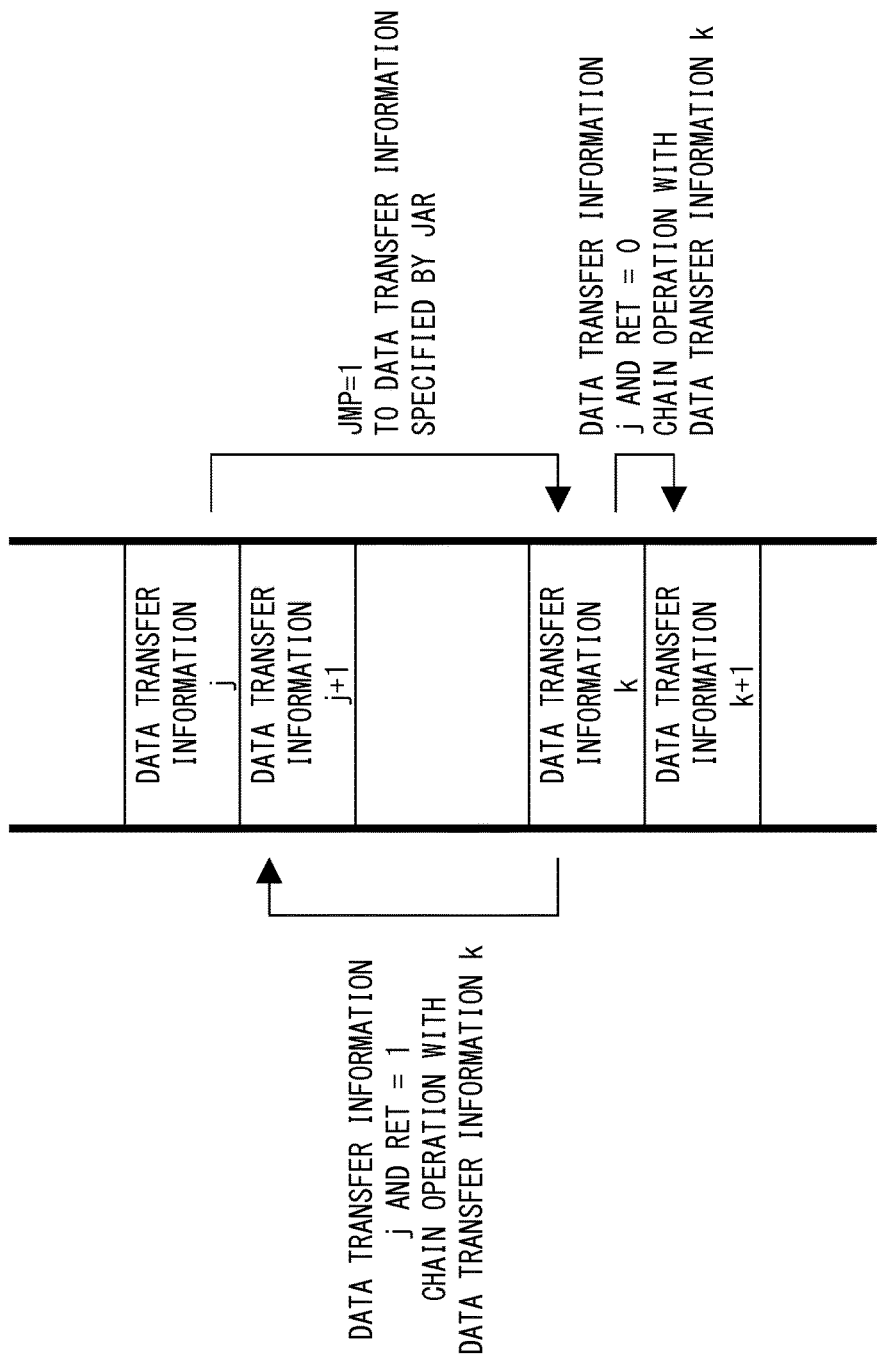
FIG. 45 is a diagram showing data transfer processing according to the variation of the sixth embodiment.

FIG. 45 shows the usage of the above-described data transfer information (the transfer information set).

When the JMP bit of the MR of data transfer information j is set to 1, and the JAR specifies the address of data transfer information k, the data transfer information j is executed and thereafter the data transfer information k is executed.

When the NXTE bit of the MR of the data transfer information k is set to 1, a chain operation is performed. However, data transfer information to be executed next differs depending on the RET bit of the MR of the data transfer information j.

When the RET bit of the MR of the data transfer information j is cleared to 0, since the VAR is updated, the data transfer information k is executed and thereafter data transfer information k+1 is executed.

When the RET bit of the MR of the data transfer information j is set to 1, since the VAR is held, the data transfer information k is executed and thereafter data transfer information j+1 is executed.

Figure 46:
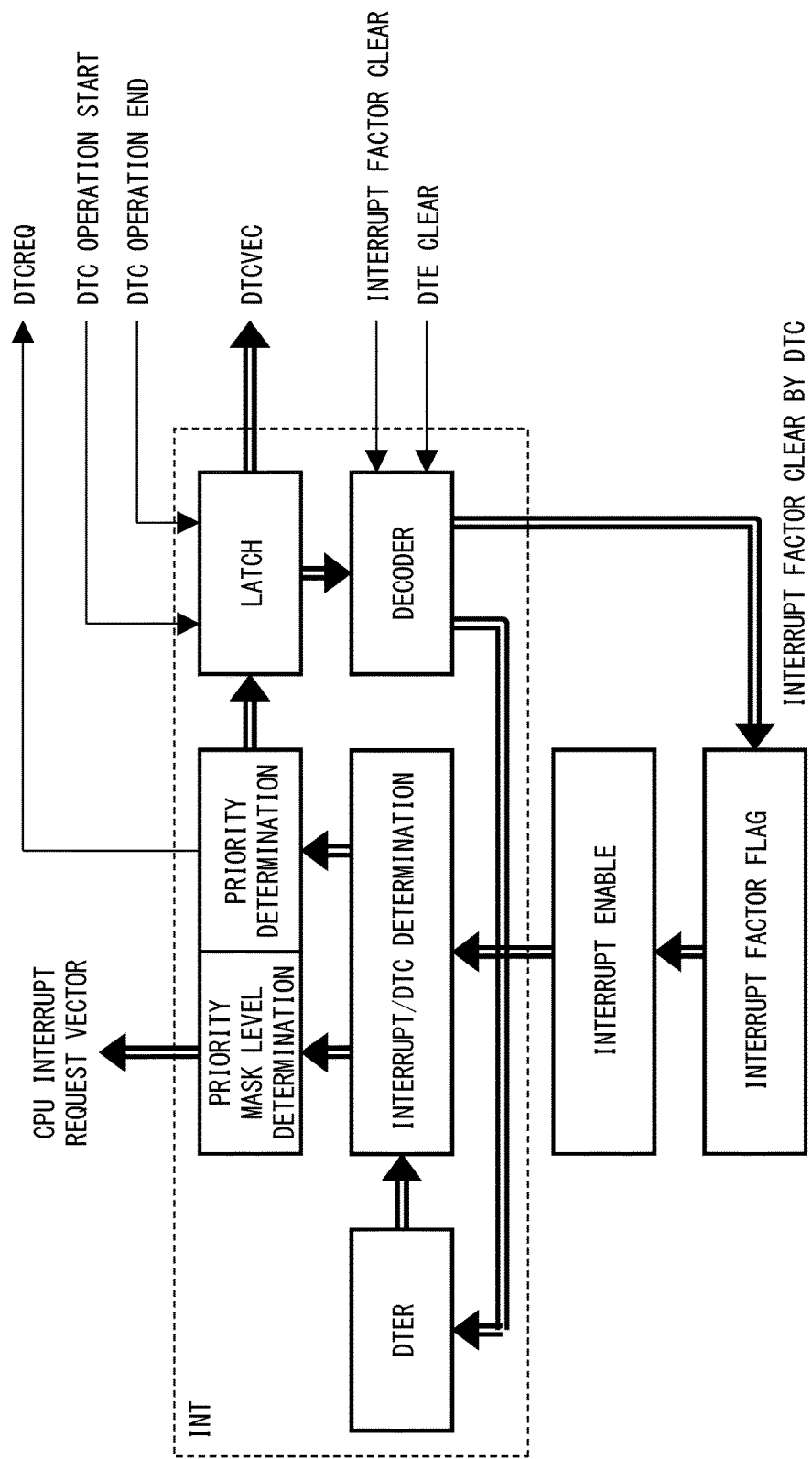
FIG. 46 is a diagram showing the configuration of an INT 103 according to the sixth embodiment.

FIG. 46 shows a block diagram of the interrupt controller (INT 103) according to the sixth embodiment.

The interrupt factors of the microcomputer each have an interrupt factor flag. The factor flag of an interrupt is set to 1 when the functional blocks of timer, communication, and analog enter a prescribed state.

The factor flag of an external interrupt is set to 1 when an external interrupt input terminal attains a prescribed level, or when a prescribed signal change has occurred. The interrupt factor flag is cleared to 0 by a write operation of the CPU 101, and also cleared to 0 when transfer by the DTC 102 has finished.

The output of each bit of the interrupt factor flag is provided to an interrupt enable circuit. The interrupt enable circuit further receives the content of the interrupt enable register, i.e., an interrupt enable bit. The interrupt enable register can be read/written by the CPU 101 and selects whether to permit or prohibit a corresponding interrupt. When the interrupt factor flag is set to 1 and the interrupt enable bit is set to 1, an interrupt is requested.

The output of the interrupt enable circuit is provided to an interrupt/DTC determine circuit. The interrupt enable circuit further receives the content of a DTC enable register (DTER). As described above, the DTC enable register selects, upon request of an interrupt, whether to activate the DTC 102 or to permit the interrupt request to the CPU 101. When the bit of the DTC enable register corresponding to the interrupt factor is set to 1, activation of the DTC 102 is requested and an interrupt of the CPU 101 is not requested. When the bit of the DTC enable register is cleared to 0, an interrupt of the CPU 101 is requested and activation of the DTC 102 is not requested.

As to the output of the DTC enable circuit, a CPU interrupt request and a DTC activation request are independently input to a priority determine circuit. A priority determine/mask level determine circuit of the CPU 101 is controlled according to a priority register, an interrupt mask level and the like.

When a plurality of interrupt requests are present for each of the CPU interrupt request and the DTC activation request, priority is determined. As a result of the determination, a request of the highest priority is selected and a vector number is generated. Then, the CPU interrupt request and the vector number, as well as the DTC activation request (DTCREQ) and the vector number (DTCVEC) are output.

The DTC activation request is input to the DTC, and the DTC vector number is input to a latch circuit. A DTC operation start signal and a DTC operation end signal are output from the DTC, and input to the latch circuit. That is, when the DTC 102 starts to operate, the DTC operation start signal enters an active state, and the vector is latched or held. Then, data transfer of the DTC 102 ends and the DTC operation end signal enters an active state, and latch is released.

Further, the DTC vector number and the DTC operation end signal are input to a decoder circuit. A factor clear signal enters an active state in response to a corresponding interrupt factor flag, and the factor flag or the DTE bit is cleared.

When the DTC 102 is activated by a prescribed interrupt factor, the CPU 101 previously writes data transfer information and the like to a required address, and sets an interrupt enable bit of the interrupt and a DTE bit corresponding to the interrupt factor of the DTC enable register to 1.

When the interrupt factor flag is set to 1 in this state, the DTC 102 is activated. In the state where the DTC 102 is executing any operation such as a prescribed data transfer, the DTC 102 clears the interrupt factor flag to 0 every time data transfer is carried out. At this time, an interrupt is not requested of the CPU 101.

When the DTC 102 has finished the prescribed data transfer or the like, the DTC 102 clears the DTE bit to 0 at the end of the operation. At this time, since the interrupt factor flag is held to 1 and the DTE bit is cleared to 0, an interrupt is requested of the CPU 101. The CPU 101 executes a process corresponding to the end of the prescribed data transfer or the like, and resets the data transfer information and the DTE bit.

Figure 47:
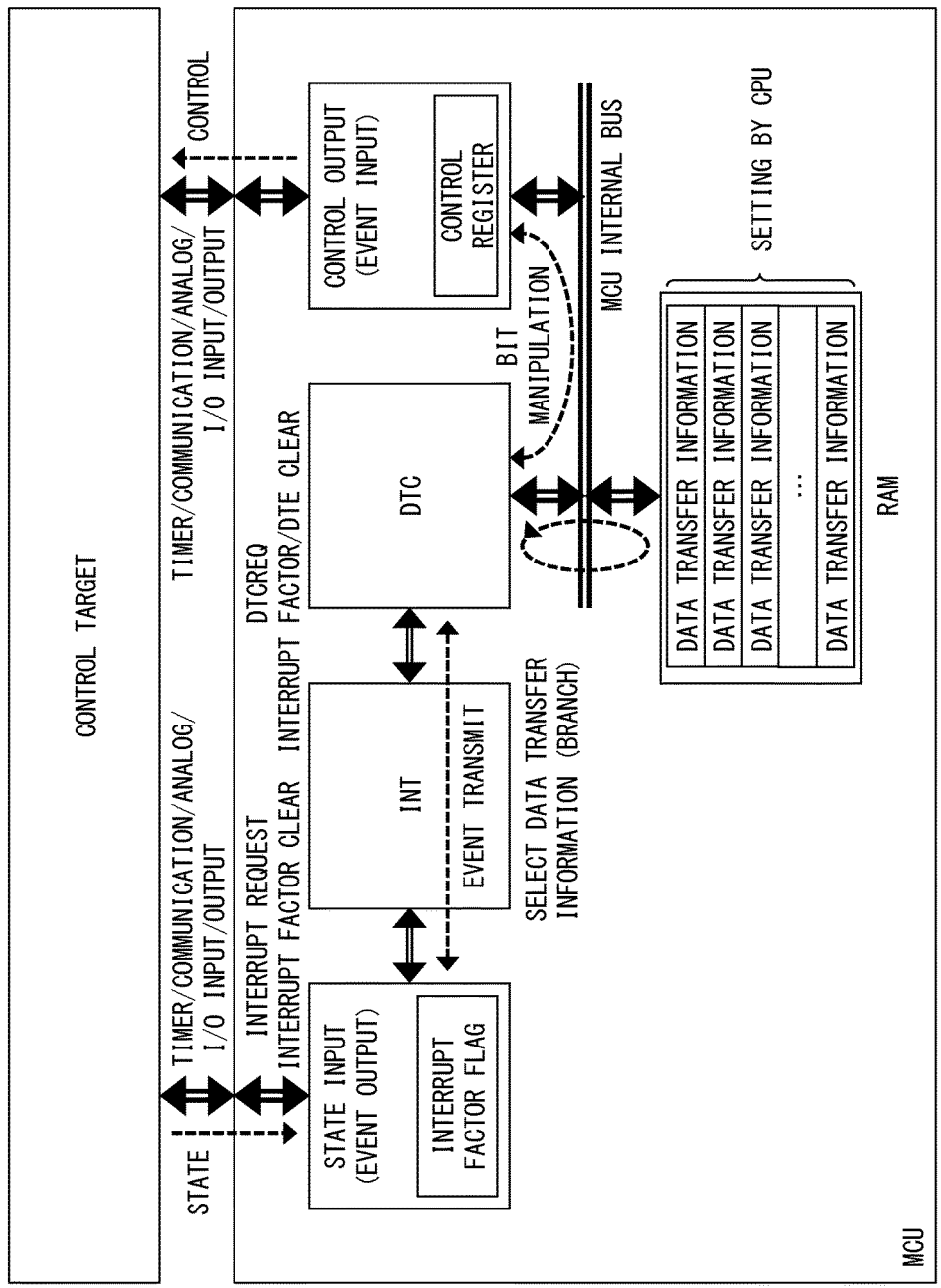
FIG. 47 is a diagram showing a system configuration using the MCU 100 according to the sixth embodiment.

FIG. 47 is a block diagram of a system using the MCU 100 according to the sixth embodiment.

The MCU 100 exerts control on a required control target. For example, with a camera lens, the MCU 100 performs motor control as to focusing, diaphragm, and anti-shake functions.

The substantial internal configuration of the MCU 100 is shown. A state input block and a control output block each include digital modules including a timer function and a communication function such as a serial communication interface, analog modules such as an A/D converter, a D/A converter, and a supply voltage detecting function, and an input/output port (I/O).

The state input block receives the state of the control target as an encode value or an analog value. According to the received value or the internal state of the functional block, the state input block generates a prescribed event. This event generation is reflected on an interrupt factor flag. This event is, for example, a compare match interrupt that is generated when an encode value reaches a prescribed value, or an A/D conversion complete interrupt that is generated when conversion of analog input has completed.

On the other hand, the control output block controls the control target by providing a timer pulse output and an analog output. The control output block includes a data register for such an output, and further includes a control register for controlling the control output block. For example, there is a counter clear bit for clearing the counter of the timer to 0.

Such an event and an interrupt factor are transmitted to the DTC 102 via the interrupt controller (INT 103).

When the DTC 102 is activated by an interrupt factor, the DTC 102 executes, to the control output block, data transfer or manipulation of the control register according to prescribed data transfer information. In reading the data transfer information, the DTC 102 performs a branch operation and switches data transfer information to be processed. Thus, the DTC 102 can execute operations corresponding to the control output block or other state.

That is, a process to the control output block in response to an event generated in the state input block can be executed by solely the DTC 102 independently of the CPU 101. By the DTC 102 reading the required control register, and performing writing by manipulating a required bit while holding other bits, required control can be exerted without influencing other state. The DTC 102 is capable of executing a process that has conventionally been executed by requesting an interrupt of the CPU 101 and switching the process.

In such a system, the CPU 101 should previously perform configuration of data transfer information or the like. In controlling the control target, the CPU 101 may be in a low-power consumption state such as a sleep or standby mode. This can contribute toward a reduction in power consumption of the system. Since the DTC 102 is smaller in logic scale than the CPU 101 and can perform fast-speed processing, the effect of reducing power consumption can be enhanced. It goes without saying that a reduction in power consumption is critical in the camera system or the like that is driven by a battery.

<Operation and Effect of Sixth Embodiment>

According to the sixth embodiment, the following operation and effect can be obtained.

(1) Since bit manipulations by the DTC is enabled, manipulations on a bit-by-bit basis corresponding to device control can be carried out in a manner of hardware. By reading data in a size such as byte, and performing a required bit manipulation to the data to carry out a write operation, as well as by writing data prepared in the DR, a variety of specifications of bit manipulations for various functions in the microcomputer can be supported. Use of a bus interface eliminates the necessity of providing a dedicated interface. Further, any data on the address space of the microcomputer can be used. Still further, the user can arbitrarily select the usage. Since the bus is exclusively controlled, it is not necessary to consider a conflict among a plurality of events. That is, acceleration can be realized. A data transfer function and a bit manipulation function operating in response to an event are realized by a single piece of hardware and switched by data transfer information. Accordingly, the interrupt controller, the DTC vector and the like can be shared by the functions, and hence the hardware configuration can be simplified.

(2) Since data transfer information that specifies a bit manipulation is stored in memory, the number of targets of a bit manipulation can be increased. The number of bit manipulations or data transfer carried out at once by a chain operation or the like can be increased. A common bit manipulation can be realized by a plurality of activation factors. Since bit manipulations are enabled, terminals to be used or the channels of the timer can be flexibly changed in accordance with the specification of the microcomputer and the control target. Since dedicated hardware should be provided by the number of pieces required for one data transfer, an increase in the physical scale of the whole microcomputer can be suppressed even when functions are added and the hardware scale is increased. Since the data transfer function and the bit manipulation function are realized by a single piece of hardware, a further increase in the physical scale can be suppressed.

(3) Bit manipulations can be successively executed by a chain operation. Furthermore, a prescribed bit state and a result of an operation of the state can be stored in the bit accumulator to be used in the next bit manipulation. Accordingly, a plurality of bit manipulations, such as manipulation based on a plurality of bits, can be combined. Since it is enabled to check the state of a required bit and change an operation of the DTC, a further flexible operation can be realized.

(4) In reading data transfer information by the DTC, other than operations with successive pieces of data transfer information, a branch operation can be performed. Accordingly, a plurality of pieces of data transfer information can be successively processed in a required order. Since selection as to whether to perform a branch operation based on a determination of the state of a specified bit is enabled, processing that corresponds to the state of a control target of the microcomputer or the like can be realized.

(5) In reading data transfer information by the DTC, since part of the subsequent next data transfer information is previously read, the executed states can be reduced.

(6) Since the volume of the data transfer information can be changed, the capacity of the used RAM can be saved. Hardware corresponding to the maximum data transfer information volume should be provided by a single piece. Accordingly, an increase in the physical scale of the whole microcomputer can be suppressed. Since data transfer information of the optimum volume is read/written, the number of times of read/write can be minimized, contributing toward acceleration.

(7) A specification to disable the CR can be provided. Accordingly, separately from data transfer of a prescribed number of times, control that corresponds to the state of the microcomputer can be carried out for any number of times. Data transfer information is shortened to realize acceleration of the DTC operation and an improvement in efficient use of memory. Further, by disabling the CR, update of data transfer information can be eliminated and the necessity of write-back of the data transfer information can be eliminated. Specifically, in the examples described in the embodiment, data transfer information is not updated, and the data transfer information can be arranged on the ROM. Arranging data transfer information on the ROM, the necessity of initial write on the RAM can be eliminated. Further, the capacity of the used RAM can be saved.

(8) Since the DTC can execute data transfer or a bit manipulation in place of the CPU, the frequency of interrupts required of the CPU can be reduced, or the period in which the CPU stays in a low-power consumption state can be increased. Execution of exception handling, stack save/restore operations, a restore instruction that must otherwise be executed by the CPU in interrupt handling can be dispensed with. This contributes toward simplified programs and improved efficiency of the system. Further, a time taken from an occurrence of an event to execution of a required operation can be reduced. That is, what is called responsiveness can be improved. Since the DTC smaller in logic scale and being capable of achieving high-speed processing operates and the CPU is maintained in a low-power consumption state, a reduction in power consumption can be realized.

<Variation of Sixth Embodiment>

The sixth embodiment is not limited to the configuration described above, and can be modified in various manners within a range not deviating from the gist of the invention.

For example, though it has been described that data transfer information has a length being variable by a unit of 32 bits, this unit can be arbitrarily set. The number of bits of the address register is not limited to 32 bits, and can be changed in accordance with the address space of the CPU or the microcomputer. For example, the number of bits should be 24 bits for the address space of 16 Mbyte. The branch address specifying part may hold the content ¼ as great as data transfer information, based on that data transfer information is in a long word (32 bits). The branch address should be multiplied by four when added to the VGR. The range of branch can be widened. Alternatively, the branch address specifying part may be a long word separately from the MR. It may specify a relative address or a direct address.

Further, the program of the CPU 101 may be arranged on external memory instead of the ROM 104. Similarly, the memory being the work area of the CPU 101 is not limited to the RAM 105 and may be external memory. Further, the ROM 104 or the RAM 105 may not be on-chip.

As to data transfer information of the DTC 102 also, instead of being arranged on the RAM 105, it may be arranged on the ROM 104 or on external memory. Data transfer information that is not rewritten may be arranged on the ROM 104. However, when the CPU 101 accesses to the ROM 104 highly frequently, the data transfer information that is not rewritten can also be arranged on the RAM 105.

In addition to the DTC 102, a data transfer apparatus such as a DMA controller can be provided. The function of the DTC 102 and that of the DMA controller can be realized in a single function module.

Specific configuration of the DTC 102 and the interrupt controller can also be modified in various manners.

Though the BSC, the bus right, bus operations such as wait has not been detailed, they can be realized as appropriate.

The configuration of the MCU 100 is also not limited. The included functional blocks and others can be modified in various manners.

<Other Embodiment>

In the foregoing, though the description has been chiefly given of the embodiments in which the invention made by the present inventor is applied to a microcomputer that belong to the background field of the invention, the present invention is not limited thereto. The present invention can be applied also to other semiconductor integrated circuit apparatus, for example a semiconductor integrated circuit apparatus mainly realizing a digital signal processor (DSP). The present invention is at least applicable to a semiconductor integrated circuit apparatus including a data processing apparatus and a data transfer apparatus therein.

Further, the description of the embodiments and accompanying drawings are appropriately omitted or simplified, for the sake of clarity. Further, the elements shown in the drawings as functional blocks that carry out various processes can be structured by hardware having any circuit configuration. Alternatively, they may be realized by software such as programs loaded on memory. Accordingly, a person skilled in the art can understand that these functional blocks can be realized by various manners, such as by solely hardware, solely software, or a combination thereof, without being limited to any of these manners. Note that, throughout the drawings, identical reference symbols are allotted to identical elements. As necessary, a repetitive description is omitted.

Further, the program can be stored in a non-transitory computer readable medium of various types, to be provided to a computer. The non-transitory computer readable medium includes a tangible storage medium of various types. Examples of the non-transitory computer readable medium include a magnetic recording medium (e.g., a flexible disk, a magnetic tape, a hard disk drive), a magneto-optical recording medium (e.g., a magneto-optical disk), CD-ROM (Read Only Memory), CD-R, CD-R/W, a semiconductor memory (e.g., mask ROM, PROM (Programmable ROM), EPROM (Erasable PROM), flash ROM, and RAM (Random Access Memory)). Further, the program may be provided to a computer using a transitory computer readable medium of various types. Examples of the transitory computer readable medium include electric signals, optical signals, and electromagnetic waves. The transitory computer readable medium can provide the program to the computer via a wired communication line such as an electric wire and optical fibers or a wireless communication line.

The first to sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A microcomputer, comprising:
   a central processing unit;
   a data transfer apparatus; and
   a storage apparatus,
   wherein the storage apparatus stores a transfer information set that includes transfer mode information and address information, the address information representing at least one of a transfer source, a transfer destination, and a manipulation target,
   wherein the data transfer apparatus includes a plurality of register files each including a mode register storing the transfer mode information, an address register to which the address information is transferred, and a status register representing information specifying the transfer information set,
   wherein the data transfer apparatus checks the information of the status register, to determine whether to use the transfer information set held in the register files or to read the transfer information set from the storage apparatus and to rewrite a prescribed one of the register files,
   wherein the data transfer apparatus performs data transfer based on the transfer information set stored in one of the register files,
   wherein in checking the information of the status register, the data transfer apparatus compares an interrupt vector number, which is provided to the data transfer apparatus, with a vector number held in the status register in each of the register files.

2. The microcomputer according to claim 1, wherein the transfer information set farther includes transfer count information,
   wherein the register files each further include a count register to which the transfer count information is transferred, and a valid information flag unit for the transfer information set,
   wherein the data transfer apparatus sets the valid information flag unit when the data transfer apparatus has stored, in one of the register files, the transfer information set read from the storage apparatus, and wherein the data transfer apparatus clears the valid information flag unit when the data transfer apparatus determines that, based on the transfer count information, data transfer of a specified number of times has finished.

3. The microcomputer according to claim 1 further comprising a transfer information storage specify unit, wherein the transfer information storage specify unit includes the information specifying the transfer information set, and wherein the data transfer apparatus reads, in response to an instruction from the transfer information storage specify unit and according to the information specifying the transfer information set, the transfer information set from the storage apparatus and stores the read transfer information set in one of the register files.

4. The microcomputer according to claim 2, wherein the register files each include a flag unit that instructs holding of the transfer information set, wherein the data transfer apparatus sets, when the data transfer apparatus has read the transfer information set from the storage apparatus and stored the read transfer information set in one of the register files in response to the instruction from the transfer information storage specify unit, the flag unit that specifies holding of the transfer information set, and wherein, in a state where both the valid information flag unit and the flag unit that instruct holding of the transfer information set are set, the data transfer apparatus does not rewrite corresponding one of the register files.

5. The microcomputer according to claim 4, wherein, in the state where both the valid information flag unit and the flag unit that instruct holding of the transfer information are set, the data transfer apparatus does not write back the transfer information set stored in the corresponding one of the register files to the storage apparatus.

6. The microcomputer according to claim 1, wherein the information specifying the transfer information set corresponds to information specifying an address storing an address of the transfer information set.

7. The microcomputer according to claim 1, wherein the information specifying the transfer information set corresponds to information specifying an address of the transfer information set.

8. A microcomputer, comprising:
a central processing unit;
a data transfer apparatus;
a storage apparatus; and
a transfer information storage specify unit,
wherein the storage apparatus stores a transfer information set that includes transfer mode information, address information representing at least one of a transfer source, a transfer destination, and a manipulation target, and transfer count information,
wherein the data transfer apparatus includes a register file including a mode register storing the transfer mode information, an address register to which the address information is transferred, and a count register to which the transfer count information is transferred, the data transfer apparatus further including a successive data transfer specify unit,
wherein the transfer information storage specify unit includes information specifying the transfer information set,
wherein the data transfer apparatus reads, in response to an instruction from the transfer information storage specify unit and according to the information specifying the transfer information set, the transfer information set from the storage apparatus and stores the read transfer information set in the register file, wherein the data transfer apparatus immediately executes data transfer when the successive data transfer specify unit is set ,and wherein the transfer set information on the storage apparatus is directly used to set an initial value prepared on the storage apparatus to a prescribed address on the microcomputer.

9. The microcomputer according to claim 8, wherein the information specifying the transfer information set corresponds to information specifying an address of the transfer information set.

10. A microcomputer, comprising:
a central processing unit;
a data transfer apparatus;
a first storage apparatus that fixedly holds information; and
a second storage apparatus that rewritably holds information,
wherein the first storage apparatus stores a transfer information set that includes transfer mode information, address information representing at least one of a transfer source, a transfer destination, and a manipulation target, and transfer count information,
wherein the data transfer apparatus includes a register file including a mode register storing the transfer mode information, an address register to which the address information is transferred, and a count register to which the transfer count information is transferred,
wherein the data transfer apparatus is activated after the microcomputer starts to operate, the data transfer apparatus reading the transfer information set from the first storage apparatus, and the data transfer apparatus storing the read information in the register file,
wherein the data transfer apparatus executes successive data transfer from the first storage apparatus to the second storage apparatus, and
wherein the data transfer apparatus writes back transfer information set on a data transfer information arrange area and performs a chain operation to clear bites of the mode register.

11. The microcomputer according to claim 10, wherein the transfer mode information includes successive data transfer specify information.

12. The microcomputer according to claim 1, further comprising:
a data input/output unit; and
an interrupt control unit,
wherein the data input/output unit issues an interrupt request to the interrupt control unit, and
wherein, in response to the interrupt request, the interrupt control unit outputs an interrupt signal to the central processing unit, and outputs an activation request to the data transfer apparatus.

13. The microcomputer according to claim 1, wherein, the transfer mode information includes information specifying a bit manipulation and information specifying a bit in data specified in the address information as the manipulation target, and wherein when the bit manipulation is specified, the data transfer apparatus reads the transfer information set from the storage apparatus, and reads an address specified by the address information to execute the manipulation using the specified bit.

14. The microcomputer according to claim 13, wherein the data transfer apparatus includes a unit that stores a bit specified by the transfer mode information in the bit manipulation using the transfer information set, and
  wherein in an operation using a next one of the transfer information set, the data transfer apparatus enables the unit that stores the specified bit.

15. The microcomputer according to claim 14, wherein the transfer mode information includes information specifying a branch operation,
  wherein the data transfer apparatus refers, in performing the branch operation using the transfer information set, to the unit that stores the specified bit, to select an address that specifies the next one of the transfer information set.

16. The microcomputer according to claim 15, wherein the transfer information set includes information specifying a condition for the branch operation, and information specifying the next one of the transfer information set,
  wherein the data transfer apparatus includes a count unit to read and write the transfer information set,
  wherein when the information specifying the branch operation condition and the specified bit are satisfied a prescribed condition, the data transfer apparatus performs an operation with the count unit and the information specifying the next one of the transfer information set.

17. The microcomputer according to claim 1, wherein the storage apparatus includes a transfer information set that includes at least one of transfer mode information, a transfer source address, a transfer destination address, transfer count data specifying a number of times of transfer, and data information,
  wherein the data transfer apparatus includes a mode register storing the transfer mode information, a register to which the transfer source address, the transfer destination address, and the transfer count data are transferred, a data register, and an arithmetic logic unit,
  wherein the data transfer apparatus is capable of performing a data transfer based on the transfer mode information, the transfer source address, the transfer destination address, and the transfer count data,
  wherein the data transfer using the transfer information set is performed by the data transfer apparatus in a unit cycle of:
    reading the transfer information set from the storage apparatus; performing a prescribed transfer based on the transfer information set; and
    thereafter writing back information included in the transfer information set to the storage apparatus, and
  wherein the transfer mode information includes information specifying an item to be used, among the transfer source address, the transfer destination address, the transfer count data specifying the number of times of transfer, and the data information.

18. The microcomputer according to claim 17, wherein the data transfer apparatus reads, subsequently to the reading of the transfer information set, part of a next one of the transfer information set, and
  wherein the data transfer apparatus has a buffer unit that stores the read part of the next one of the transfer information set.

19. The microcomputer according to claim 17, wherein the central processing unit includes a unit that sets the transfer information set.

20. The microcomputer according to claim 1, wherein, when the interrupt vector number agrees with a valid vector status, by using the prescribed one of the register files, a corresponding register set is used, and
  wherein, when the interrupt vector number disagrees with the valid vector status, the data transfer apparatus reads a vector area that corresponds to the interrupt vector number that is provided to set a content read as a starting address of the transfer information set.

* * * * *